Dec. 9, 1969 D. D. HAMILTON 3,482,611

TREE SEVERING DEVICE

Original Filed Sept. 8, 1965 40 Sheets-Sheet 1

Dec. 9, 1969 D. D. HAMILTON 3,482,611

TREE SEVERING DEVICE

Original Filed Sept. 8, 1965 40 Sheets-Sheet 2

Dec. 9, 1969 D. D. HAMILTON 3,482,611

TREE SEVERING DEVICE

Original Filed Sept. 8, 1965 40 Sheets-Sheet 4

Dec. 9, 1969 D. D. HAMILTON 3,482,611

TREE SEVERING DEVICE

Original Filed Sept. 8, 1965 40 Sheets-Sheet 6

Dec. 9, 1969 D. D. HAMILTON 3,482,611

TREE SEVERING DEVICE

Original Filed Sept. 8, 1965 40 Sheets-Sheet 8

Dec. 9, 1969 D. D. HAMILTON 3,482,611

TREE SEVERING DEVICE

Original Filed Sept. 8, 1965

40 Sheets-Sheet 9

Dec. 9, 1969 D. D. HAMILTON 3,482,611
TREE SEVERING DEVICE
Original Filed Sept. 8, 1965 40 Sheets-Sheet 14

Dec. 9, 1969 D. D. HAMILTON 3,482,611

TREE SEVERING DEVICE

Original Filed Sept. 8, 1965 40 Sheets-Sheet 16

Dec. 9, 1969 D. D. HAMILTON 3,482,611

TREE SEVERING DEVICE

Original Filed Sept. 8, 1965 40 Sheets-Sheet 19

Dec. 9, 1969 D. D. HAMILTON 3,482,611

TREE SEVERING DEVICE

Original Filed Sept. 8, 1965 40 Sheets-Sheet 23

Dec. 9, 1969 D. D. HAMILTON 3,482,611

TREE SEVERING DEVICE

Original Filed Sept. 8, 1965 40 Sheets-Sheet 31

Dec. 9, 1969 D. D. HAMILTON 3,482,611

TREE SEVERING DEVICE

Original Filed Sept. 8, 1965 40 Sheets-Sheet 35

Dec. 9, 1969 D. D. HAMILTON 3,482,611

TREE SEVERING DEVICE

Original Filed Sept. 8, 1965 40 Sheets-Sheet 37

Dec. 9, 1969 D. D. HAMILTON 3,482,611

TREE SEVERING DEVICE

Original Filed Sept. 8, 1965

40 Sheets-Sheet 38

Dec. 9, 1969 D. D. HAMILTON 3,482,611

TREE SEVERING DEVICE

Original Filed Sept. 8, 1965 40 Sheets-Sheet 39

United States Patent Office 3,482,611
Patented Dec. 9, 1969

3,482,611
TREE SEVERING DEVICE

Douglas D. Hamilton, Mount Royal, Quebec, Canada, assignor of one-third each to Canadian International Paper Company and Quebec North Shore Paper Company, both of Montreal, Quebec, and Abitibi St. Anne Paper Ltd., Beaupre, Quebec, Canada, all corporations of Quebec, Canada Application Sept. 8, 1965, Ser. No. 485,807, which is a continuation-in-part of application Ser. No. 40,294, July 1, 1960. Divided and this application Sept. 15, 1967, Ser. No. 668,020
Claims priority, application Great Britain, Sept. 17, 1964, 38,069/64
Int. Cl. B27c *9/00*
U.S. Cl. 144—3 65 Claims

ABSTRACT OF THE DISCLOSURE

A tree processing machine which includes a plurality of processing units in tandem alignment and means for feeding trees to and through the processing units which includes a boom and grapple and feed rolls. The processing units include a delimber, a debarker and a shear, the latter being mounted to move along with the tree during severing whereby the tree can move continuously through the processing units. The shear includes a pair of knives slidably mounted on a frame for movement transverse to the tree, such frame is further slidably mounted for movement parallel to the length of the tree. The processing units constitute a sub-frame assembly pivotally mounted on a frame for movement about a horizontal axis. The latter frame is pivotally mounted, for movement about a vertical axis, on a mobile base such as a tractor.

This application is a division of application Ser. No. 485,807 filed Sept. 8, 1965, now Patent No. 3,351,107 and which is a continuation-in-part of application Ser. No. 40,294 filed July 1, 1960, now abandoned.

The apparatus relates generally to the art of processing raw timber.

The processing techniques include:

(1) The handling of felled trees and the subsequent delimbing of the handled trees;

(2) The handling of felled trees and the subsequent debarking of the felled tree;

(3) The handling of felled trees and the sequential steps of subsequent delimbing of the felled tree and the subsequent debarking of the delimbed tree;

(4) The handling of a felled tree, and the sequential steps of subsequent delimbing of the felled tree and the subsequent receiving and stacking of the delimbed tree;

(5) The handling of a felled tree and the sequential steps of the subsequent debarking of the felled tree and the subsequent receiving and stacking of the debarked tree;

(6) The handling of felled trees and the sequential steps of the subsequent delimbing of the felled tree, the subsequent debarking of the delimbed tree and the subsequent receiving and stacking of the delimbed and debarked tree;

(7) The handling of felled trees and the subsequent shearing of the processed tree into bolts of predetermined length;

(8) The handling of felled trees, the subsequent delimbing of the handled trees, and the subsequent shearing of the processed tree into bolts of predetermined length;

(9) The handling of felled trees, the subsequent debarking of the felled tree, and the subsequent shearing of the processed tree into bolts of predetermined length;

(10) The handling of felled trees and the sequential steps of subsequent delimbing of the felled tree, the subsequent debarking of the delimbed tree and the subsequent shearing of the processed tree into bolts of predetermined length;

(11) The handling of a felled tree, and the sequential steps of subsequent delimbing of the felled tree, the subsequent shearing of the processed tree into bolts of predetermined length, and the subsequent receiving and stacking of the delimbed tree;

(12) The handling of a felled tree and the sequential steps of the subsequent debarking of the felled tree, the subsequent shearing of the processed tree into bolts of predetermined length, and the subsequent receiving and stacking of the debarked tree;

(13) The handling of felled trees and the sequential steps of the subsequent delimbing of the felled tree, the subsequent debarking of the delimbed tree, the subsequent shearing of the processed tree into bolts of predetermined length, and the subsequent receiving and stacking of the delimbed, debarked tree.

In a timber operation of the type to which this invention particularly relates, trees are felled in the forest, the limbs removed and the trunk or bole is cut into predetermined lengths, called bolts, which are then transported to a mill. To a large extent, the removal of the limbs has been performed by hand after the tree has been felled. At the mill, the bark has been removed, if necessary, and the processed logs are then ready for their intended later use.

In many operations, or later use of the bolts, it is not necessary to remove the bark from the felled tree. Such operations include the use of wood as saw logs. In other operations, for example, where the bolts are used for pulp wood, the bark cannot be used and, accordingly, must be removed. As mentioned previously, this normally has been done as a separate operation and usually at the mill.

The procedure in the past has necessitated several independent steps usually carried out manually or by manually operated individual machines. For example, in processing wood for pulp, after the tree has been felled, the felled tree was passed through the processing steps first to remove the limbs, second, to cut the delimbed tree into sections, and third, to remove the bark from the delimbed tree and cut tree sections. Equipment, however, has not been known whereby these operations can be carried out simultaneously on the same log in a sequence of operations.

In the past, the felled trees have usually been delimbed by an manual operation, there not being any machines capable of handling the log and feeding it through a mechanical delimber. The equipment which was known or could be used consisted of a series of independent pieces of equipment, not necessarily designed to operate together.

Processing trees in the manner outlined above which has consisted of a series of independent operations has been time consuming and costly. By independent operations is meant that only one operation is being performed on one single tree trunk at one time.

In the present application, there is disclosed a machine which can carry out a single processing operation or predetermined sequence of a number of individual processing operations simultaneously on a single tree bole, while the tree moves continuously through the machine thereby to simplify and expedite the processing of felled trees and to minimize handling of the tree. A plurality of single tree boles are fed successively into the machine such that the processing operations are carried out while the tree boles successively pass therethrough.

The present application is concerned primarily with the processing step of severing a tree and apparatus for effecting the same.

A primary object of the present invention is to provide apparatus for cutting a tree which is moving along a selected, substantially linear, path without interrupting the movement of the tree.

A further aspect of the present invention is to provide a machine which can be operated to engage a selected pre-felled tree from a plurality of pre-felled trees, to feed the tree directly into the machine and while being fed therethrough, to cut the tree, as it is moving, into bolts.

In accordance with a broad aspect of the present invention, there is provided a device for cutting a tree while the tree moves along a path generally parallel to the length of the tree and without interrupting the movement of such tree along the path, said device comprising: (a) a support; (b) cutting means on said support to sever a tree in said path; and (c) means to mount said support on a frame to allow said support to move along the same path as the tree during cutting thereof and thereafter return to its initial position.

In accordance with a further aspect of the present invention, there is provided a mechanism for cutting trees into logs of predetermined length, said mechanism comprising a plurality of relatively movable cutting knives, a housing for said knives, means on said housing for moving at least one of said knives toward and away from an axial path to cut a tree into logs of a predetermined length; and mounting means for said housing to allow said housing and said knives to move axially with said tree while said knives are in engagement with said tree and for returning said housing to its initial position when said knives are moved away from said tree.

By another aspect of this invention, there is provided a machine for processing a felled tree, said machine comprising: (a) support means; (b) feed means for feeding a tree bole axially along a substantially linear feed path; (c) cutting means on said support means and located in said feed path for cutting said tree bole passing along said path into a plurality of portions; and (d) mounting means for said cutting means to allow said cutting means to move along said path during said cutting operation and for returning said cutting means to its initial position when said cutting operation is terminated.

By another aspect of this invention, there is provided apparatus for subdividing a tree bole into a plurality of portions comprising: (a) feed means to move said bole endwise along a path substantially coincident with the longitudinal axis of said bole; (b) a frame; (c) tree cutting means engageable with said bole to subdivide the same and mounted on said frame to reciprocate along an axis parallel to the path of said bole, said bole moving said cutting means on engagement therewith along said axis from an initial first position during said subdividing of said bole; and (d) means returning said cutting means to said first position upon disengagement of said cutting means from said bole.

In these two embodiments, the feed means may be mounted directly on the machine. It may include feed rolls or a telescopic boom including the grapple thereon or combinations thereof.

By an embodiment of this invention, the cutting means includes a plurality of cutting knives; means for feeding a selected tree in an axial path between said cutting knives; a housing for said knives; and means on said housing for moving said knives toward and away from said axial path to cut said selected tree into logs of a predetermined path.

In the flying shear, the knives may preferably both be movable, and be driven towards and away from each other to intersect said axial path by means of hydraulic cylinders. The hydraulic cylinders may be fixed to the movable cutter frame and to the knives, or they may be pivotally secured to the knives and/or the movable cutter frame.

The flying shear, in another embodimnt, also includes a fixed shear frame provided with a pair of parallel spaced apart horizontal hollow beams, and wherein the movable shear frame is provided with a pair of parallel spaced apart horizontal beams telescoped therein whereby movement of said movable frame from said first position to said second position is guided by sliding cooperation between said beams. In that embodiment, a coil spring is disposed within the inner telescoped beam to bias said movable shear frame to its first position.

The guide means between the inner and outer beams of this embodiment includes at least two brackets secured to and disposed about the outer circumference of the inner beam of the aft end thereof, each bracket pivotally mounting rollers thereon adapted to roll on the inner circumference of the outer beam and at least two brackets secured to and disposed about the inner circumference of the outer beam at the fore end thereof, each bracket pivotally mounting rollers therein adapted to roll on the outer circumference of the inner beam.

In another embodiment of this invention, the movable shear frame is provided with switch means operative to initiate the downward and the upward movement of said knives. In this aspect there may also be provided feed rolls to feed logs therethrough along said axial path, and wherein said switch means is associated with said feed rolls. Alternatively or additionally, there may be provided, by this aspect, log measuring means associated with said fixed cutter frame, and wherein said switch means is associated with said log measuring means. By this embodiment, the log measuring means comprises a framework; means mounting said frame on said fixed cutter frame downstream of said cutter but disposed in a horizontal plane above said axial path; downwardly depending legs, pivotally secured to said framework and extending across said axial path and switch means operated by pivotal movement of said downwardly depending means.

By yet another aspect of this invention, there is provided a method of logging in which felled trees are subdivided into pieces of predetermined length, which process comprises: selecting a pre-felled tree from a plurality of pre-felled trees; relatively moving said tree along a feed path; removing the limbs from said tree as it is relatively moved along said feed path; sensing the diameter of said tree as it is relatively moved along said feed path; activating a shear including a pair of relatively movable knives intersecting said feed path by the relative movement of said tree along said feed path; severing said tree by said knives as said tree is relatively moved along said feed path; and returning said knives to an unactivated position in which the vertical spacing between said knives is dependent upon the diameter sensed and is controlled by said switches.

In the accompanying drawings:

FIGS. 1 to 8 inclusive illustrate the overall arrangement of a mobile processing machine wherein:

Figure 1:
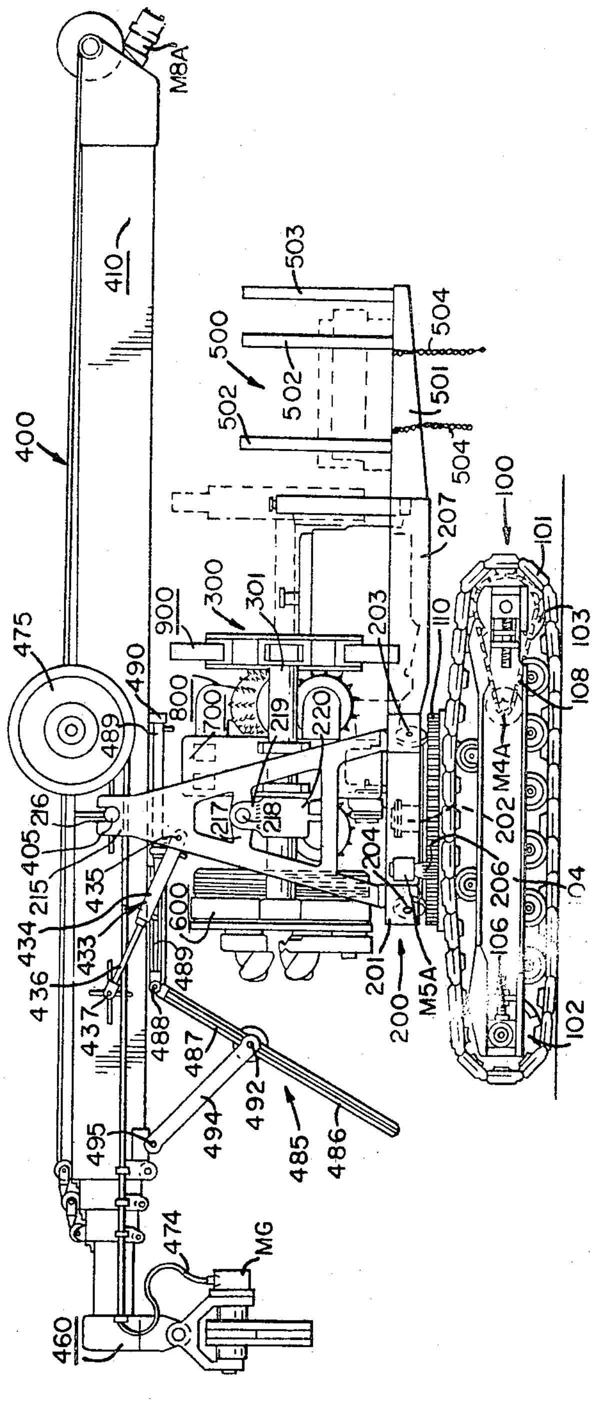
FIG. 1 is a side elevational view of one embodiment of a mobile processing machine.
Figure 2:
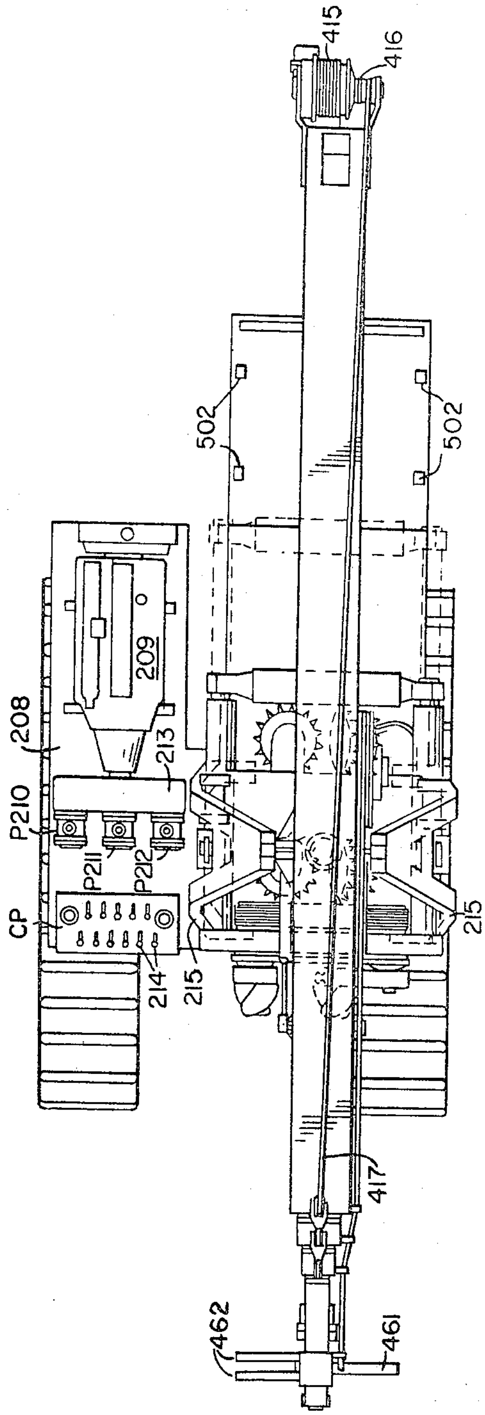
FIG. 2 is a top plan view of FIG. 1.
Figure 3:
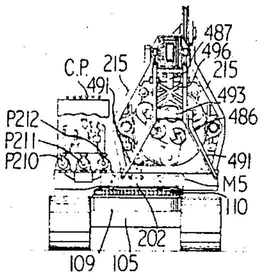
FIG. 3 is a front elevational view of the machine shown in FIG. 1 with the portion of the boom removed for the purposes of clarity.
Figure 10:
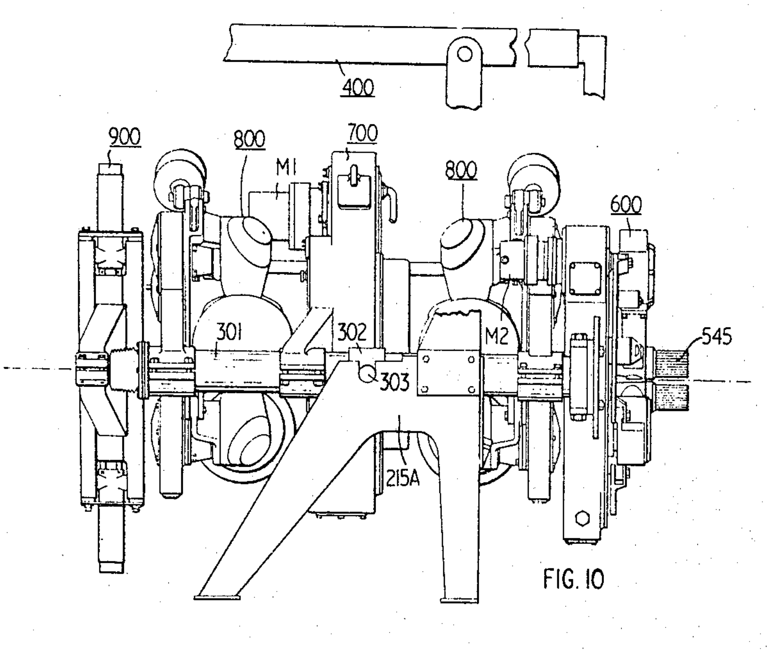
FIG. 10 is a side elevational view, opposite to that of FIG. 9, illustrating modified processing units which include a delimber, a debarker, a shear and two independen sets of feed rolls secured to a pair of beams pivotally mounted on a frame.
Figure 20:
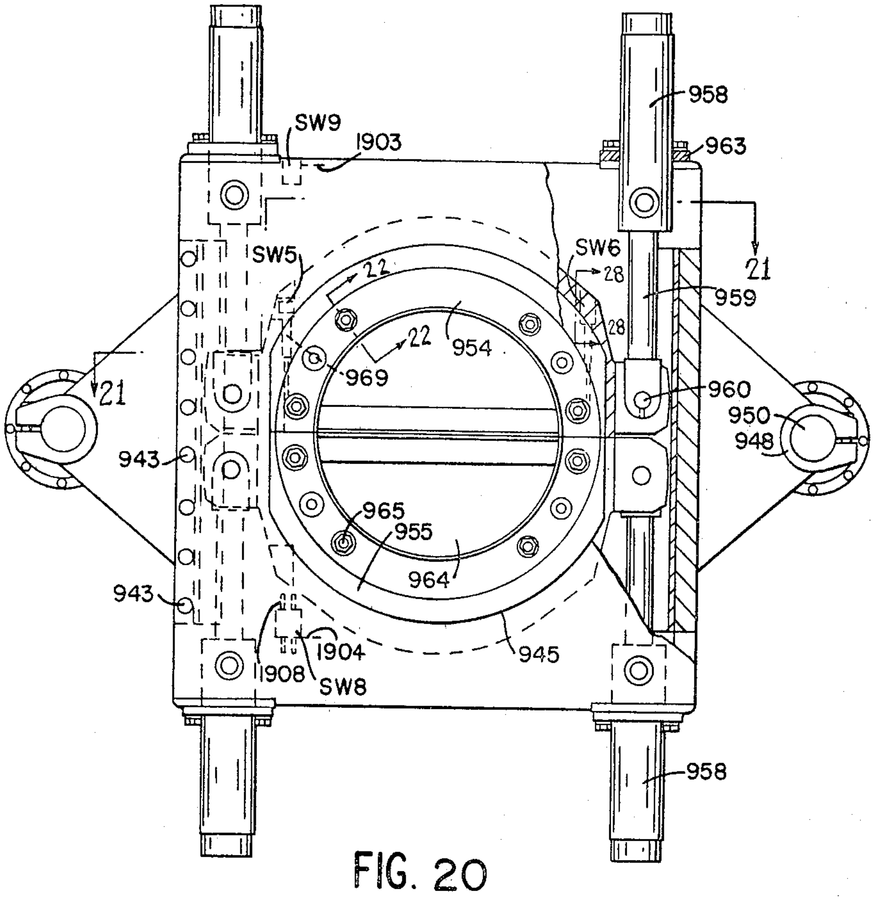
Figures 21, 22, 23, 24:
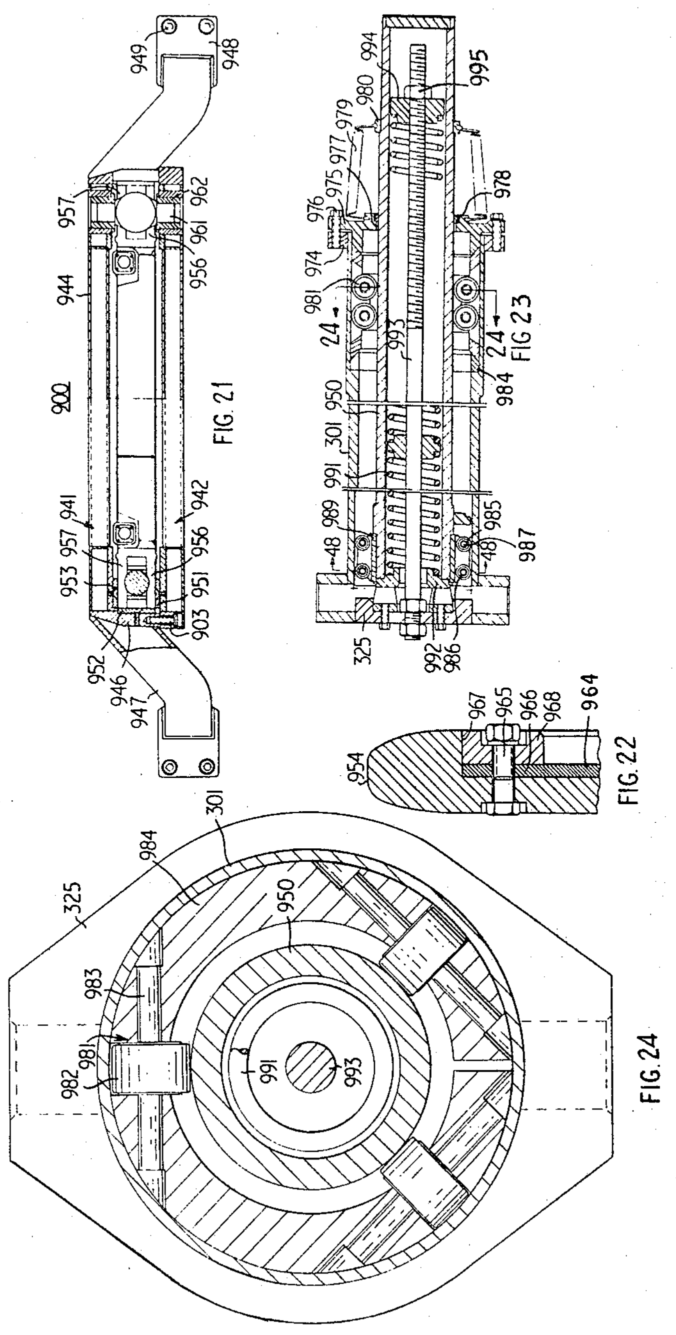
Figure 25:
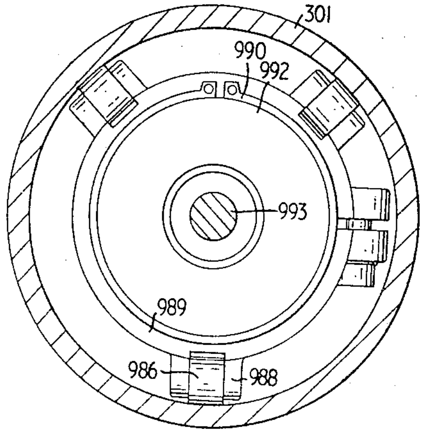
Figure 26:
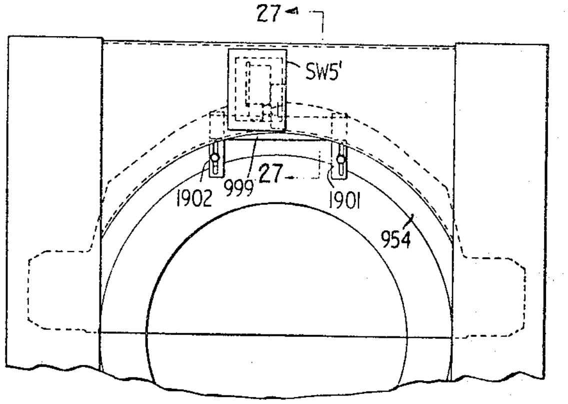
Figure 29:
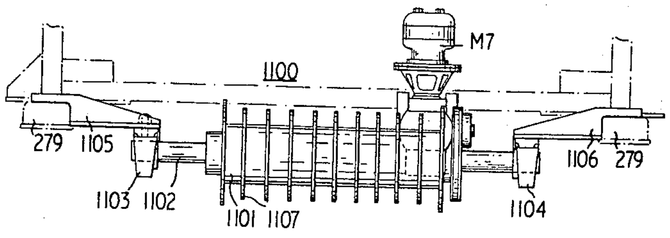
Figure 27:
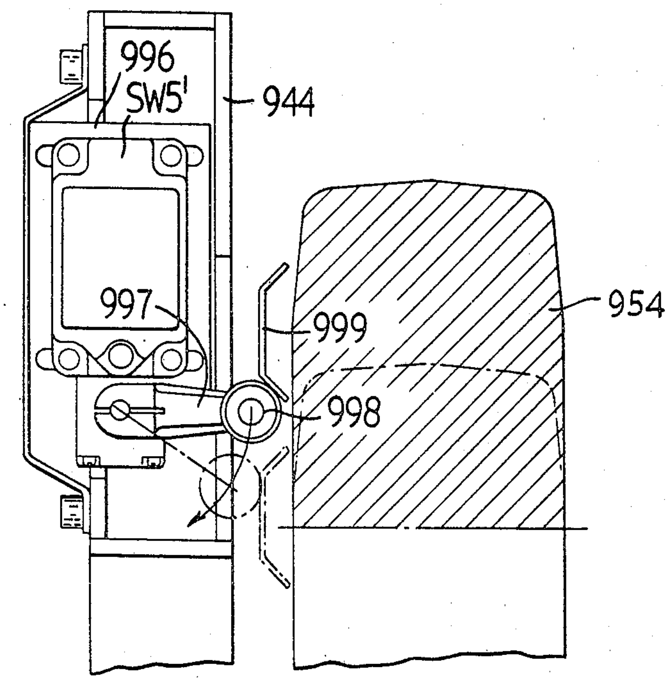
Figure 30:
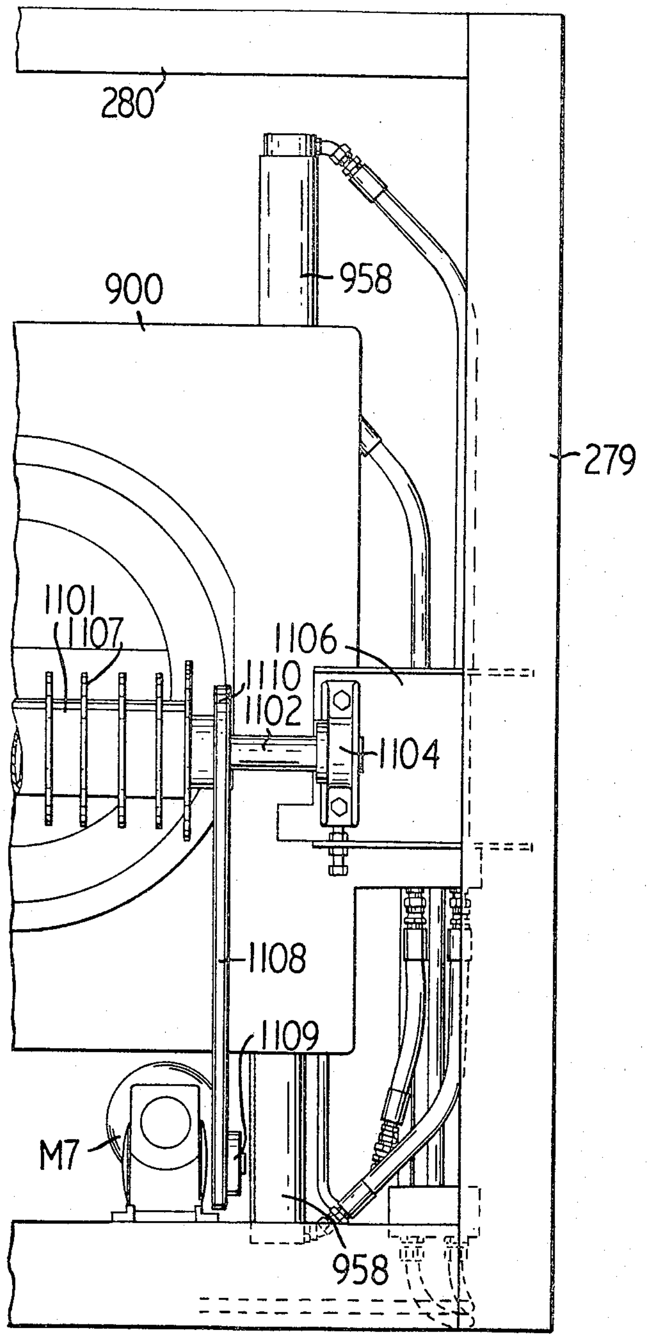
Figure 28:
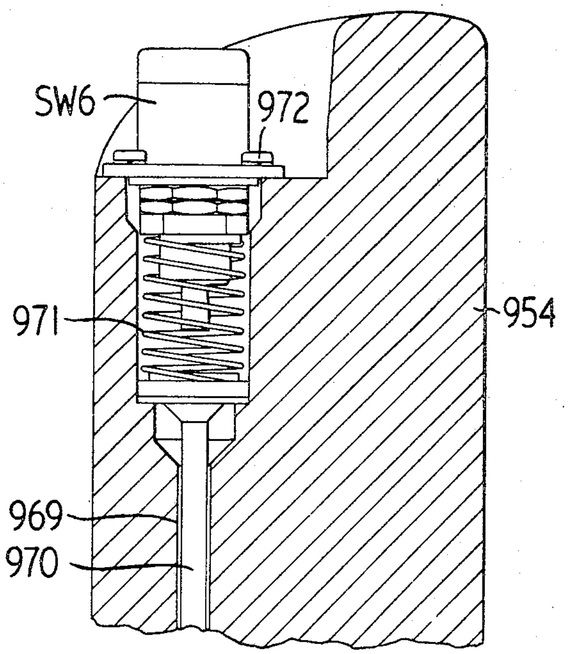
Figure 31:
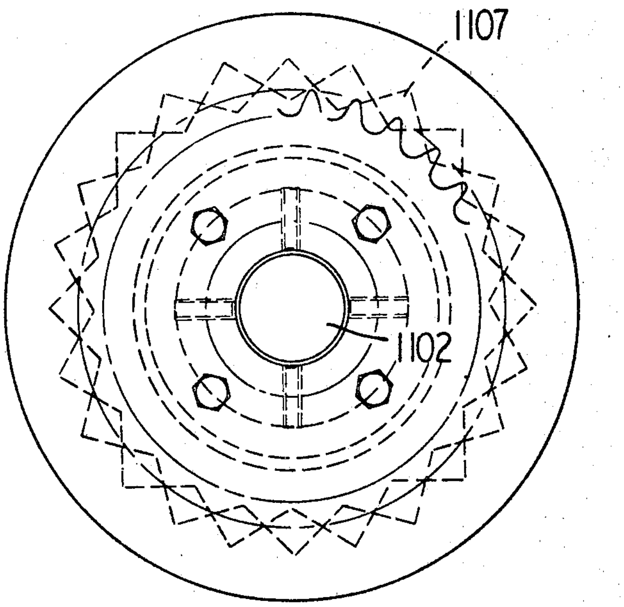
Figure 32:
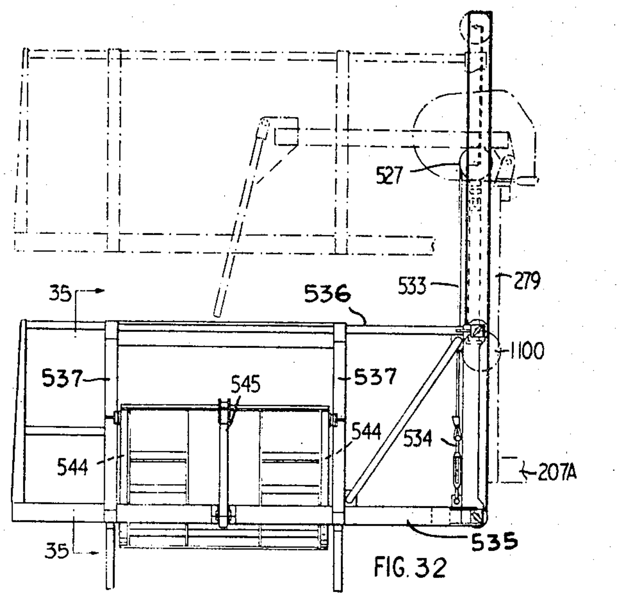
Figure 33:
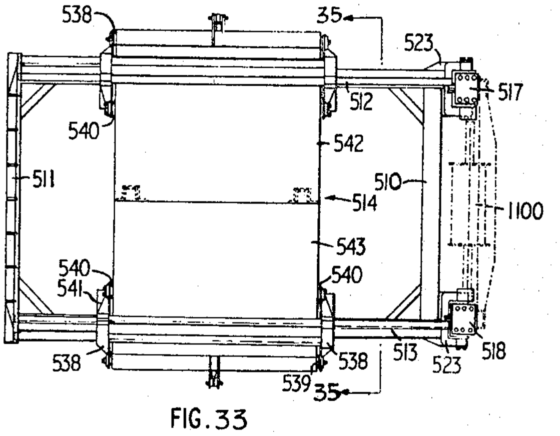
Figure 34:
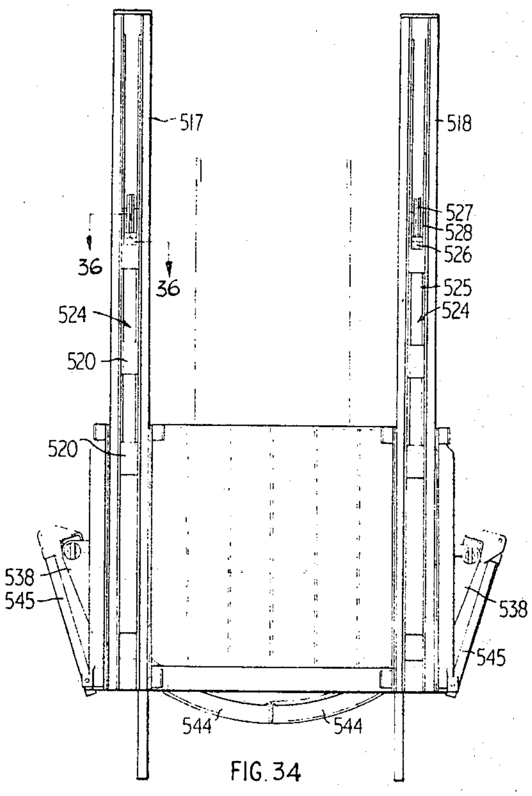
Figure 35:
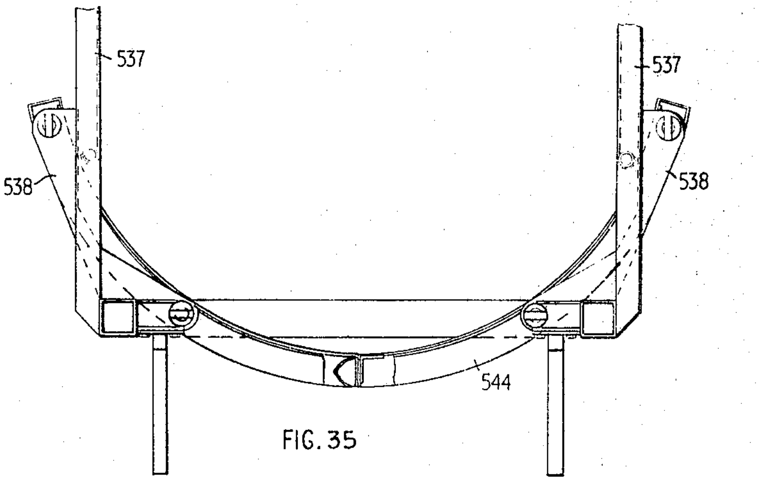
Figure 36:
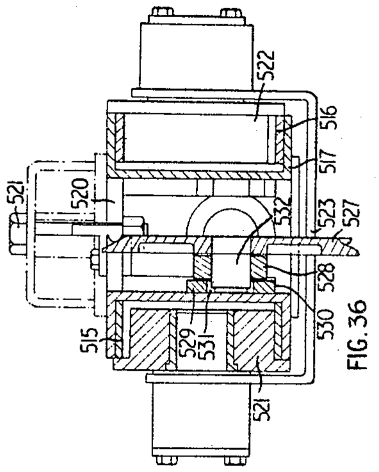
Figure 37:
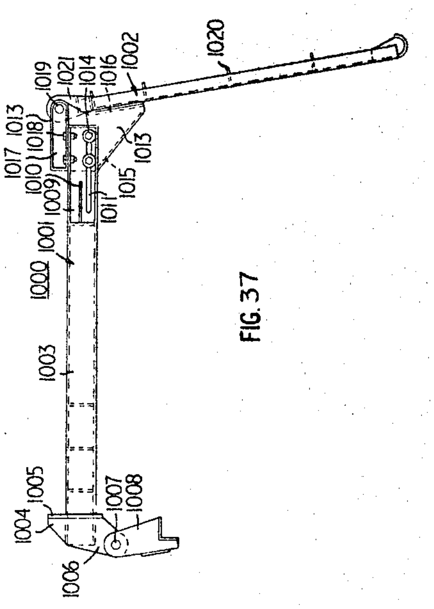
Figure 38:
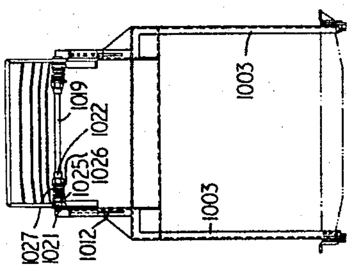
Figures 39, 40:
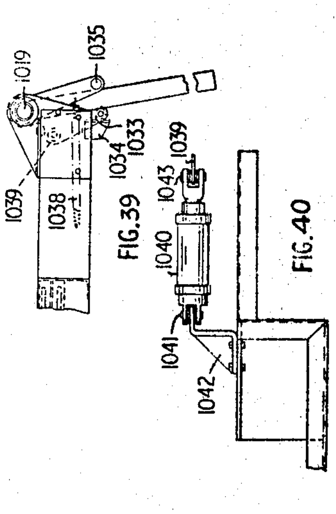
Figure 41:
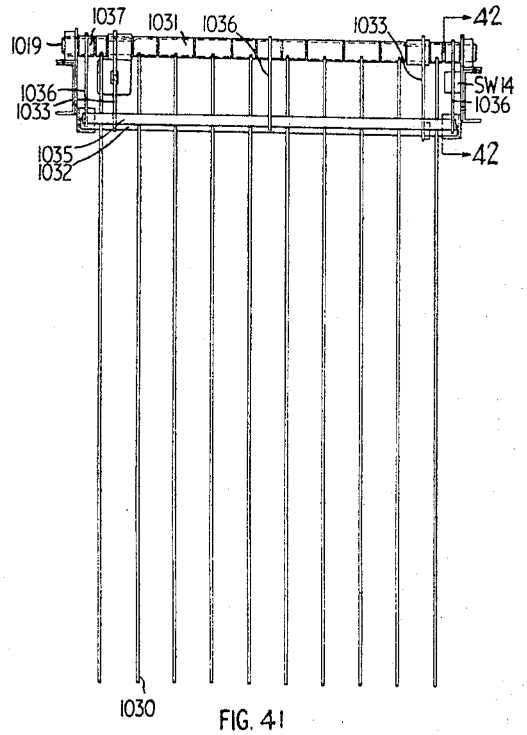
Figure 42:
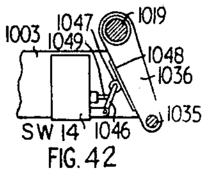
Figure 43:
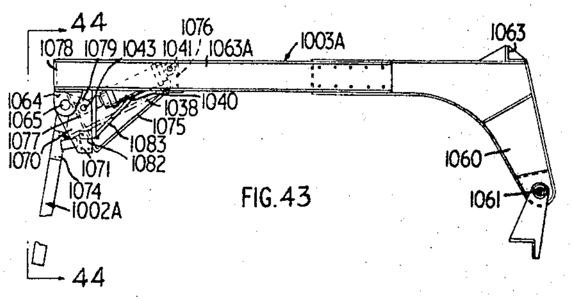
Figures 44, 45:
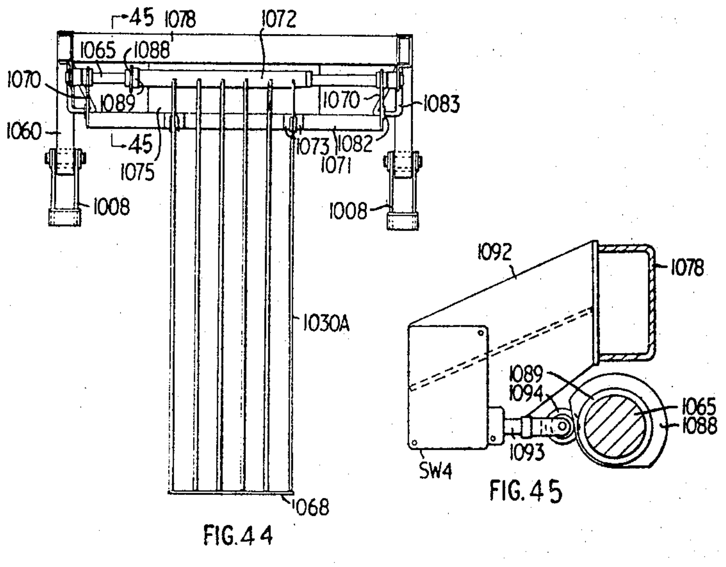
Figure 47:
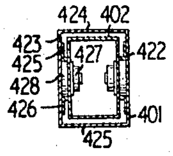
Figure 51:
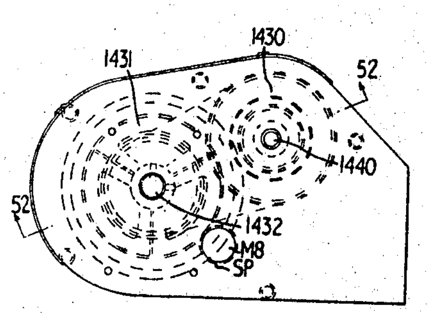
Figure 46:
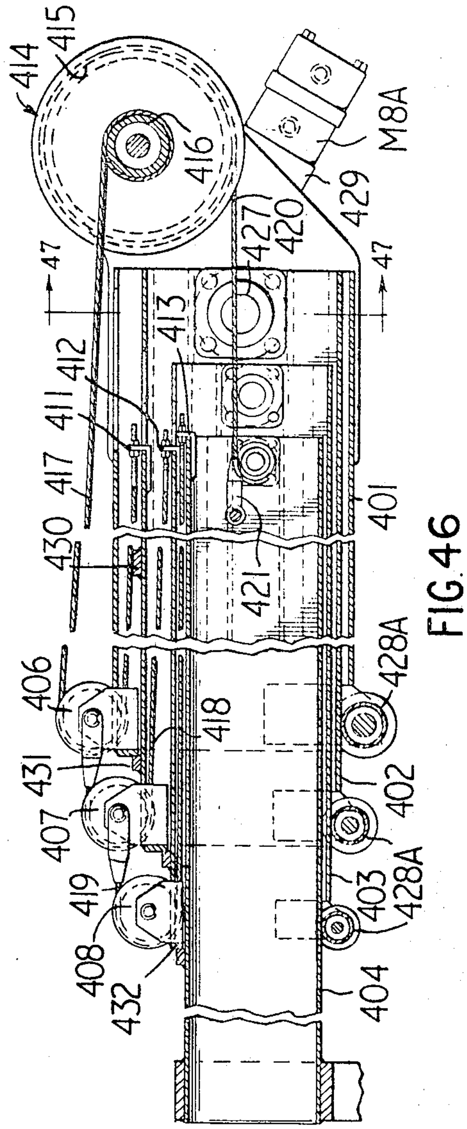
Figure 52:
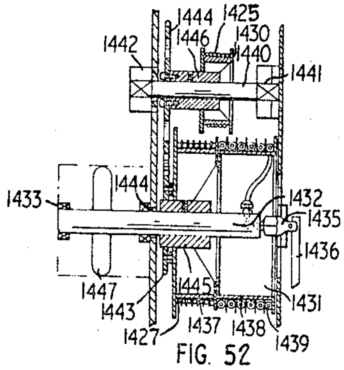
Figure 56:
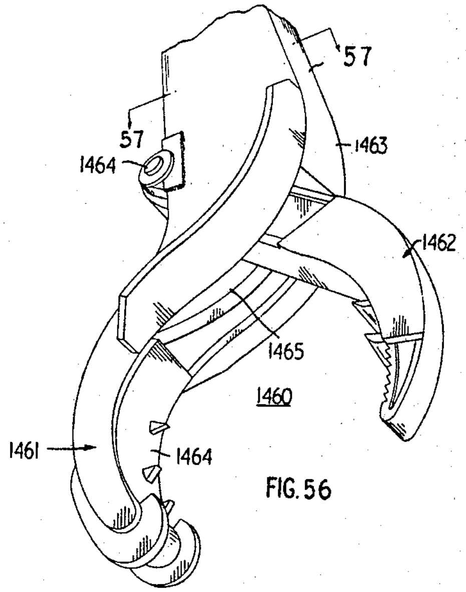
Figures 48, 49, 50:
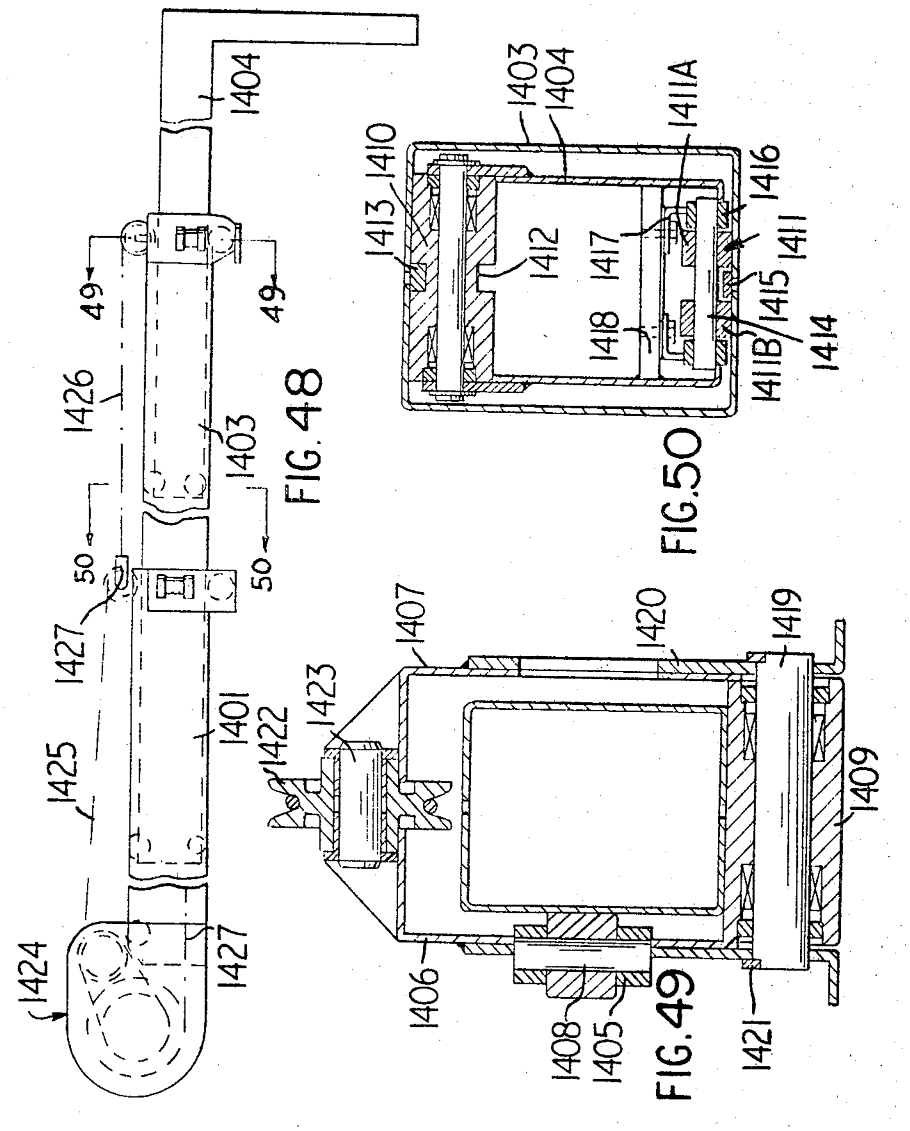
Figure 53:
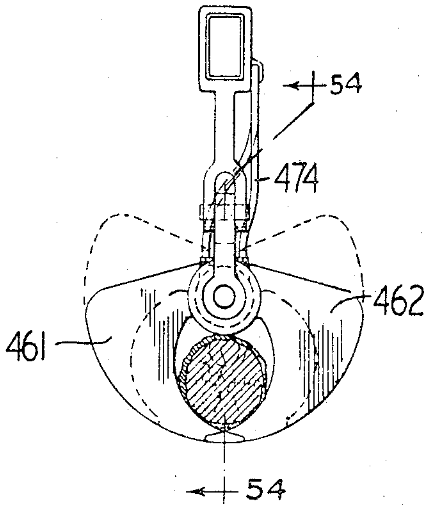
Figures 54, 55:
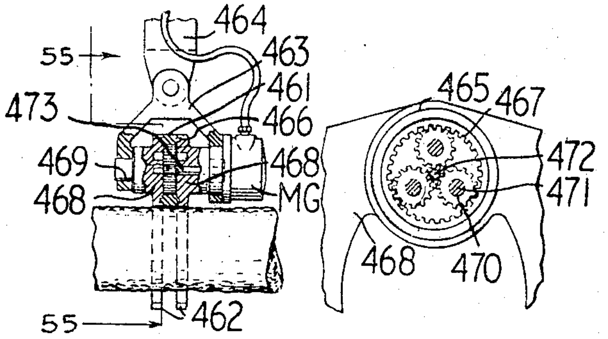
Figure 58:
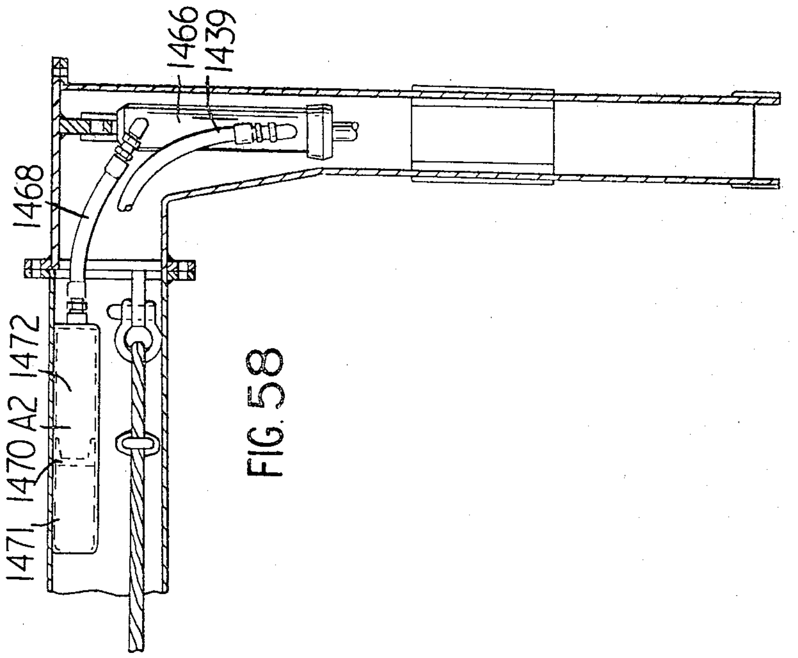
Figure 57:
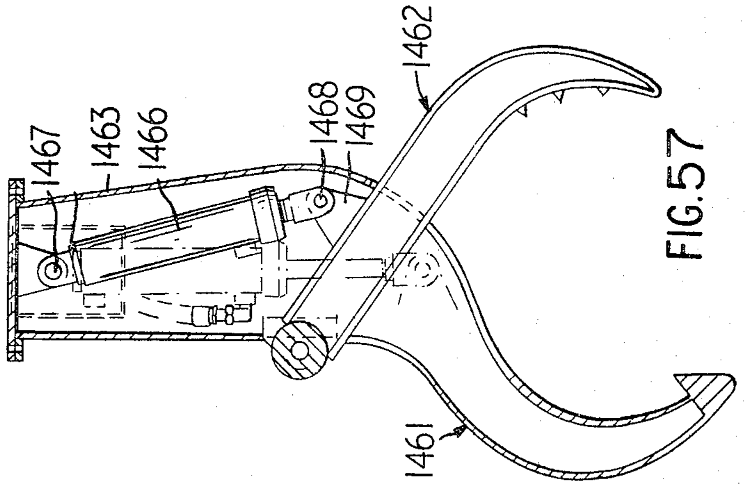
Figure 60:
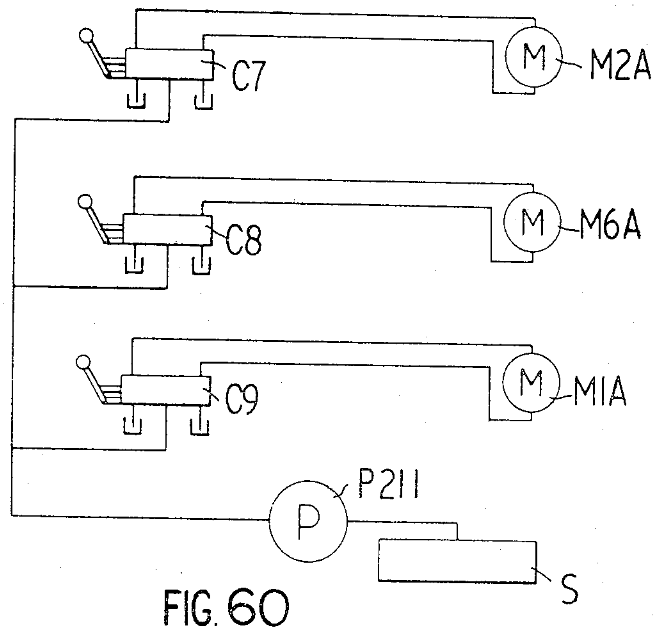
Figure 59:
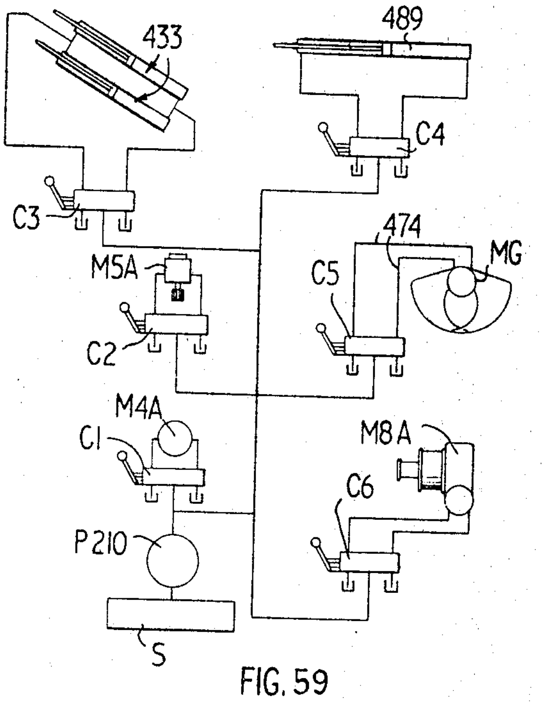
Figure 61:
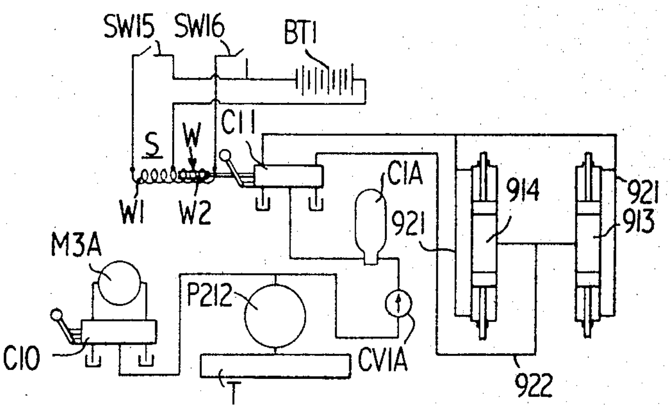
Figure 62:
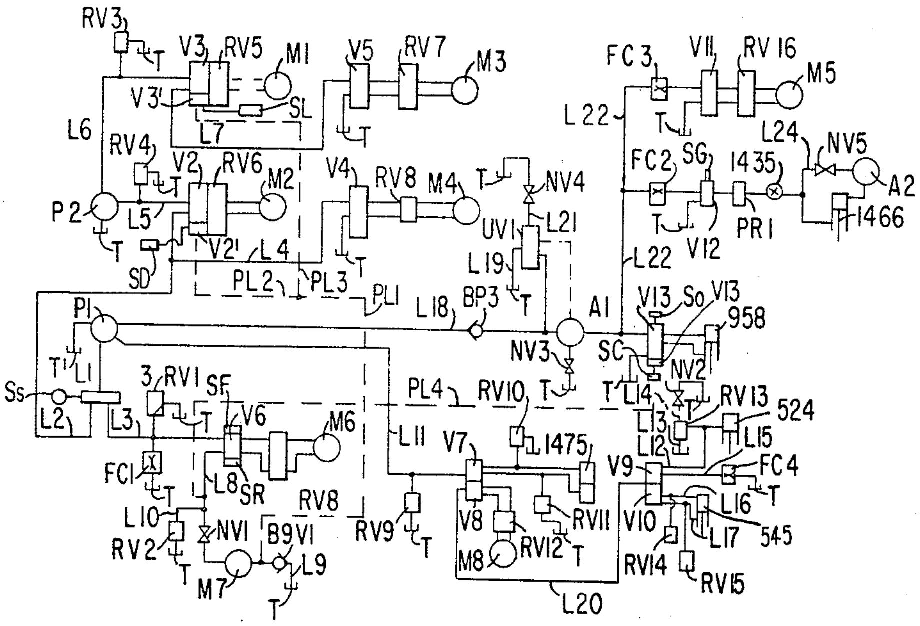
Figure 63:
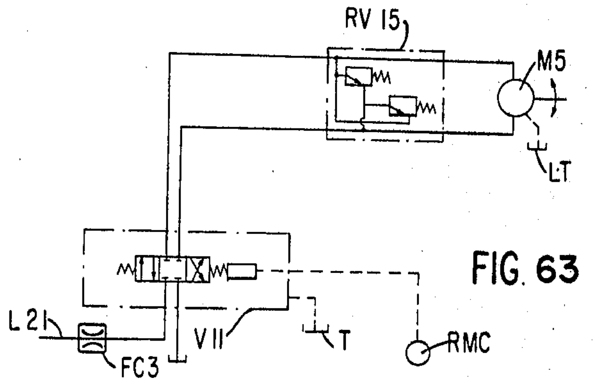
Figure 64:
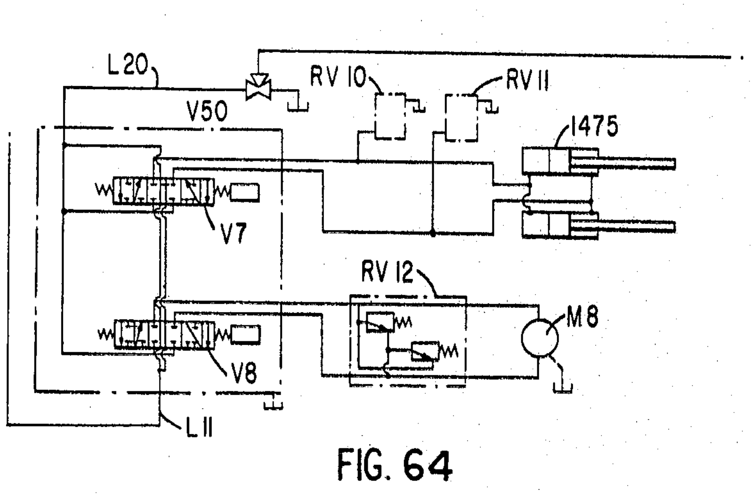
Figure 65:
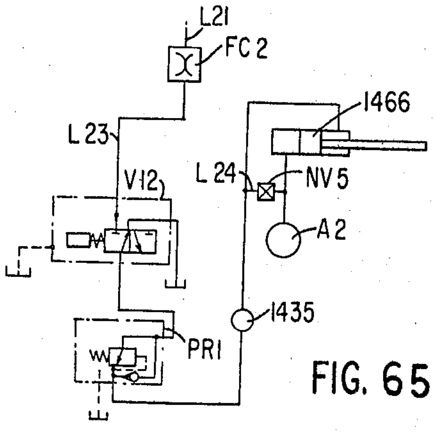
Figure 66:
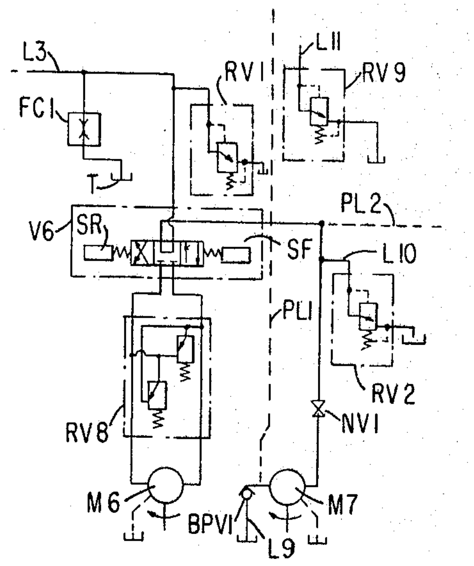
Figure 67:
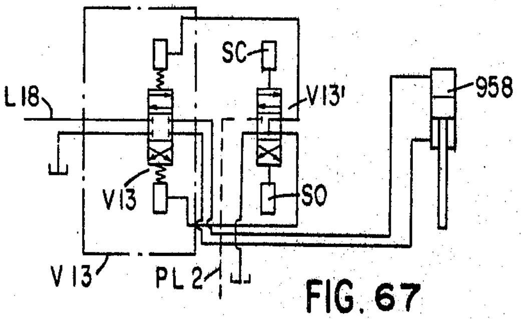
Figure 68:
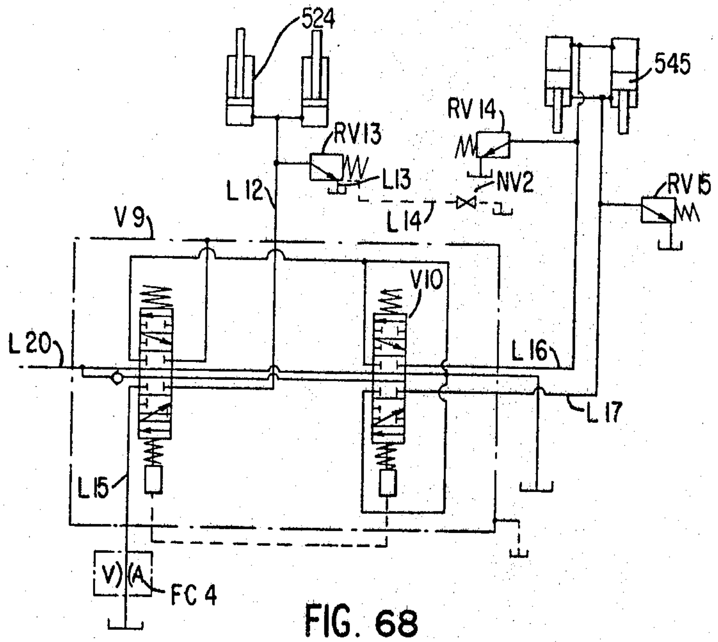
Figure 69:
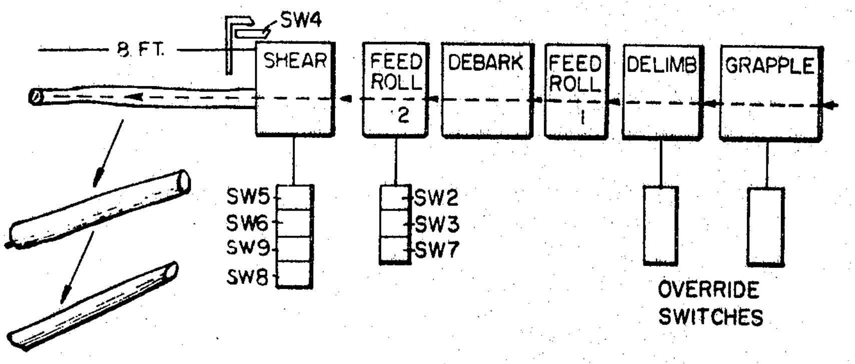
Figure 70:
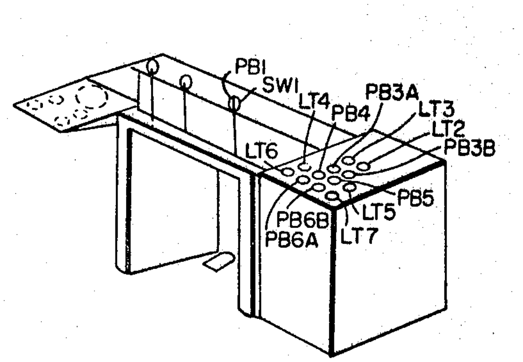
Figure 71:
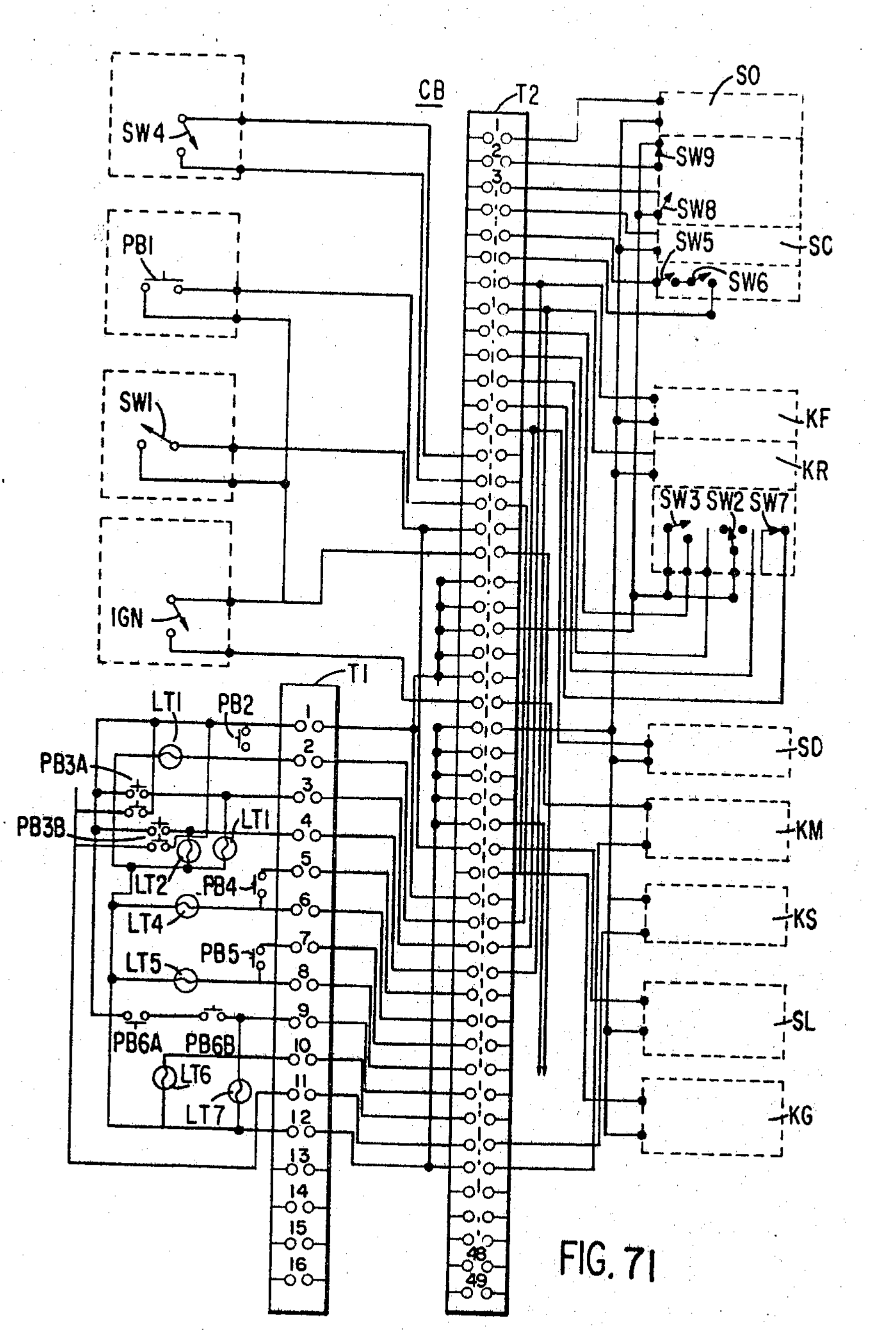
Figure 72:
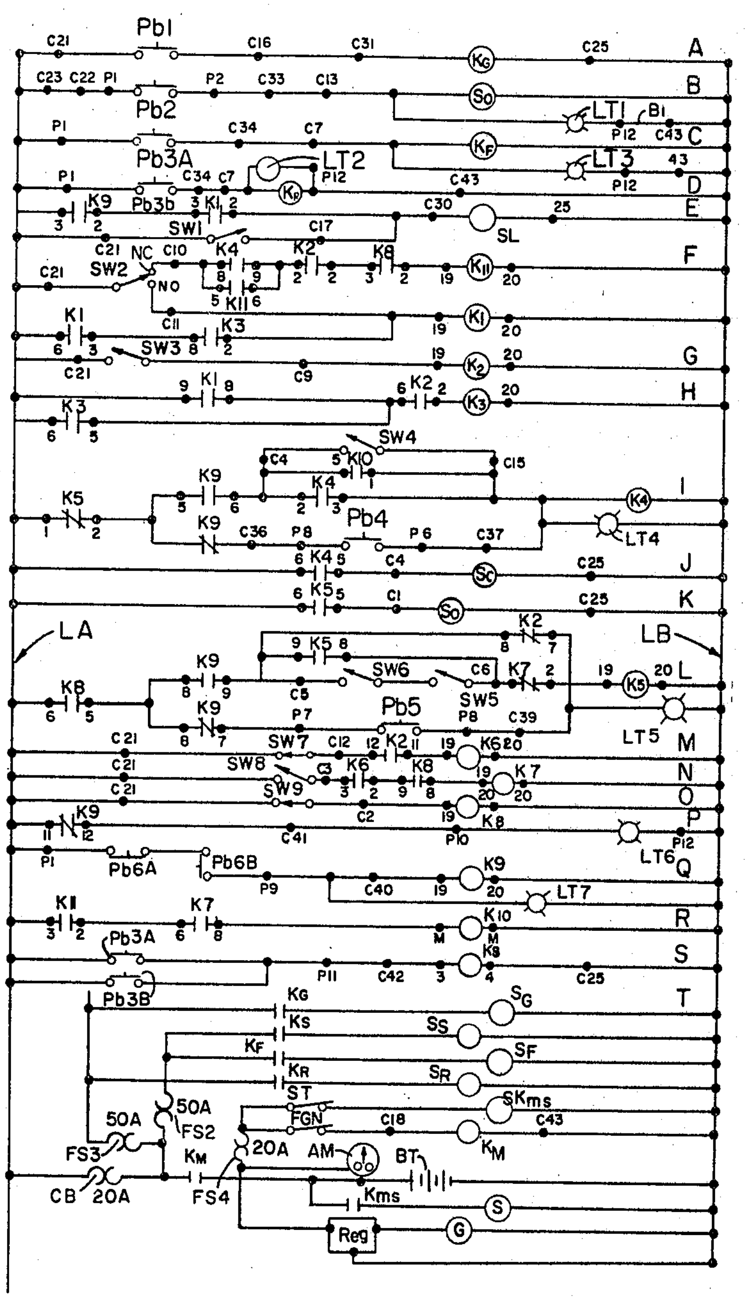
Figure 73:
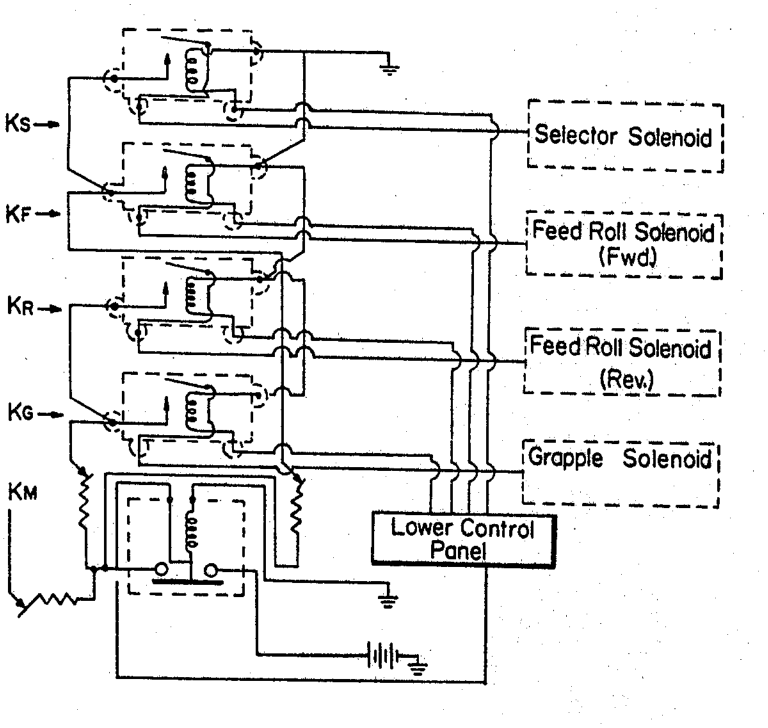

FIGS. 20 to 27 inclusive are various detailed views of a modified form of slasher or shear wherein:

FIG. 20 is a rear elevational view in partial section illustrating a shear of the type illustrated in FIG. 10;

FIG. 21 is a stepped sectional view substantially along section 44—44 of FIG. 20;

FIG. 22 is a detailed exploded view substantially along section 45—45 of FIG. 20;

FIG. 23 is a detailed cross-sectional view of a mounting for the slasher of the type illustrated in FIGS. 20 and 21;

FIG. 24 is a cross-sectional view along section 47—47 of FIG. 23;

FIG. 25 is a cross-sectional view along section 48—48 of FIG. 23;

FIG. 26 is a partial vertical elevational view illustrating an electrical switch mounted for actuation by movement of the shear yoke;

FIG. 27 is a vertical sectional view along section 50—50 of FIG. 26;

FIG. 28 is a sectional view along section 51—51 of FIG 20;

FIGS. 29 to 31 inclusive illustrate various views of a clearing roll wherein:

FIG. 29 is a top plan view of a driven clearing roll for assisting in removing the processed trees from the processing machine;

FIG. 30 is a rear vertical elevational view of one-half of the clearing roll illustrated in FIG. 29;

FIG. 31 is a side elevational view of the driven clear-up roll shown in FIGS. 29 and 30;

FIGS. 32 to 36 inclusive are various views of a cradle assembly for receiving the processed logs wherein:

FIG. 32 is a side vertical elevational view of the cradle assembly;

FIG. 33 is a top plan view of FIG. 32;

FIG. 34 is a rear elevational view of FIG. 32;

FIG. 35 is a partial vertical sectional view substantially along section 58—58 of FIG. 32;

FIG. 36 is a stepped horizontal sectional view along section 59—59 of FIG. 35;

FIGS. 37 to 45 inclusive are various views illustrating the log measuring and chop control apparatus of the processing machine wherein:

FIG. 37 is a vertical side elevational view of the log measuring device consisting of a frame and a flapper pivotally mounted thereon;

FIG. 38 is a top plan view of FIG. 37;

FIG. 39 is a side elevation fragmentary view of a modified frame and flapper and including switch actuating means responsive to movement of the flapper to effect actuation of the slasher;

FIG. 40 is a partial top plan view of FIG. 39;

FIG. 41 is a rear elevational view of FIG. 39;

FIG. 42 is a section along section 65—65 of FIG. 41;

FIG. 43 is a side elevational view of a further modified form of log measuring device including an alternate switch actuating means for initiating actuation of the shear or slasher;

FIG. 44 is a rear elevational view along line 67—67 of FIG. 43;

FIG. 45 is an enlarged sectional view along section 68—68 of FIG. 44;

FIGS. 46 to 57 inclusive are various views of the boom and grapple assembly for the processing machine wherein:

FIG. 46 is a vertical sectional view of the boom on the machine illustrated in FIGS. 1 to 3 inclusive, the boom being broken along its length;

FIG. 47 is a vertical cross-sectional view along section 70—70 of FIG. 46;

FIG. 48 is a vertical elevational view of a modified form of boom utilized on the machine illustrated in FIGS. 4 to 7 inclusive;

FIG. 49 is a vertical cross-sectional view along section 72—72 of FIG. 48;

FIG. 50 is a vertical sectional view along section 73—73 of FIG. 48;

FIG. 51 is a side elevational view of the sheave and drum assembly for effecting extension and retraction of the boom illustrated in FIG. 48;

FIG. 52 is a horizontal section along section 75—75 of FIG. 51;

FIG. 53 is a front elevational view of a grapple located at the free end of the boom of the type illustrated in FIG. 46;

FIG. 54 is a sectional view along section 77—77 of FIG. 53;

FIG. 55 is a front sectional view along section 78—78 of FIG. 54 illustrating further detail whereby the jaws of the grapple are movable;

FIGS. 56 to 58 inclusive illustrate a modified form of grapple wherein:

FIG. 56 is an oblique elevational view of such modified grapple;

FIG. 57 is a sectional view substantially along section 80—80 of FIG. 56 and of the grapple;

FIG. 58 is a vertical cross-sectional view of the grapple illustrated in FIG. 55 taken along an axis normal to the cross-sectional view of FIG. 57;

FIGS. 59 to 68 inclusive are various schematics of the hydraulic system wherein:

FIGS. 59 to 61 inclusive are schematic views of the hydraulic system for effecting operation of the various processing units and controlling mobility of the processing machine illustrated in FIGS. 1 to 3 inclusive;

FIG. 62 is a partial block and schematic illustrating the overall hydraulic system for the modified machine illustrated in FIGS. 4 to 7 inclusive;

FIGS. 63 to 68 inclusive are detailed schematics of the hydraulic system of the various sections of FIG. 62 wherein:

FIG. 63 is a schematic of the hydraulic system for the slewing motor;

FIG. 64 is a schematic of the hydraulic system for the boom lift and winch motor;

FIG. 65 is a schematic of the hydraulic system for the grapple of the winch;

FIG. 66 is a schematic of the hydraulic system for the feed and clearing roll;

FIG. 67 is the hydraulic for the shear cylinder;

FIG. 68 is the hydraulic for the cradle system;

FIGS. 69 to 73 are various schematic and block diagrams of the electrical system for the processing machine illustrated in FIGS. 4 to 7 inclusive;

FIG. 69 is a block diagram generally indicating the processing operation for the machine including a representation of the relative positioning of sensing switches and override switches;

FIG. 70 is an oblique diagrammatic illustration of the operator control area having a panel box enclosing a portion of the electrical circuitry;

FIG. 71 is a partial block and schematic illustration of the electrical system;

FIG. 72 is a schematic illustrating the electrical circuitry for the machine; and FIG. 73 is a schematic of a group of relays illustrating their inter-relationship.

GENERAL ARRANGEMENT OF MACHINE

Illustrated in the drawings are two embodiments of a self-propelled tree processing machine. One embodiment is illustrated in FIGS. 1 to 3 inclusive and a second embodiment is illustrated in FIGS. 4 to 7 inclusive. Each of the embodiments includes a tractor assembly 100 having a frame assembly 200 mounted thereon to pivot about a vertical axis. A sub-frame assembly 300 is secured to the frame 200 and mounted to pivot generally about a horizontal axis, and includes a plurality of tree processing units to be described in detail hereinafter. Carried upon the upper end of the frame 200 is a boom and grapple assembly 400 for engaging and introducing an end of the tree directly into the first of the processing units. Also mounted upon the frame 200 adjacent an end thereof is a cradle 500 providing a receiving and stacking station for the processed bolts.

The machine illustrated in FIGS. 4 to 7 inclusive also includes a log measuring apparatus indicated generally by the reference numeral 1000.

The processing units include a delimber 600, a debarker 700, one or two sets of feed rolls 800 and shears 900. The processing units are mounted on the machine in substantially horizontal tandem alignment such that they perform their processing function simultaneously on a single tree bolt at horizontally spaced positions. A tree bolt being processed passes in sequence through the individual processing units of the combination being used. A plurality of trees are processed in sequence, each tree passing through the machines in a path substantially along the axis thereof. A grapple 460 provided with a pair of movable jaws is suspended from the free end of an extendable and retractable boom 410. The processing units mounted on beams and constituting the sub-frame assembly, the cradle, and the boom and grapple assembly, are all mounted on the tractor 100 to pivot about a generally vertical axis. The boom is further pivoted about a substantially horizontal axis to allow lowering and raising of the grappel. Since the tractor unit is movable, the machine can be operated to process felled trees lying on the ground at various locations. The boom is extendable and thus adapted to grab trees outwardly away from the machine to the extent of the reach of the fully extended boom.

The processing machine components 100, 200, 300, 400, 500, 800, 900 and 1000 will be individually described in detail hereinafter. For convenience of description, hereinafter, the left and right end of the machine as viewed in FIGS. 1 and 4 will be referred to respectively as the front and rear end of the machine. The axis extending through the front and rear end will be referred to as the longitudinal axis and the axis normal thereto will be referred to as the transverse axis of the machine.

TRACTOR

The tractor 100 illustrated in FIGS. 1 to 3 inclusive consists of a pair of treads 101 each entraining an idler 102 and a drive wheel 103. The idler and drive wheels of each tread are journalled respectively adjacent opposed ends of a beam member 104, the beams 104 being interconnected by cross members or beams 105. The idlers are adjustable longitudinally along respective ones of the beams by a mechanism generally indicated at 106 whereby the tension in the treads may be adjusted. The drive wheels at opposite sides of the machine are driven by respective ones of hydraulic motors M3A and M4A through a link chain 108 and a pair of gears fastened respectively to the motor shaft and the drive wheel 104. The motors M3A (see FIG. 61) and M4A are driven by a suitable power source mounted upon the frame 200 as will be described hereinafter.

Hydraulic motors are preferable, however, electrical motors can be substituted therefor. The motors are controlled individually and thereby provide means for steering the tractor in moving from one place to another.

A platform 109 is secured to and supported by the cross beams 105. The platform has a generally horizontal upper surface and secured thereto is an external ring gear 110. The ring gear, as will be seen hereinafter, is used for slewing or pivoting the frame about the vertical axis.

A self-propelled processing machine is preferable and an endless track type of tractor is also preferred to provide such a self-propelled vehicle. The processing machine however may be mounted upon a wheeled tractor. The tractor, or self-propelled base for the processing machine also may be replaced by a trailer or a skid type of support. A fixed base even may be utilized where mobility is unnecessary. In the event of a skid type support or trailer, the apparatus or machine may be towed or otherwise propelled by a tractor unit. The endless track tractor, however, is preferred as it is most suitable for mobility in the type of terrain where the processing machine is generally used.

The tractor 100 illustrated in FIGS. 4 to 7 inclusive is somewhat different in construction from that shown in FIGS. 1 to 3. The tractor 100 shown in FIGS. 1 to 3 includes a pair of treads 101A each traversing an idler 102A and sprocket 103A. The idler and sprocket are journalled adjacent opposite ends of a beam 104A and the pair of beams are interconnected by a series of cross beams 105A.

The tracks at opposite sides of the machine are driven by respective ones of a pair of motors M3 and M4 and associated transmissions 107A mounted intermediate the tread units on the interconnecting framework and cross beams.

Figure 8:
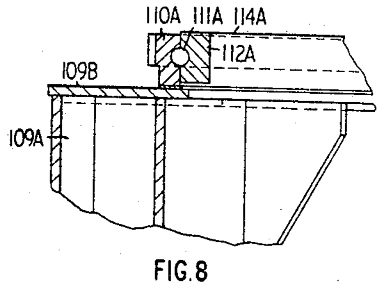
FIG. 8 is an enlarged, partial sectional view taken substantially along section 8—8 of FIG. 5, illustrating one detail of the mounting of the machine frame on the tractor.

A platform 109A is supported upon the cross beams 105A. The platform provides a substantially flat upper horizontal surface 109B and supported thereupon and rigidly secured thereto is an external ring gear 110A. The inner part of the ring gear forms one part of a mono-race bearing whereby the frame to be described hereinafter is pivotally mounted upon the tractor unit. The mono-race (see FIG. 8) additionally includes an inner ring 112A with a plurality of balls or bearings 111A disposed between such ring and the internal surface of the ring gear. The internal ring 112A has an upper surface 114A located vertically above the adjacent surface of the ring gear. This surface supports the frame 200 to be described hereinafter and such frame is rigidly secured thereto.

The hydraulic motors are preferable however electric motors may be used as previously indicated. Alternatively, a power plant may be mounted intermediate the tracks in driving relation therewith through a transmission and clutch assembly as is common in track vehicles.

The tractor 100 provides a mobile base for the frame and various processing components and apparatus mounted thereon and provides a self propelled processing machine.

FRAME

In the machine illustrated in FIGS. 1 to 3 inclusive, the frame 200 consists of a base 201 pivotally mounted upon the platform 109 of the tractor unit by a pin assembly 202. The base 201 is balanced and further supported by a plurality of wheels 203. The wheels are pivotally mounted by pins 204 to the base 201 and are disposed to follow in a substantially circular track upon the upper surface of the ring gear 110.

A hydraulic motor M5A having a pinion 206 is carried by the frame 200 and is mounted such that the pinion meshes with the ring gear 110. The motor, is provided with suitable controls whereby the frame 102 is selectively rotatable about the vertical axis which passes through the pin assembly 202. The base 201 includes a horizontal rearwardly extending portion 207 and a laterally extending portion 208. The extending portion 208 (see FIG. 2) provides a platform supporting a power source 209.

The power source may be diesel engine, a gasoline engine or the like and in the event hydraulic motors are used to drive the tractor and drive the processing units to be described hereinafter, a plurality of hydraulic pumps are driven by the power source. In FIGS. 2 and 3 three hydraulic pumps P210, P211 and P212 are shown secured to a transmission 213 driven by the motor 209. Electrical generators would be substituted for the hydraulic pumps in the event electrical motors are used.

Controls for the motors are located on a control panel C.P. on the platform forwardly of the motor. The controls may be located at any place in the machine which provides a convenient location for the operator.

The frame 200 further includes a pair of laterally spaced generally upright A frames 215, each of which is notched at the upper edge thereof as at 216 for, as will be seen hereinafter, pivotally supporting the boom and winch assembly 400. Each frame 215 has a horizontal bar 217 apertured to receive a pin 218. A hanger 219 is suspended from the bar 217 by the pin 218 and pivots about a horizontal axis transverse of the machine. Each hanger is apertured so as to provide a collar 220 for receiving a tubular beam of the sub-frame assembly 300 to be described in detail hereinafter.

The pair of A frames 215 are disposed in spaced relationship laterally of the machine and the upper end of each frame, extending roughly from the cross bar 219 upwardly, slopes inwardly toward the other frame. This positioning provides a relatively wide space between the frames adjacent the lower end for receiving the sub-frame assembly therebetween, and a relatively small space at the top to provide a rigid support for the boom and grapple assembly.

In the machine illustrated in FIGS. 4 to 7 inclusive, the frame 200 consists of a base 201A supported upon the upper surface 114A of the inner ring 112A of the mono-race. The base is rigidly secured to the inner ring 112A to rotate and be guided by the mono-race. This race replaces the pivot assembly 202 described in the other embodiment. A hydraulic motor M5 is secured to the base and includes a pinion 206A meshing with the ring gear 110A. The hydraulic motor is driven by a pump P1 such pump being driven by the main power source 209. The base includes a rearwardly extending portion 207A having the cradle 500 detachably secured thereto. The base also includes a laterally extending portion 208A providing a platform for supporting a motor or power source 209 thereon as is the case in the other embodiment. Forwardly of the motor is a cab assembly 221A housing the controls on a control panel C.P. and providing an enclosure to protect the operator.

Detachably, but rigidly secured to the base, and projecting upwardly therefrom in laterally spaced relationship is a pair of A frames 215A. The pair of A frames each form a cradle pivotally to support a tubular beam and the pair of frames together form a cradle pivotally to support the sub-frame assembly 300 to be described hereinafter. Each of the A frames (see FIG. 13) consist of a welded I beam construction forming a pair of legs 250 and 251 interconnected at the upper end by a beam 252. The I beam consists of a web 253 extending transversely of the machine and a pair of flanges 254. Each flange 254 in the beam portion 252 is notched as at 256 for receiving a pin pivotally to mount the sub-frame assembly 300 thereon. A tubular beam to be described later with reference to the sub-frame assembly is pivotally mounted by the pin and disposed between the pair of flanges 254. Pivotal movement of the beam is limited by a spaced pair of stop members 257 and 258. The stop 257 consists of a rubber pad 259 secured to a lug 260 mounted on a plate 261 interconnecting the flanges 254 and 255. The stop 258 consists of a rubber pad 262 secured to a bar 263 by a mounting bracket 264. The bar 263 is rigidly secured to and traverse the flanges 235 and 254. The rear stop 258 is located such that the beam is substantially horizontal when in abutment therewith and the stop 257 is vertically therebelow such that the beam dips downwardly forwardly approximately 30° when in abutment therewith. It is conceivable that the rubber stops on the abutments both at the front and rear may be provided with adjustable mountings such that the limit of pivotal movement can be varied. The stops may, for example, be supported upon hydraulic cylinders. Alternatively, the beams may be connected to respective ones of the A frames or the frame 200 by hydraulic cylinders.

Secured to each of the legs and projecting upwardly therefrom is a strut 264. The strut is a tubular member secured to the A frame by a U-shaped member 265. Each of the tubular struts projects upwardly and inwardly towards one another terminating at the upper end in a substantially horizontal portion 266. The horizontal portions are substantially in alignment and disposed in spaced relationship to receive a boom mounting pin 267. The pin includes a central portion separated by a pair of collars 269 and beyond respective ones of the collars is a portion which projects into horizontal portions 266. The boom and grapple assembly 400 is pivotally mounted by a bearing 461 (see FIG. 6) upon the central portion of the pin. The pin projecting end portions and the portion 266 may be rigidly secured together by a bolt by welding or the like so as to rigidify the structure. Reinforcing in the longitudinal direction (see FIGS. 4 and 5) is provided by a pair of bars 272 secured by a pin 273 projecting through aligned apertures in lugs 274. The lugs 274 are secured to the strut portion 266 and the latter portion is reinforced by gusset members 275. The bars 272 extend rearwardly and are rigidly secured at their oposite ends to a framework 276 projecting upwardly from the base rearwardly projecting portion 207A. Each of the legs is further braced by a pair of rods 277 and 278 anchored to the framework 276. The framework 276 as will be seen hereinafter provides means of securing the cradle assembly on the machine and consists of a pair of uprights 279 interconnected at their uppermost end by a cross-member 280 (see FIG. 6).

SUB-FRAME ASSEMBLY AND COMBINATION AND SUB-COMBINATIONS OF PROCESSING UNITS

The sub-frame assembly 300 is mounted on the frame 200 to pivot about a substantially horizontal axis transverse of the machine. The sub-frame assembly 300 (see FIGS. 10 and 11) consists of a pair of spaced, substantially parallel, tubular beams 301 interconnected and secured rigidly together by a plurality of processing units detachably secured thereto. The processing units, some of which will be described in detail hereinafter, include a delimber 600, feed rolls 800, a debarker 700 and a slasher 900 which may be used in various combinations or sub-combinations depending upon the desired tree processing operation. In FIGS. 1–3, and 9 each of the beams 301 is suspended substantially intermediate its ends on the pair of hanger assemblies 219. Each hanger, as described, includes an aperture providing a collar 220 for receiving the beam. The collar permits the beams to be slid therealong such that the hanger can be positioned to balance and thus retain the processing units in a normal desired rest position with respect to the horizontal, the purpose of which will become more apparent hereinafter.

In the embodiments illustrated in FIGS. 4 to 7, 10 and 11, each of the beams 301 is pivotally supported on the A frames 215A by a block 302 having trunnions 303 projecting therefrom. Each block is apertured to receive the tubular beam such that the beam may be slid therealong. A set screw arrangement may be utilized to lock the beam and block in a fixed relative position, or alternatively, the trunnions 303 may be replaced by a single pin extending through the block and aligned apertures in the beam. The trunnions 303 are received in the notches 256 and thereby pivotally mount the beams in respective ones of the A frames.

Figure 12:
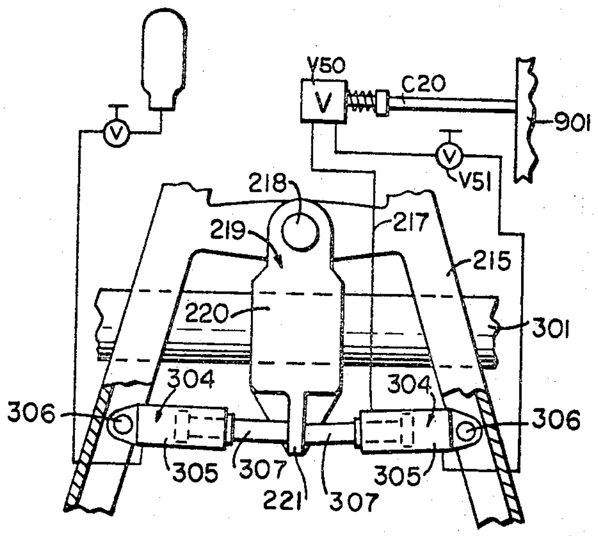
FIG. 12 is a side elevational view, partially in section, illustrating in detail the mounting, for a sub-frame assembly on a tractor unit of the type illustrated in FIG. 1.
Figure 13:
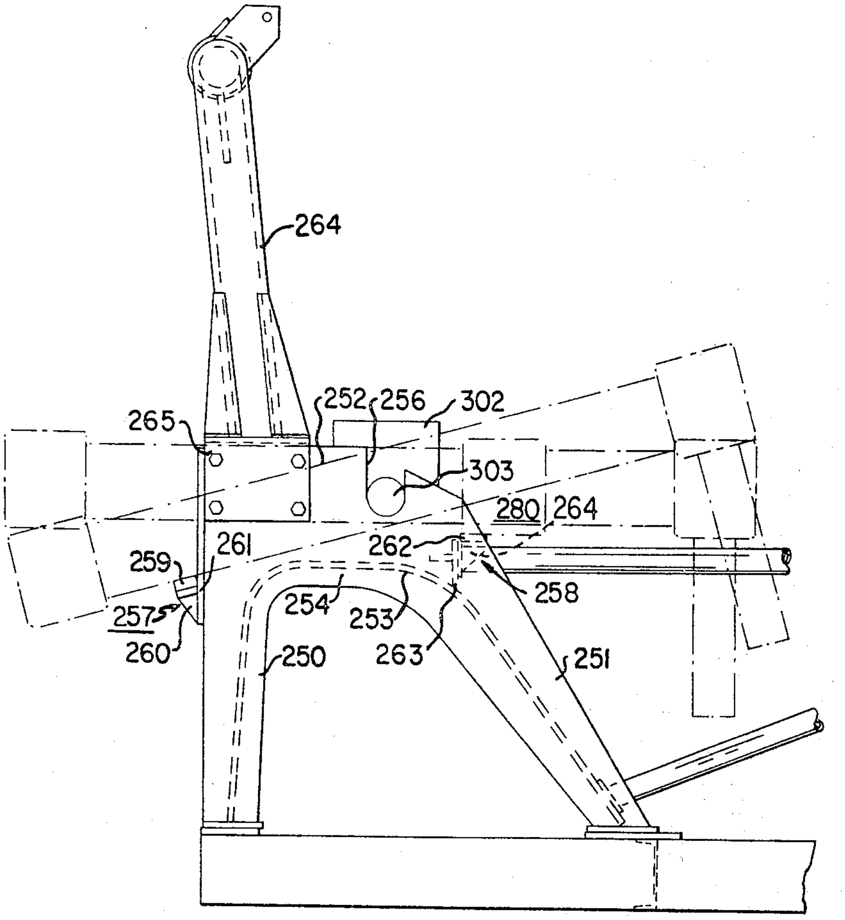
FIG. 13 is a side elevational view of a portion of the mounting frame on the machine illustrated in FIGS. 4 to 7 inclusive.

The beams may be free-floating; that is, free to pivot about the horizontal axis as illustrated for example in FIG. 13, or alternatively, the beams may be controlled so as to selectively adjust the angle of inclination thereof with respect to the horizontal. In FIG. 12, a pair of hydraulic cylinders 304 are shown interconnecting the beams 301 and respective ones of a pair of legs of the A frames 215. Each of the hydraulic cylinders includes a cylinder 305 pivotally connected to the A frame 215 by a pin 306 and a movable piston rod 307 anchored to a lug 221 fastened to and extending downwardly from the hanger assembly 219.

The hydraulic cylinders may be of a double or single acting type arranged in such a manner as to provide positive control in each of two directions about the pivot axis provided by the pin 218.

The hydraulic cylinders 304 may be controlled so as to lock the sub-frame assembly in a selected position during a certain interval in relation to a selected phase of the tree processing operation. The cylinders during the remaining processing operation would be such as to allow the frame to pivot freely. Locking of the sub-frame is sometimes desirable during the interval the tree trunk is being cut by the shears. This would be so, where, for example, the shears are mounted in a manner so as not to pivot with the sub-frame assembly.

The sub-frame assembly 300 can be removed from the machine as a single unit, however, in the embodiment of the machine shown in FIGS. 1 to 3 inclusive and 12, it is necessary to remove the pins 218. To effect this, the sub-frame assembly must be supported to relieve the force on the pins. After removal of the pins, the entire sub-frame assembly may then be carried horizontally forwardly or rearwardly to remove it from between the A frames 215. Removal, may be effected but in some instances may be somewhat awkward. Also supporting the assembly while inserting the pin also may be difficult. In the embodiments illustrated with reference to FIGS. 4 to 7 inclusive, the notch 256 in the upper edge of the A frame permits the entire sub-frame assembly 300 to be removed by lifting it vertically so as to remove the trunnions or pins 303 from the notch 256. The weight of the unit retains the sub-frame assembly in position; however, locks may be provided if necessary in field operation.

The sub-frame assembly 300, as previously mentioned, includes a plurality of processing units detachably secured thereto. Each of the processing units except the shear unit is detachably secured to the beams by collars either having removable cap portions partially embracing the beam or entirely embracing the beam and slidable off the end thereof. Respective ones of a pair of collars on the processing units is located at opposite edges of the processing units. An important feature is that the processing units are individually mounted and are removable. This facilitates removal of the unit requiring repair and a further workable unit may be substituted therefor cutting down lost time in field operation. The detachable independent securement of each unit facilitates substitution of one unit for another and removal of units to provide various combinations and sub-combinations of processing units that may be desired.

Figure 9:
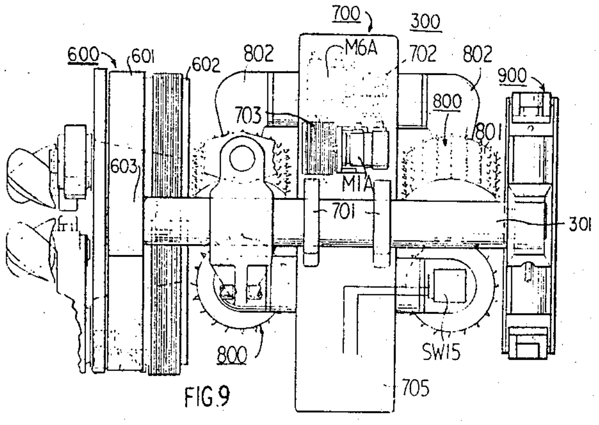
FIG. 9 is a side elevational view of a sub-frame assembly consisting of a delimber, a debarker, and a shear or slasher unit, together with two sets of feed rolls mounted on a pair of beams.
Figure 11:
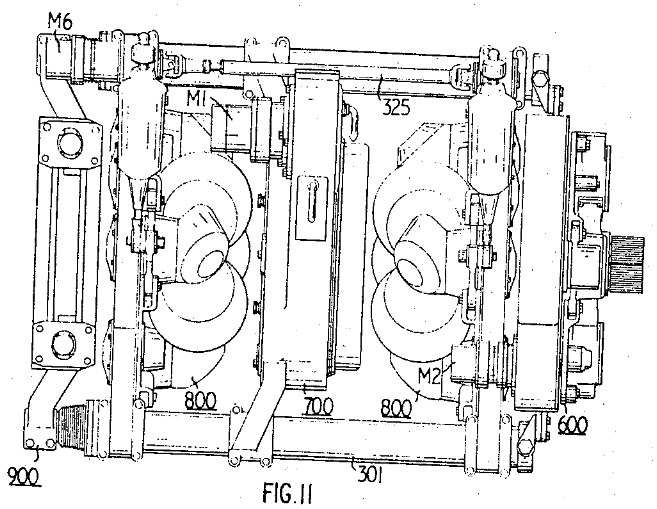
FIG. 11 is a top view of the processing units secured to a pair of beams shown in FIG. 10.

FIGS. 9 to 11, inclusive, illustrate the combination of a delimber unit 600, a debarker unit 700, two sets of feed rolls 800 and a shear unit 900.

In FIG. 9 it will be noted that there are two sets of feed rolls 800 and that such sets are secured to the debarker unit 700. In the embodiment illustrated in FIG. 10, there are two independent sets of feed rolls having their own individual frame detachably secured to the beams.

The telescopic boom and grapple assembly 400 provides means for selecting, lifting and feeding the lifted end of a tree directly into the first processing unit.

In the combination of processing units illustrated in FIG. 9, the delimber 600 is driven by a hydraulic motor M2A (FIG. 60). The debarker 700 is driven by a hydraulic motor M1A and the two sets of feed rolls are driven by a single hydraulic motor M6A. In the combination of the processing units illustrated in FIGS. 10 and 11, the delimber 600 and the debarker 700 are driven respectively by hydraulic motors M2 and M1. One set of feed rolls 800 is driven by a hydraulic motor M6 and the other set of feed rolls is driven by the same motor through a propeller shaft 325.

FEED ROLLS

In processing trees, the boom and grapple to be described hereinafter lifts the tree and feeds it directly to the first unit in the sub-frame assembly. The tree as it passes through is then picked up and continued to be fed through the processing units by the feed rollers 800. One or two sets of feed rollers may be used as previously described. Utilizing the feed rollers, the boom and grapple is free to select the second tree and bring it to the processing units to be processed as soon as the first tree is completed or has passed through the first of the processing units.

Figure 14:
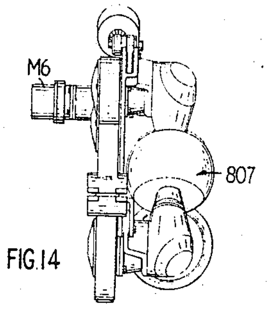
FIG. 14 is a side elevational view of one independent set of feed rolls.
Figure 15:
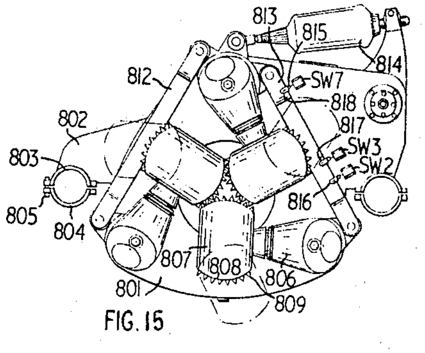
FIG. 15 is a front vertical elevational view of FIG. 14.

FIGS. 14 and 15 respectively are a side and front elevational view of one set of feed rollers 800.

In U.S. Patent 2,857,945 issued Oct. 28, 1958 to P. G. Brundell et al., the debarker and feed rolls are mounted on a common frame. In order to provide a relatively versatile processing assembly, it is preferable that the feed roll sets be each mounted on their own frame independent of the other processing units. Not only does this facilitate servicing and installation of the feed rollers, but also it permits adjustment of the relative position of the feed rollers with respect to the remainder of the processing units. Shown in FIGS. 14 and 15, the feed roll assembly 800 consists of a frame 801 having arms 802 projecting outwardly from opposed edges. These arms each include a collar having a bearing surface 803 for resting upon the upper surface of respective ones of the tubular beams and a cap 804 detachably secured thereto clampingly to engage the beam 301. Bolt and nut assemblies 805 are used to tighten the cap onto the extending leg and the feed roll assembly is thereby securely fastened to the beam 301.

Figure 4:
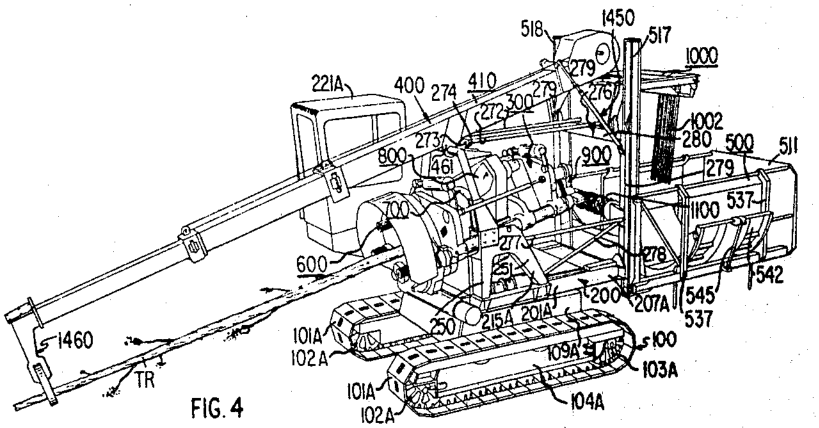
FIG. 4 is an oblique view of a modified mobile processing machine.
Figure 5:
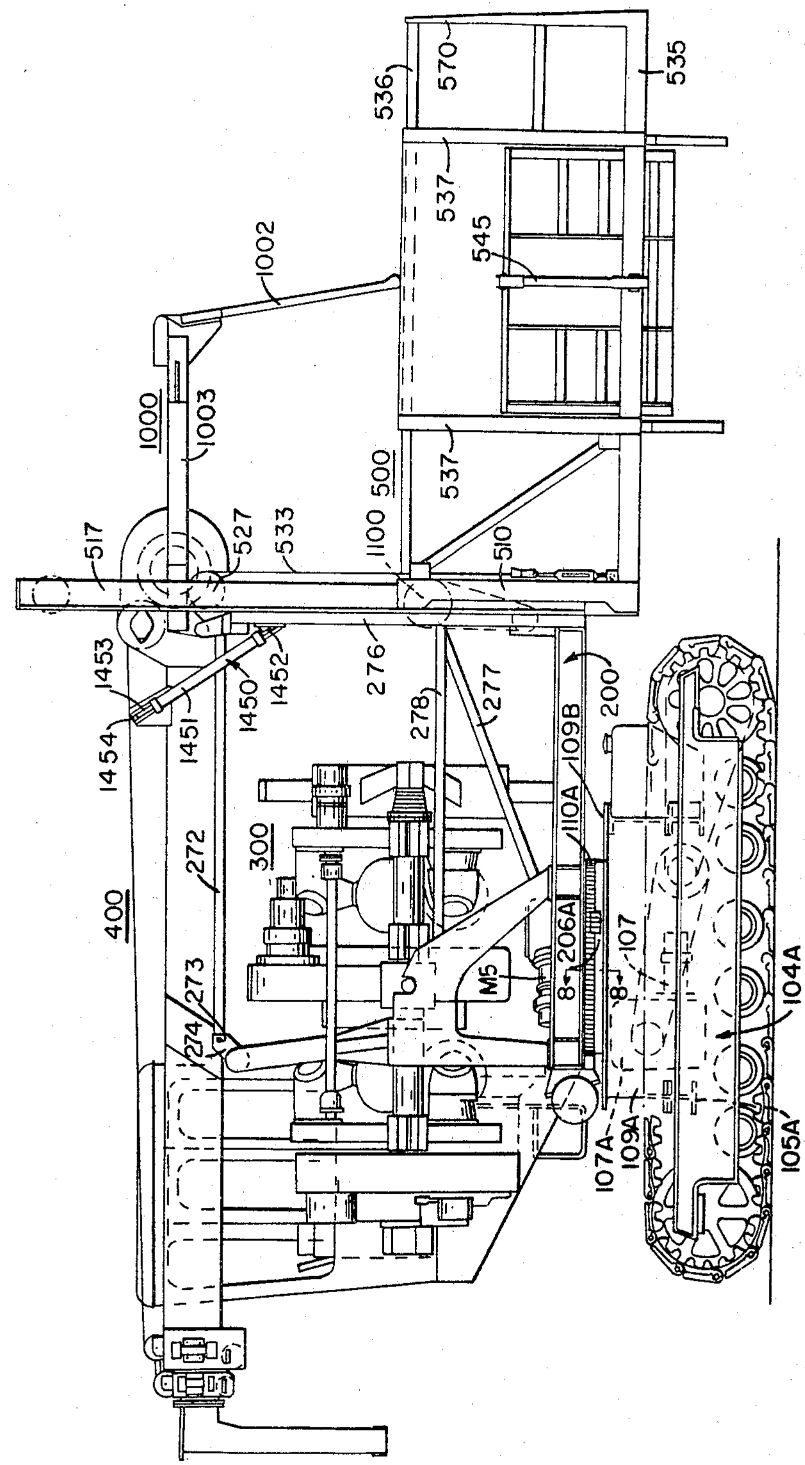
FIG. 5 is a side elevational view of the machinse illustrated in FIG. 4.
Figure 6:
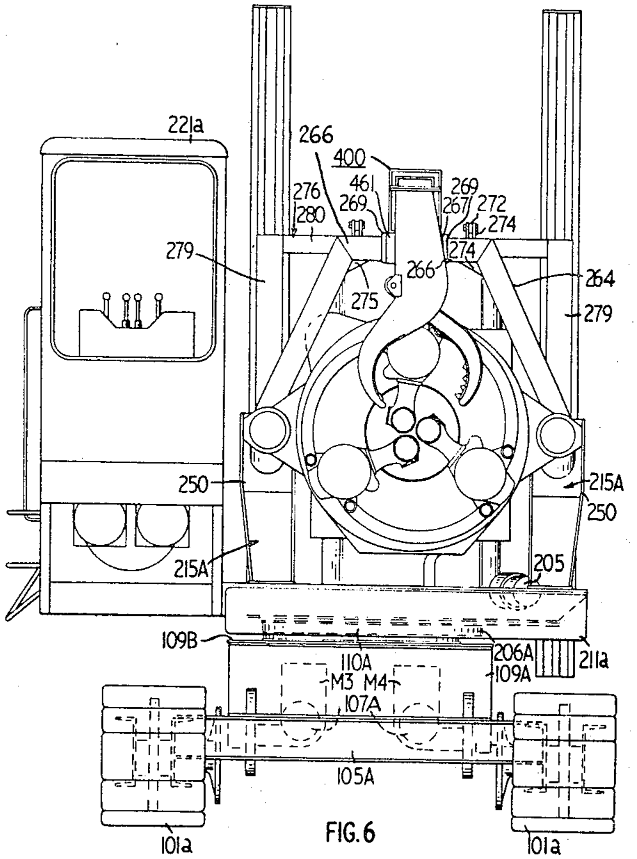
FIG. 6 is a front elevational view of the machine illustrated in FIGS. 5 and 6.
Figure 7:
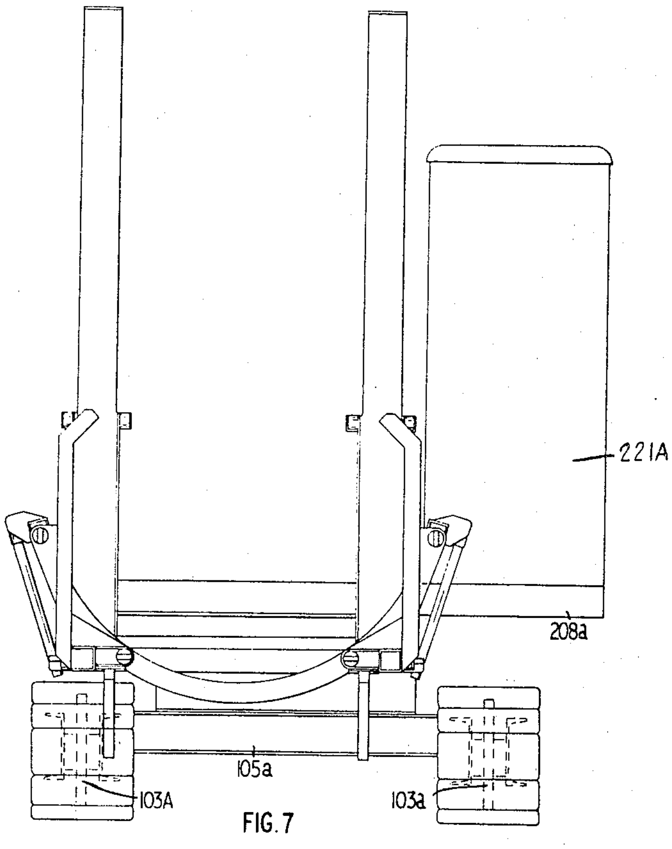
FIG. 7 is a partial rear elevational view of the machine illustrated in FIGS. 4 to 6.

The mounting arms on the various processing units are a rather important feature since such mounting provides detachable securement of the processing units to the beams. The collar for mounting the feed roll is split along a horizontal diameter. Three arms 806 are secured to the frame and are pivoted about an axis parallel to the beams 301. The arms are directed towards one another and each arm has a roller 807 pivotally mounted on the free end thereof. Each of the rollers has an arcuate surface 808 having a plurality of spikes 809 projecting therefrom for grippingly engaging the tree surface. As seen in FIG. 15, the arcuate shape of the roller surface permits relatively small trees to be clampingly engaged therebetween and the mounting of each arm is such that as the arm pivots outwardly, the spiked roller thereon does not abut any of the remaining spiked rollers. The arms are biased inwardly to retain the rollers in contact with the tree and the rollers are driven by a motor M6 mounted upon the frame. As seen in FIGS. 4, 5 and 11, when a pair of drive roll assemblies 800 are utilized, a propeller shaft 325 interconnects the two assemblies and thus, only one motor is required to drive the two sets of rollers. This also insures that the two sets of rollers are driven at the same speed. The arms 806 are interconnected by a pair of bars 812 and 813 so that movement of one arm effects movement of the others inwardly and outwardly toward and away from a tree being fed.

The feed rollers are biased inwardly towards the center axis of the feed roll unit, i.e. towards one another by a rubber spring 814. The resilient force of the spring is distriuted to each of the arms through the synchronizing or interconnecting links 812 and 813. In addition to a rubber spring, the spring assembly also may include a hydraulic damping means, a rubber cushion, means for regulating the spring force and means for stopping the motion of the feed rolls towards the center of the frame. The stop of the feed rolls towards the axis may be determined by the desired minimum long diameter. The spring assembly is readily detachable so that the arms can be readily swung outwardly for servicing or gaining access to the interior of the frame 801. The frame 801 may be a frame purely for the support of the feed rolls; however, it also may enclose a debarker, the combination of a debarker and feed rolls being known as exemplified by the aforementioned U.S. Patent No. 2,857,945, issued Oct. 28, 1958.

Three electrical switches SW2, SW3 and SW7 are mounted on the frame 801 of the feed roll assembly and are actuated by movement of the synchronizing link 813. Each of the switches is secured to the frame 801 as by a plurality of bolts or studs and the switch actuating arm extending therefrom has a cam follower 815 rotatably mounted adjacent the outer end thereof. The cam follower 815 of respective switches SW2, SW3 and SW7 engages respective striker plates 816, 817 and 818 mounted on the synchronizing link 813. Each striker plate 816–818 may consist of a generally L-shaped bracket having an elongated slot in one leg thereof whereby such leg may be secured to the synchronizing link by a stud, the elongated slot providing adjustment such that the relative position of the striker portion may be adjusted with respect to the cam follower. The striker plates 816, 817 and 818 are distributed longitudinally along the synchronizing link intermediate the latter's opposed end pivotally secured to the L-shaped arms 806. The switches SW2, SW3 and SW7 sense respectively three diameters so that they are actuated by trees of 3-inch diameter, 1½-inch diameter and 6-inch diameter. Actuation of the switches can be accomplished by selecting proper location for the switches along the length of the synchronizing link. This is so due to the fact the synchronizing link is carried by lugs projecting outwardly from the arms carrying the feed rollers.

SHEAR OR KNIFE UNIT

A shear or slasher unit is mounted on the beams 301 in axial alignment with the other processing units. The shear unit is at the trailing end of the other processing units with respect to the direction of travel of a tree being processed as it passes therethrough and it is mounted to slide axially along the beams. Two different embodiments of a knife of shear unit are illustrated in the drawings.

Referring now to FIGS. 16 to 19 inclusive, the slasher or shear unit 900 is positioned at the rear of the machine and is mounted for limited horizontal movement toward and away from the debarker 700 and the last set of feed rolls 800. The horizontal sliding movement permits severing the delimbed and debarked trunk by the shear unit while the trunk continues to move through the machine. The shear unit may be driven at a speed in timed relation with respect to the tree being processed so that they travel at the same speed during the severing operation. Alternatively, the shear unit may be carried along by the trunk of the moving tree due to engagement of the shear blades with the tree.

Figure 16:
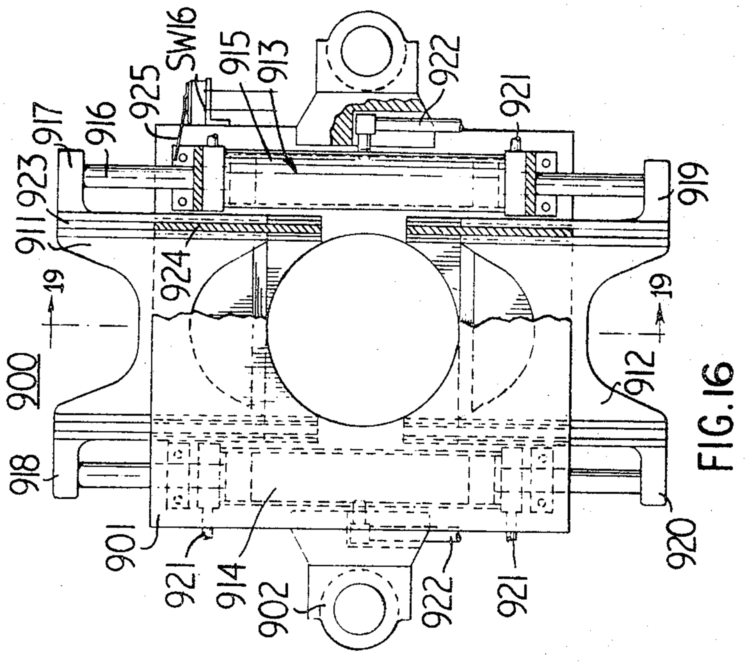
FIG. 16 is a rear elevational view of the shear illustrated in FIG. 9.
Figure 17:
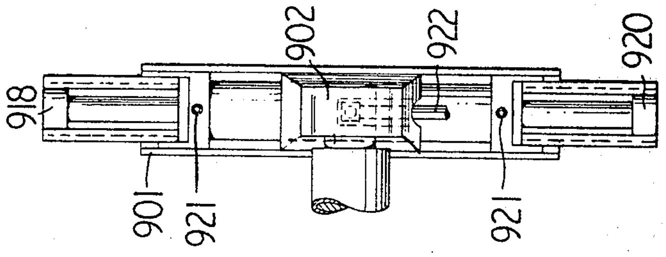
FIG. 17 is a vertical side elevational view of FIG. 16.

The cut-off knife unit shown in FIGS. 16 and 17 consists of a housing 901 secured by a pair of collars 902, one on each of opposite edges of the housing to respective ones of a pair of tubular beam members 903. The beam members 903 extend forwardly parallel to and in telescopic relationship with respect to the beams 301. Each tubular member 903 is carried on a pair of spaced apart bearings 904 which are generally annular sleeves thereby fixing the tubular member 903 in spaced relation inwardly with respect to the beam. For purposes of illustration and clarity, only one beam 301 is illustrated in section in FIG. 18 with the beam support collar and the processing unit supports removed. The beam as shown in broken section in FIG. 18 is the full extent of the beam; the end of beam shown at the left being the forward end of the beam adjacent the delimber.

A rod 905 is fixed at one of its ends to the forward end of tubular beam 301 by a collar 906 and extends rearwardly through the tubular beam 903. At its other end the rod 905 is provided with a nut and collar 907, slidably fitting within the tubular beam 903. Each beam 903 is open at its free end disposed within the beam 301 and such open end has a seat provided by a sleeve 908 fixed by welding or in any other suitable manner. A compression spring 909 is located in each beam 903 and is seated at one of its ends on the collar 907 and, at its opposite end, on the sleeve 908. The compression spring accordingly anchored at opposed ends respectively to the beams 301 and 903, retains the telescopic beams in a retracted rest position as shown in FIG. 18.

Figures 18, 19:
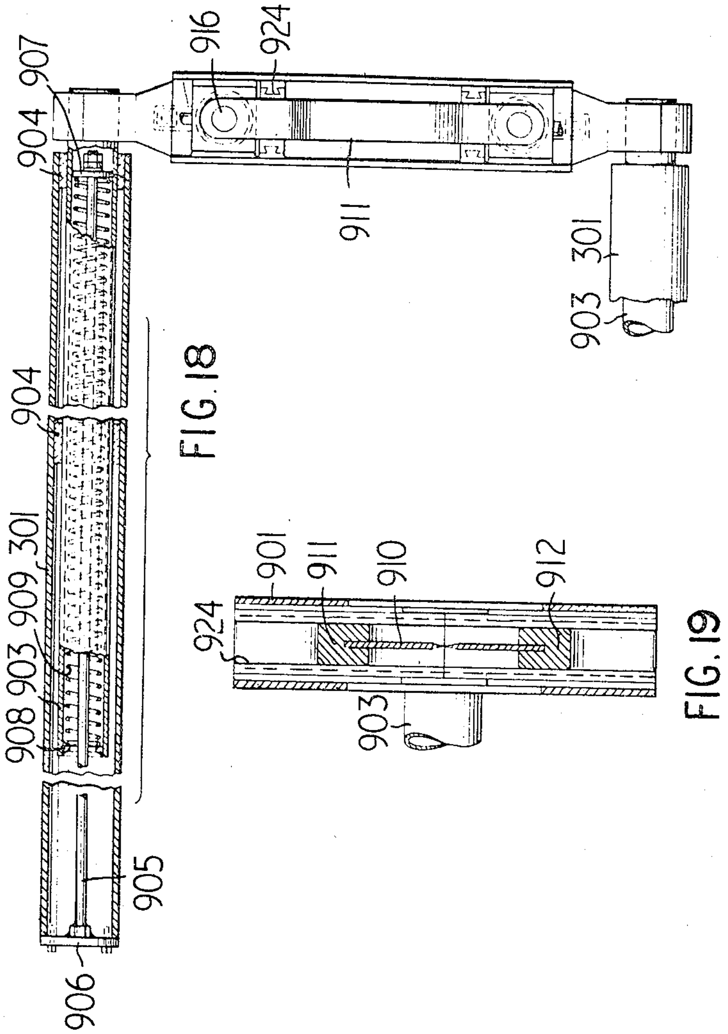
FIG. 18 is a plan view of FIG. 16 illustrating the mounting in partial section.
FIG. 19 is a vertical sectional view along section 42—42 of FIG. 16.

As shown in FIGS. 16 and 19, a pair of knives 910 are carried by respective ones of yokes 911 and 912 mounted for reciprocation toward and away from each other in the knife housing 901. Housing 901 is open at its center to receive a tree trunk when knives 910 are open or away from each other. Each of the hydraulic cylinders 913 consists of a cylinder 915 having a pair of piston rods 916 projecting from opposed ends thereof. The piston rods 916 of cylinders 913 and 914 are secured respectively to lugs 917 and 918 projecting outwardly from the upper end of the yoke 911. The piston rods 916 at the opposite end of the cylinders 913 and 914 are secured to a similar pairs of lugs 919 and 920 projecting outwardly from the yoke 912.

Opposite ends of each of the cylinders 913 and 914 are connected to a fluid pressure supply by conduits 921 and intermediate the ends is connected by a conduit 922. The cylinder and piston arrangement is double acting, that is, the yokes and knives are actuated in both directions by fluid pressure. When fluid pressure is admitted through the conduits 921 the knives are actuated toward each other and when fluid pressure is admitted through conduit 922 the knives are driven away from one another.

Each of the yokes 911 and 912 is guided by a pair of grooves 923 in each of the opposite faces slidingly engageable with respective ones of flanges 924 projecting inwardly from the shear frame 901.

A spring biased, normally open switch SW16 of a conventional type is attached to the housing 901, the actuating arm 925 of the switch being positioned with its forward or free end in the path of travel of lug 917 on the yoke 911. Switch SW16 is connected in circuit with switch SW15 and, as will be more apparent hereinafter, is closed upon actuation of arm 925 by the lug 917. When the knives close, the lug 917 contacts the arm 925 at or near the end of the yoke's inward travel.

In its normal position, with the knives open, cut-off knife 900 is held in a retracted position with respect to beams 301 by the springs 909. When the cylinders 913 and 914 are actuated to move knives inwardly into contact with a tree trunk fed therethrough the housing 901 and thus the entire shear unit 900 is moved rearwardly by the advancing tree trunk, compressing springs 909. The springs 909 return the knife unit 900 to its initial or forward position at the rearward ends of beams 301 when the knifes are removed outwardly out of engagement with the tree trunk.

A modified type of shear unit is illustrated in detail in FIGS. 20 to 26 inclusive.

The shear unit 900 illustrated in FIGS. 20 and 21 consists of a pair of frame members 941 and 942 detachably secured together by a plurality of studs 943. The frame 941 consists of a rear backing member 944 of hollow construction and it includes a central aperture 945. A pair of side wall members 946 are secured respectively to a pair of opposed marginal edges of the rear backing plate and project forwardly therefrom. An arm 947 is secured to each one of the walls 946 and is a generally box shaped member extending outwardly and forwardly therefrom terminating in a split collar 948. A pair of studs 949 are threaded so as to tighten the collar onto a tubular member 950. The front and rear face plates and the side walls together form a pair of channels each having wear plates 951, 952 and 953 secured to the walls thereof. An upper and lower knife mounting yoke respectively 954 and 955 are slidably mounted and guided for vertical movement in these channels. A pair of ears or lugs 956 and 957 are secured at each of opposite edges of each of the yokes and these ears slidably engage the wear plates. A hydraulic cylinder 958 is pivotally mounted at each end of the guide channel and the movable piston rod 959 is pivotally connected by a flattened end portion located intermediate the ears 956 and 957 by a pin 960. Each hydraulic cylinder is mounted within the channel by a pair of trunnions 961 projecting outwardly and disposed in journals 962 secured respectively to the front and rear plates 942 and 944 of the frame. The journal 962 fits into an aperture in respective ones of the plates. Each side wall 946 has a removed end section providing an aperture for access to the pivot pin fo rease of insertion and removal of the bushings. The hydraulic cylinders are removable by dismounting the cover plate 942. The front and rear plates of the frame are further interconnected and reinforced by an apertured plate 963 secured thereto by a plurality of studs. The cylinder of the hydraulic assembly passes through the aperture and projects outwardly from the frame.

A shear blade 964 is secured to each one of the yokes by a plurality of bolt and nut assemblies 965. As shown in FIG. 22, the yoke is provided with a recess 966 providing a ledge 967 abutting the outer peripheral edge of the blade 964. The bolt and nut assembly 965 clampingly presses an arcuate plate 968 against the periphery of the knife. The upper yoke has a bore 969 (see FIG. 28) extending therethrough adjacent each corner and terminates at the lower edge thereof. A plunger 970 extends through the bore and is biased downwardly by a compression spring 971. A pair of microswitches SW5 and SW6 are detachably secured to the yoke by a plurality of studs 972 and the actuator thereof is adapted to be engaged by the plunger 970 in respective ones of the bores 969. The plunger projects below the yoke so as to be engaged upon closing of the shears by the lower yoke. As will be seen hereinafter the microswitches effect reversal of the yokes to open the yokes after the shear has closed cutting the tree.

The shear 900 illustrated in FIGS. 20 and 21 is also mounted so as to move along with the log during a severing or cutting operation. The shear is a guillotine type and may be referred to as a flying shear because of the particular mounting. Referring to FIGS. 23, 24 and 25, each of the collars 948 is secured to the tubular member 950 disposed in sliding telescopic arrangement within the beam 301. The beam 301 at the rear end has an outwardly directed flange 974 rigidly secured thereto. A cap member 975 is detachably secured to the flange by a plurality of studs 976 and the tubular member 950 passes through an aperture 977 in the cap. A seal member 978 is secured to the cap and slidingly engages the outer surface of the tubular member. A rubber bellows type collar 979 is anchored at one end to the cap 975 and at the other end to a collar 980 fixed to the tubular member 950.

Three roller assemblies 981 each consisting of two rollers 982 mounted on spaced, generally parallel shafts 983 are secured to the tubular member 301 adjacent the cap end. The rollers are mounted upon a ring-like sleeve 984 which fits into an enlarged area adjacent the rear end of the beam and retained in position by the cap member. The rollers project inwardly of the sleeve and rollingly engage the outer peripheral surface of the tubular member 950. The member 950 carries at its leading end three roller assemblies 985, each consisting of a pair of rollers 986 secured by shaft 987 to lugs 988 on an annular sleeve 989. The annular sleeve is secured to the leading end of the tubular member 950 and retained in position by, for example, a C ring. The roller assemblies at the leading end of member 950 rollingly engage the inner peripheral surface of the tubular member 301. The roller assemblies at the leading end of the member 950 and the roller assemblies at the capped end of member 301 provide spaced guide rollers for the telescopic movement of each member 950 inwardly and outwardly with respect to the tubular beam 301.

The tubular member 950 is biased to a retracted position by a compression coil spring 991 which is anchored at one end to the tubular member 950 by a collar 992 and at the other end to a flange 325 on the tubular beam 301. The latter anchor is provided by a bolt 993 having a collar 994 retained thereon by a nut 995.

The shear is carried on the end of the tubular member 950 projecting outwardly of beam 301, the telescopic mounting permitting the shear to move as a unit horizontally to the right as viewed in FIG. 23. It is normally at a rest position and biased to that position as shown in FIGS. 10 and 11 by the previously described coil spring.

The switches SW5 and 6 illustrated in FIG. 23 mounted on the yoke 954 may be replaced by a single switch mounted in a manner as illustrated for example, in FIGS. 26 and 27. Referring to these latter drawings, a switch SW5' is secured to the back housing member 944 of the shear by brackets 996. The switch is recessed partially in the plate 944 by projecting through an aperture in the rear wall and is protected by a cover plate. A switch actuating lever arm 997 projects forwardly toward the front wall 942 and carries a cam roller 998 on the free end thereof. A striker plate 999 is adjustably secured to the yoke 954 by a pair of slotted bracket members 1901 and studs 1902. Sliding movement of the brackets 1901 and thus the striker plate 999 provides means of adjusting the relative position of the cutter knives at a shear closed position.

A further electrical switch SW9 is mounted upon the frame and includes a lever actuating arm 1903 adapted to about the yoke 954 when the latter is in a shear fully open position. A further switch SW8 having an actuating lever arm 1904 is mounted on the shear frame such that the lever arm is adapted to abut the yoke 955 when the shears are in a partially open position. The switches SW8 and 9 respectively are actuated by the yokes 955 and 966; however, this need not be so as both switches could be actuated by the same yoke. Each of the switches SW8 and 9 are mounted on the shear frame by brackets 1905. The brackets may be provided with slotted apertures whereby the switches are adjustable. The adjustable mount permits or allows for lag in effecting operations actuated by the switches.

CLEARING ROLL

A clearing roll 1100 is mounted upon the uprights 279 of the frame vertical wall 276. The clearing roll is located somewhat below the axis of the feed path followed by a tree being processed as it passes through the processing units. The clearing roll consists of a hub 1101 mounted upon a shaft 1102 journalled by bearings 1103 and 1104 mounted by brackets 1105 and 1106 to respective ones of the pair of vertical uprights 279. A series of serrated discs 1107 project outwardly from the hub and are disposed in horizontal spaced relationship. The serrations of adjacent discs are offset as will be seen in FIG. 31 to provide maximum gripping force with the surface of the processed tree. The speed-up roll is driven substantially at the same speed as the feed rolls by a hydraulic motor M7 and assists in delivering the processed cut log from the processing units into the cradle.

The motor M7 drives the clearing roll 1100 through a chain 1108 and sprockets 1109 and 1110 secured respectively to the motor and the roll shaft 1102.

RECEIVING AND STACKING

A cradle 500 is secured to the frame 200 at the trailing end thereof for receiving and stacking the processed tree bolts. Two embodiments of the cradle are illustrated in the drawings.

In FIG. 1 the cradle 500 consists of the base 501 having a plurality of posts 502 projecting upwardly therefrom adjacent a pair of opposed marginal edges. The base 501 is detachably secured to the frame 200 by bolts or the like and in trailing relation immediately rearwardly of the last processing unit which in FIG. 1 is the shear unit 900. The processed logs cut by the shear unit are dropped into the cradle and retained by the latter in a neat stacked arrangement. A tail gate or wall 503 projects upwardly from the cradle base at the rear end to form an abutment for the logs being dumped into the cradle. If desired, the entire cradle can be detached from the frame and the cradle together with the stacked logs loaded on to a truck so that they may be hauled away. Alternatively, a fork lift truck may be used to lift the stacked logs off the cradle by having the forks thereof inserted under the logs. As a still further alternative, a pair of flexible cables 504 may be supported directly upon the cradle platform 501. When the cradle is full, these cables may be looped around the logs and later locked together so that each cable encircles the pile of logs. These flexible cables may then be used to lift the entire stack by a crane from the cradle into a tractor or truck used to haul away the processed logs. In the event the cradle 500 is detached and hauled away, a further cradle is then secured to the machine for receiving a second load of processed tree bolts.

In the embodiment illustrated in FIGS. 4 to 7, inclusive, the cradle 500 is mounted on the frame 200 so as to be vertically movable. The cradle 500 includes a frame having respective front and rear walls 510 and 511 and a pair of side walls 512 and 513. A gate 514 is provided in the bottom by a pair of slidably mounted doors. The wall 510 includes a pair of rollers 521 and 522 mounted at each of the vertical four corners, each pair of rollers being disposed in a pair of opposed tracks 515 and 516 provided by a pair of vertical uprights 517 and 518. Each of the uprights 517 and 518 consists of a pair of channel members disposed back to back and in spaced relationship. The flanges of the channels are directed outwardly thereby providing a pair of opposed tracks 515 and 516 in each upright. The channel members are interconnected at a series of vertical positions by interconnecting bar members 520. The uprights are detachably secured to respective ones of the pair of members 279 by bolt and nut assemblies. The rollers 521 and 522 are journalled to a bracket 523 which is secured to the end wall 511. The cradle 500 effectively is cantilevered out rearwardly from the main frame 200 and is supported by the frame 276. The vertical uprights 517 and 518 provide guides whereby the cradle is vertically slidable.

A hydraulic cylinder 524 consisting of a cylinder 525 and a movable piston rod 526 is mounted in each of the uprights 517 and 518 intermediate the channel members. The cylinder 525 is anchored rigidly to the channels and the piston rod has a pulley 527 journalled on a U-shaped clamp 528 secured to the free end thereof. Each channel has a pair of flat bars 529 and 530 secured to the web and running longitudinally along the channel to provide a guideway 531. The pulley or sheave 527 is pivotally mounted on the clamp 528 by a pin 532. The pin projects beyond the clamp at each side and the piston rod is thereby guided during vertical movement. A pair of flexible cables 533 are anchored at one end to the cradle 500 by a turn buckle 534 and they are anchored at the other end to respective ones of the uprights 517 and 518. The cable intermediate the anchored end passes over the pulley 527 on respective ones of the hydraulic cylinders 524. It is thus apparent that actuation of the cylinders effects raising and lowering of the cradle. In FIG. 32, the lowermost position of the cradle is shown in solid line and the uppermost position is illustrated in phantom.

Each of the side walls 512 and 513 of the cradle is defined by a horizontal beam 535 at the lower edge and a horizontal bar member 536, at the upper edge. The beam 535 and bar 536 in each of the walls are joined by a pair of vertical upright members 537. A pair of lugs 538 having a roller 539 journalled thereon project outwardly from each of the uprights 537. A second pair of rollers 540 are journalled to respective ones of a pair of brackets 541 projecting inwardly from each of the beams 535. The gate 514 in the lower part of the cradle consists of a pair of slidably mounted door members 542 and 543. Each door is arcuately shaped and includes a channel 544 in each of the opposed arcuate marginal edges. The pairs of rollers 540 and 539 rollingly engage the channels and thereby provide a sliding guide for the arcuate doors. Sliding movement of the doors is effected by a pair of hydraulic cylinders 545. Each cylinder 545 has one end thereof anchored to the beam 535 and the other end anchored to the door.

The cradle may initially be partially raised and the logs deposited therein as they are processed. The weight of the logs adding to the cradle causing the same to lower controllably by virtue of a flow-control valve in the hydraulic system for the hydraulic cylinders. A full cradle of processed logs may then be raised and the doors actuated to dump the entire load into a truck vertically therebelow for hauling the logs away.

LOG MEASURING APPARATUS AND SHEAR CONTROL

In the embodiment of the machine illustrated in FIGS. 4 to 7 inclusive, there is a log measuring device generally indicated as 1000 consisting of a frame 1001 projecting rearwardly from the cross member 280 of the end frame 276. Depending downwardly from the frame 1001 is a striker 1002 adapted to be engaged by the log as it is fed from the machine by the feed rollers. Pivotal movement of the striker plate actuates a switch SW4 to effect or initiate operation of the shears to cut the processed tree bolt into a selected length. There are several different embodiments of the log measuring device and referring now specifically to FIGS. 4, 5, 37 and 38, the log measuring device 1000 consists of a pair of arms 1003 secured at their leading end to the cross member 280 and uprights 517 and 518. Each arm 1003 includes a bracket 1004 having a flange 1005 which abuts the respective ones of the uprights 517 and 518. The bracket includes a downwardly projecting portion 1006 apertured to receive a pin 1007 whereby it is anchored to a lug 1008. The lug 1008 is rigidly secured to the cross member 280 of end frame 276. This is the frame which provides a mounting for the previously described cradle assembly. In order to remove the log measuring device, the pins 1007 are removed and the entire assembly, lifted vertically from the machine.

Each member 1003 terminates at its rearward end in a laterally inwardly offset portion 1009 which is channel shaped in cross-section reinforced by a gusset 1010. The remainder of the member 1003 is essentially a box beam and the two parts are interconnected by welding or the like. Each channel shaped section 1009 includes an elongated slot 1011 in the web and a further elongated slot in the upper most flange. A plate 1003 is secured to the portion 1009 of the member 1003 by a pair of bolts 1014.

The plate 1013 includes a pair of inwardly directed flanges 1015 and 1016 on the marginal lower edges. The plate 1013 projects upwardly above the channel member 1009 and is reinforced by an angle bracket 1017. One leg of the angle bracket overlies the uppermost flange of the channel 1009 and is secured thereto by a pair of bolt and nut assemblies 1018. The bolt and nut assemblies 1014 and 1018 are slidable respectively in the slots whereby the entire plate 1013 is horizontally slidable forwardly and readwardly to adjust the horizontal position of the striker plate 1002. The striker plate 1002 is pivotally mounted to the bracket 1013 by a rod 1019 and consists of a generally rectangular sheet metal plate having a reinforcing vertical corrugations and transverse reinforcement members 1020. A pair of lugs 1021 are detachably secured to the plate and are apertured to receive a sleeve 1022. The pair of sleeves 1022 are disposed concentrically on the shaft 1019 and project through aligned apertures in respective ones of the angle bracket 1017 and the plate 1013. The sleeve is fixed to the members 1009 and a pin, not shown, through the sleeve and rod retain the same in an assembled position. Mounted on each sleeve 1022, intermediate a pair of collars 1025 and 1026 is a coil spring 1027. Tension of the coil spring is adjustable by a nut threaded on to the sleeve. A spring loaded ball is disposed in the collar 1025 or bracket 1021 and the ball is biased by the spring in a direction toward the other member partially to be received in a notch therein, thereby providing a releasable lock for retaining the flapper plate 1002 in a normal operative position.

The striker plate 1002, or flapper plate as it may be refered to, abuts against the flange 1016 of the bracket 1013 and normally retains the flapper plate in a position rearwardly inclined approximately 10 degrees from the vertical. This places the striker plate substantially normal to the longitudinal axis of the processed tree as it emerges from the processing units and projects therefrom. A switch SW14 is mounted so as to be actuated in response to pivotal movement of the flapper plate. The switch initiates action of the shear unit to cut the processed tree.

One form of shear triggering device or actuation of the switch SW14 is shown in FIGS. 39, 40 and 41, and also shown in these figures is a somewhat modified form of flapper.

The modified flapper or striker plate shown in FIG. 41 consists of a series of bars 1030 each depending from a sleeve 1031. The rod 1019 passes through the sleeves and thereby individually pivotally mounts the rods intermediate the rearward end of the frames 1003. A rod 1032 is suspended from the shaft by a pair of hangers 1033 and rests against a pair of stops 1034 adjacent opposed ends thereof. The rod 1032 bears against the bars 1030 providing a stop therefore and located on the opposite side is a second rod 1035 suspended by three hangers 1036 from the shaft 1019. The hangers 1036 are mounted by sleeves 1037 to pivot on the shaft 1019 and the rod 1035 is resiliently urged against the bars 1030 by a tension spring 1038 anchored at one end to the member 1003 and at the other end to the hanger 1036. Movement of the hangers accordingly, is responsive to pivotal movement of the bars 1030 about the shaft 1019. The bracket 1033 as seen in FIG. 41 also includes a sleeve 1037 mounted so as to pivot on the shaft 1019. One bracket 1033, the one which is located on the left in FIG. 41, includes a rearwardly directed apertured portion intermediate the shafts 1019 and 1032. A hydraulic cylinder 1040 is pivotally secured by a pin 1041 to a bracket 1042 and pivotally secured at the other end by a pin 1043 to the rearwardly extending portion of bracket 1033. The bracket 1042 is anchored to the member 1003.

An impulse micro switch SW14 (see FIG. 42) is secured to the opposite member 1003 and includes a pivotally mounted lever 1046 having a roller 1047 mounted on the free end thereof rollingly to engage a plate 1048 on the bracket 1036. The lever intermediate the roller and pivoted end abuts the micro switch activating member 1049 whereby movement of the bracket from its initial position causes the switch to activate an electrical circuit.

The log measuring assembly illustrated in FIGS. 43 and 44 illustrates a modified frame and modified flapper and a modified switch actuating means. Referring to FIG. 43 a pair of frame members 1003A each consist of an L-shaped bracket 1060 channel shaped in cross-section and pivotally secured at one end by a pin 1061 to the bracket 1008 previously described. Secured to the upper edge of the L-shaped bracket 1060 is a lug 1063 which projects outwardly to bear against respective ones of the uprights 517 and 518. Detachably secured to the L-shaped bracket 1060, is a channel shaped member 1063A. The member 1063A or the member 1060, or both may include slotted apertures or a plurality of apertures whereby the overall length of each of the members 1003A may be extended and retracted.

A modified flapper or log measuring plate 1002A is pivotally secured and depends from the rear end of the member 1063 by a bracket 1064 and a rod 1065.

A pair of brackets 1070 are suspended from the shaft 1065 and are interconnected at their lower end by a horizontal angle member 1071. The flapper 1002A consists of a series of bars 1030A suspended from the shaft 1065 by a collar 1072. The bars are interconnected at their lower end by a cross bar 1068 and each bar is clampingly engaged by a pair of clips 1073 rigidly secured to and projecting rearwardly from the angle member 1071. Each clip includes a flared outer end portion and a pair of clips clampingly engage wear plates on opposed edges of each bar. The resilient clips tend to reduce the rebound of the flapper plate upon its return to the normal rest position.

A log deflector plate 1075 is secured at its forward end to a channel member 1076 interconnecting the members 1003A. The deflector plate 1075 slopes downwardly and rearwardly towards the angle member 1071 and is braced at the rearward end by a bar or brace member 1077 fastened at the opposed end to a channel member 1078 interconnecting the members 1003A.

Each of the brackets 1070 includes a rearwardly extending enlarged apertured portion 1079 intermediate the shaft 1065 and angle member 1071. The hydraulic cylinder 1040 shown in FIG. 40 is pivotally anchored at opposed ends respectively by pins 1041 and 1043 to the member 1003A and one of the brackets 1070.

The hydraulic cylinder 1040 when actuated causes the bracket 1070 to pivot about the shaft 1065 and thereby raise the flapper to substantially a horizontal position. This moves the flapper to a position such that it does not interfere with raising the cradle assembly when the latter is filled with processed logs.

A lug 1082 is shown in FIG. 43 secured to the bracket 1070 and projecting rearwardly therefrom. The lug includes a notch in the lower edge thereof grippingly engaging a lock member 1083. In the event a hydraulic cylinder 1040 is not connected to the bracket 1070, the member 1083 and lug are utilized to lock the bracket in a normal operative position.

A cam member 1088 is secured to the shaft 1065 by a sleeve 1089 and is keyed so as to rotate with the shaft. The switch SW14 is secured to a plate 1092 rigidly secured and depending from the rearward cross member 1078. The switch includes a lever 1093 having a roller 1094 on the outer end thereof, the roller 1094 being a cam follower running upon the surface of cam member 1088.

BOOM UNIT

In the machine illustrated in FIGS. 1 to 3 inclusive, one form of boom and grapple is illustrated while a second form of boom and grapple is illustrated on the machine in FIGS. 4 to 7 inclusive. The boom and grapple in the embodiment of FIG. 1 includes a heeling device for directing the tree to the processing unit as it is being fed or carried by the grapple to the processing unit.

Referring now specifically to the embodiment illustrated in FIGS. 1 to 3, the boom 410 (see FIGS. 46 and 47) consists of four telescopic box members 401, 402, 403 and 404. The outermost box member 401 includes a pair of trunnions 405 projecting outwardly from opposed sides intermediate the length thereof. These trunnions are received in the notch 216 of the A frame 215, the boom and grapple assembly 400 thereby being pivotally mounted upon the upper edge of the A frame with the pivot axis being horizontal and disposed vertically above the longitudinal axis of the processing units. Each of the box members 401, 402 and 403 have respective pulleys 406, 407 and 408 pivotally mounted adjacent their forward end. Lugs 411, 412 and 413 are secured respectively to the trailing end of members 402, 403 and 404. A winch and boom assembly 414 is secured to the outermost box section 401 adjacent the rearward end thereof. The winch includes a pair of drums 415 and 416 of specific related diameters, the purpose of which will be apparent hereinafter. A cable or rope 417 is wound upon the drum 416 and is anchored at the other end to lug 411 and traverses the pulley 406 intermediate the ends thereof. Winding of the cable onto the drum thereby telescopically extends the member 402 outwardly from the member 401. Respective cables 418 and 419 are anchored at one end respectively to members 401 and 402 and at their opposite ends respectively to lugs 412 and 413. Intermediate the anchored ends, the respective cables 418 and 419 pass around or traverse respective pulleys 407 and 408. Through the cable and pulley arrangement described, winding the cable 417 onto the drum 416 simultaneously extends the boom sections outwardly. A cable 420 is wound onto the drum 415 and is anchored at the other end to the rearward end of the inner member 404 by a clevis 421. Winding of the cable 420 onto the drum 415 pulls the innermost boom section rearwardly to a retracted position. Such movement through the cables 417, 418 and 419 simultaneously retracts the outer sections into the outermost section 401.

The extension and retraction of the various sections is guided in movement by a plurality of tracks and wheels. Each of the box members 401, 402, 403 and 404 consists of a pair of opposed side walls 422 and 423, an upper wall 424 and a lower wall 425. A pair of bars 425 and 426 are secured respectively to the inner surface of each of the side walls of members 401, 402 and 403. A roller assembly 427 is secured to each of the side walls of the members 402, 403 and 404, having a roller 428 disposed on the outer surface of the side walls and which is guided between the bars 425 and 426. Such bars effectively provide a track for respective ones of the rollers. Additional rolling support for the section is provided by a plurality of rollers 428A pivotally secured to respective ones of members 401, 402 and 403 adjacent their leading or outer end. The rollers 428A are disposed to be in rolling engagement with the lower wall 425 of the adjacent innermost telescopic member.

The winch 414 is driven by a hydraulic motor M8A through a transmission or gear reduction unit 429. A pair of stops 430 and 431 are secured adjacent respectively the leading and opposing ends of the upper wall 424 of members 402, 403 and 404. These stops abut a member 432 at the leading ends of the adjacent member to limit the inward and outward movement of the boom members.

As previously mentioned, the boom and grapple assembly 400 is pivotally mounted by the trunnion 405 in the A frame 215. Control of the pivotal movement is effected by a pair of hydraulic cylinders 433 connected respectively at opposed ends of the boom 410 and the A frame 215. Each hydraulic cylinder assembly 433 consists of a cylinder 434 pivotally connected by a pin 435 to the A frame 215 and a piston rod 436 pivotally connected by a pin 437 to the boom member 401. The pin 437 is located at a position forwardly of the trunnion 405.

The grapple 460 is suspended from the leading end of boom member 404. The grapple 460 (see FIGS. 53, 54 and 55) consists of a pair of jaws 461 and 462 pivotally suspended by a yoke 463 from a member 464 rigidly attached to the boom. The jaw 462 consists of a pair or arcuate plate members in spaced relationship with the single plate member of the jaw 461 interposed therebetween. The single member of jaw 461 terminates at the upper end in an enlarged hub 465 having an annular ridge 466 in each of a pair of opposed faces. The internal surface of the hub is provided with a plurality of teeth forming an internal ring gear 467. The hub of the jaw member 461 is interposed between the hubs 468 of the pair of plate members forming the jaw 462. The face of the hub 468 includes an annular groove receiving the ridge in the adjacent hub of the other member. The hubs 468 are pivotally secured to the yoke 463 by a pin 469. The axis of the pin is parallel to the longitudinal axis of the boom. A plurality of planetary gears 470 are pivotally mounted on shafts 471 anchored in the hubs 468 of the spaced members. The planetary gears 470 mesh with the internal ring gear 467. A drive pinion 472 is journalled on a shaft 473 driven by a hydraulic motor MG. The shaft 473 is journalled in each of the hubs 468 of the two members forming the jaw 462. The hydraulic motor MG is connected to the hydraulic pump P (see FIG. 59) by a hydraulic line 474 through a control valve C5 to be described hereinafter. The line 474 is carrier on a spring controlled reel 475 rotatably supported on the boom 410. The spring controlled reel allows the hydraulic line to unreel and reel in as the boom is extended and retracted.

The boom and grapple assembly 400 shown in FIG. 1 includes a heeling device 485 located intermediate the grapple and boom pivotal support. The heeling device is adjustable and provides means for raising and lowering the forward end of a log being lifted by the grapple. This facilitates feeding the lifted log to the processing machines, when the log is completely off the ground. The heeling device 485 consists of a wishbone or inverted Y-shaped member 486 having a stem 487 pivotally connected by a pin 488 to a hydraullic cylinder 489. The hydraulic cylinder is anchored by a lug 490 to the boom member 401. The member 487 terminates in a pair of outwardly flared legs 491. The legs are interconnected by a pin 492 and a roller 493 is mounted on the pin. A pair of arms 494 are pivotally connected at one end by a pin 495 to the boom member 401 and at the other end of the Y-shaped member 487 by the pin 492. As seen in FIG. 3 the pair of members 494 are crossed braced by members 496. The pivot pin 488 connecting the hydraulic cylinder and the Y-shaped member is horizontally movable through actuation of the hydraulic cylinder effectively to vary the vertical height of the roller 493. The roller is adapted to engage a tree suspended horizontally from the grapple and provides means for changing the horizontal attitude of the tree.

In the machine illustrated in FIGS. 4 to 7 inclusive, there is a modified boom and grapple assembly. Details of such are illustrated in FIGS. 48 to 52 inclusive.

Shown in FIG. 48 the boom consists of a fixed section 1401 and two movable sections 1403 and 1404. Each of the movable sections is guided by a pair of rollers 1405 secured one to each of the side walls 1406 and 1407 of the members 1401 and 1403. The rollers are mounted by a pin 1408 secured to the side wall and disposed vertically. The roller projects through the side wall of the member to which it is attached and engages the side wall of the adjacent telescopic member. Each of the members 1401 and 1403 has horizontally disposed rollers secured to the leading edge thereof to engage the adjacent movable member. A pair of rollers 1410 and 1411 are secured respectively to the upper and lower trailing ends of the movable members 1403 and 1404. These rollers engage respectively the upper and lower inner surface of the adjacent boom member. The movable sections are by the foregoing rollers fully guided and supported during extension and retraction of the boom. Additional guide in movement is provided by a circumferential groove 1412 in the uppermost roller 1410. A guide bar 1413 is rigidly secured to the upper wall of the adjacent member so as to be disposed in the groove 1412 and thereby guide the members. The lower roller 1411 may be a similar construction or alternatively as shown in FIG. 50 consist of a pair of rollers **1411*a* and 1411*b* secured in spaced relationship along a shaft 1414. A bar member 1415 is secured to the lower wall of the outer member on the inner face thereof and is disposed between the rollers. The bars 1413 and 1415 extend longitudinally of the boom. The bars 1413 and 1415 not only provide a guide but additionally perform the function of connecting two U-shaped channel members to form the box shaped boom section. In the lower roller assembly the pin 1414 is journalled in a bushing 1416 secured by a bracket 1417 attached to a cross member 1418. The cross member 1418 interconnects the side walls of the boom box section member. In the lower assembly a roller 1409 is pivotally mounted by a pin 1419 secured by plate 1420 to the side walls of the box member 1403. The pin 1419 has a chordal removed portion bearing against a bar 1421** and thereby is prevented from rotation.

The boom sections 1401 and 1403 have a pulley 1422 pivotally mounted by a pin 1423 to the leading end thereof. A winch assembly 1424 is secured to the boom member 1401 at the rear end thereof. A cable 1425 has one end thereof wound on a drum of the winch assembly and the other end is attached to the boom section 1403 at the trailing end thereof. The cable 1425 passes over the pulley 1422 intermediate the ends thereof. A second cable 1426 is anchored by a clevis 1427 to the pulley 1422 on the member 1401. The other end is anchored to the trailing end of the boom member 1404. The cable 1426 is threaded over the pulley 1422 on the member 1403 and thereby extends the boom member 1404 simultaneously with extension of the boom member 1403 from the fixed boom section 1401. A third cable 1427 is anchored at one end to the trailing end of the boom member 1404 and the other end is wound on a second drum on the winch assembly 1424.

Referring now specifically to FIGS. 51 and 52 the winch assembly 1424 consists of a pair of drums 1430 and 1431 of different but related diameters. The drum 1431 is mounted by a shaft 1432 between a pair of side walls of a casing and the shaft is mounted in a pair of journals 1433 and 1444. The shaft is effectively cantilevered from these bearings and the free end is attached by a rotary hydraulic coupling 1435 to a hydraulic feed line or supply line 1436. The drum 1431 includes a pair of lands 1437 and 1438, the cable 1427 being wound upon the land 1437 and a hydraulic line 1439 being wound upon the land 1438. The hydraulic line 1439 is connected at one end to the shaft 1432 and the hydraulic coupling 1435. The drum 1430 is mounted on a shaft 1440 journalled to the side walls of the casing by bearings 1441 and 1442. A pair of meshing gears 1443 and 1444 are mounted respectively on shaft 1432 and 1440 respectively by hubs 1445 and 1446. The shaft 1432 is driven by a hydraulic motor M8 through a gear or drive member 1447 of a transmission assembly not shown. The cable 1425 is wound upon the drum 1430 for retracting the movable sections by winding the cable onto the drum. The fixed section of the boom is pivotally mounted on the pin 267 at the upper end of the members projecting upwardly from the A frames by a member 461. The member may be a split collar having one portion thereof secured to the member 1401 and the other part forming a cap detachably secured thereto by studs or any other suitable construction. A pair of hydraulic cylinders 1450 are secured respectively to the frame members 279 and the boom fixed section 1401. Each cylinder assembly consists of a cylinder 1451 pivotally anchored by a pin 1452 to the frame member 279 and a movable piston rod 1453 pivotally anchored by a pin 1454 to the boom member 1401.

Grapple 1460 suspended from the free end of the member 1404 consists of a fixed jaw 1461 and a movable jaw 1462. The fixed jaw 1461 includes a hollow casing 1463 terminating in a lower hooked end portion 1464. The movable jaw 1462 is mounted on the hollow casing by a pivot pin 1464. The pin 1664 passes through a pair of ears secured to the housing and the jaw 1462 passes through an aperture 1465 in the housing.

A hydraulic cylinder 1466 is disposed within the housing and anchored at one end by a pin 1467 to the housing and at the other end by a pin 1468 to a lug 1469 secured to the movable jaw. The hydraulic cylinder is a double acting type connected at one end to the hydraulic supply hose 1439, the other end of the cylinder is connected by a hose 1468 to an accumulator A2. The accumulator A2 is disposed within the last or innermost section of the boom adjacent the free end. The accumulator provides positive pressure for the upper end of the hydraulic cylinder 1466 normally biasing the jaws to a closed position. The accumulator A2 is a common, well known type having a free movable piston 1470 separating the cylinder into a pair of chambers 1471 and 1472. A fluid is disposed in the chamber 1472 and communicates with the hydraulic cylinder. The other chamber 1471 is filled with a compressible fluid such as air. Biasing the jaws to a close position is a safety feature whereby the log will not be dropped or released by the jaws in the event of a failure in the overall hydraulic system for the vehicle.

HYDRAULIC CONTROLS

The processing machines of both embodiments previously described are hydraulically operated. The motor 200 mounted on the base of the frame provides power for driving hydraulic pumps. Three pumps are shown in FIG. 2 and they are identified by the reference numerals P210, P211, and P212. FIGS. 59 to 61, inclusive, are schematics of the hydraulic system for the machine illustrated in FIGS. 1 to 3 inclusive.

Referring to FIG. 59 the pump P210 is connected to a sump S and provides power for the motor M3B through a control valve C1. The pump P210 powers the pair of hydraulic cylinders 433 for lifting and lowering the boom and is controlled through a valve C3. The pump P210 also powers the hydraulic cylinder 489 for raising and lowering the guide roll on the boom and is controlled through a valve C4. The pump P210 further drives the hydraulic motor M5A for slewing the vehicle and is controlled by a valve C2. The pump P210 drives motor MG for opening and closing the grapple on the end of the boom and is controlled by a valve C5. Pump P210 also drives the boom and winch motor M8A which is controlled by a valve C6. The valves C1 to C6 inclusive are manually controlled by the operator at the operator control panel C.P.

FIG. 60 is a schematic of the hydraulic system for the machine illustrated in FIGS. 1 to 3 wherein the pump P211 is connected to a sump S and through control valves C7, C8 and C9 respectively to motors M2A, M6A and M1A. Hydraulic motor M6A drives the feed rollers. Hydraulic motor M1A drives the debarker, and motor M2A drives the delimber.

As shown in the schematic of FIG. 61, the hydraulic pump P212 is connected to a sump S and drives motor M3A. The motor M3A is controlled by a valve C10. The pump P212 powers the pair of hydraulic cylinders 913 and 914 on the cut-off knife. These cylinders are controlled by a control valve C11, which may be manually or electrically operated. The valve is connected to the pump through an accumulator C1A and a check valve CV1A.

The control valve C11 may be operated electrically through a solenoid S having a winding W center tapped so as to provide windings W1 and W2. The winding W1 is connected by suitable leads across the battery BT1 through the counter switch SW15 and the winding W2 is connected to the electrical source through a switch SW16. When the counter switch SW15 is closed, the winding W1 of the solenoid is energized and moves the operator valve to the left as shown in FIG. 61 and in such position actuates the knives inwardly toward one another so as to sever or cut the tree. At the end of the cutting stroke, the knife yoke closes the switch SW16 actuating the solenoid winding W2 to move the operator valve C11 to the right as shown in FIG. 61 into a position to move the knives outwardly and out of engagement with the tree. The counter switch SW15 is set to close after each preset number of revolutions of a roll of the feed rolls and actuates the cut-off knife to cut the tree into bolts of substantially uniform length. By disconnecting the switches SW15 and SW16 or by providing a bypass the cut-off knife may be operated manually.

The machine illustrated in FIG. 2 is controlled hydraulically with each operation being individually controlled by the operator at the control panel. In the modified embodiment of the machine illustrated in FIGS. 4 to 7 inclusive, the various operations may be automatically controlled or individually manually controlled.

FIG. 62 is a schematic of the hydraulic system for the machine illustrated in this latter embodiment. The hydraulic system consists generally of two hydraulic pumps identified respectively as P1 and P2 providing fluid pressure for the operation of hydraulic motors M1 to M8 inclusive, through various control or selector valves. These pumps also supply pressure for hydraulic cylinders operating various parts of the machine.

Referring to the schematic in FIG. 62, the pump P1 is a ten piston pump having two pistons providing fluid pressure through a line L1 to a selector valve V1. The selector valve controls the flow from line L1 to one or the other of lines L2 and L3. The line L3 provides fluid for the delimber motor M2 and the flow is controlled by a valve V2. The pump P2 which is also a ten piston hydraulic pump has four pistons supplying fluid to the tractor track motor M4 through the control of valves V2 and V4. These valves are connected by a line L4 which is also connected with the line L2.

As will be seen hereinafter, the output from the pump P2 through line L5 may be added to the output from P1 to provide a driving force for motor M4. The valve V2 controls the flow of fluid to the delimber motor M2 and located in such circuit is a relief valve RV6. A relief valve RV8 is also interposed between the valve V4 and the tractor motor M4. Fluid from six cylinders of the pump P2 is controllably fed respectively to debarker motor M1 and tractor motor M3 through lines L6 and L7 and control for the respective motors is through respective valves V3 and V5. Interposed between valve V3 and motor M1 is a relief valve RV5. A relief valve RV7 is interposed between the valve V5 and the motor M3.

The fluid line L3 from valve V1 connects the output of pump P1 with the feed roll motor M6. Control of fluid to this motor is by a valve V6 and interposed between the valve V6 and the motor M6 is a relief or motor overload valve RV8. The valve V6 also controls the flow of fluid to the speed roll motor M7 through a line L8. Serially connected in line L8 is a needle valve NV1. Fluid from the motor M7 returns to tank T by a line L9 through a back pressure valve BPV1 serially connected therein. A relief valve RV2 is connected to the line L8 by a line L10 intermediate the needle valve NV1 and the valve V6. The relief valve RV2 returns the fluid to the tank T. A pilot line PL1 is connected to the line L9 between the motor M7 and the back pressure valve BPV1 and is connected respectively to master valves V2′ and V3′ by branch lines PL2 and PL3. The master valves V2′ and V3′ control respectively slave valves V2 and V3. The pilot line PL1 accordingly interrelates the operation of the feed roll and speed roll motors M6 and M7 respectively with the debarker motor and delimber motor respectively M1 and M2.

The pump P1 is connected to valves V7 and V8 by a line L11. The valve V7 controls the flow of fluid to each of the boom lift hydraulic cylinders 1475, only one of which is shown in FIG. 62. Valve V8 controls the flow of fluid to the boom winch motor M8. A pressure relief valve RV9 is located in the line L11 intermediate the pump P1 and motor M7. Pressure relief valves RV10 and RV11 are located in respective ones of a pair of lines from the valve V7 to the hydraulic cylinders 1475. A pressure relief or motor overload valve RV12 is connected in series with the control valve V8 and the boom winch motor M8. Each of the valves RV9 to RV11 inclusive have lines returning fluid to the tank T. Line L20 supplies fluid to valves V9 and V10 from the valve V8. Valve V9 controls the flow of fluid to the pair of cradle lift cylinders 524 by a line L12. A pressure relief valve RV13 is located in the line L12 and returns to the sump or tank T through a line L13. There is also a return to the tank T from the pressure relief valve RV13 through a line L14. A needle valve NV2 is located in the line L14 and opening of this valve permits a fast lowering of the cradle. Fluid from the cradle lift cylinders also returns to the sump by way of the valve V9 through a line L15. A flow control valve FC4 located in line L15 controls the rate of flow returning from the cylinders to the tank T. This control of flow selectively controls the rate of lowering of the cradle from its uppermost to its lower position. The valve V10 controls the flow of fluid to the cradle unload cylinders 545 which open and close the doors 542 and 543 of the cradle 500. A pair of pressure relief valves RV14 and RV15 are located respectively in lines L16 and L17 connecting the valve V10 with opposite ends of the double-acting cylinder. The pump P1 supplies fluid to the shear cylinders 958 and the fluid thereto is controled by a valve V13. Fluid from the cylinders returns to the tank T from the valve V13. The fluid from the pump P1 to the valve V13 is through a line L18 and located therein between the pump and the valve is a standard accumulator system with an unloading valve. An accumulator A1 in the line L18 has a return to the tank T through a needle valve NV3. This valve allows dumping or emptying the accumulator into the tank T. The line L18 also includes a return to the tank T through an unloading valve UV1. One return to the tank is through a line L19 and a second return is through a line L21 having needle valve NV4 therein. The line L18 intermediate the accumulator A1 and valve V13 has a branch line L22 supplying fluid to the slewing motor M5 through a valve V11 and the grapple hydraulic cylinder 1466 through a valve V12. The valve V12 is connected to the branch line L22 through a flow control valve FC2. The grapple hydraulic cylinder has an accumulator A2 connected to one end thereof and the accumulator returns to the line intermediate the valve V12 and the hydraulic cylinder by a line L24. Located in line L24 is a normally closed needle valve NV5. A pressure reducing valve PR1 is connected in series with the valve V2 and the grapple hydraulic cylinder 1466. The rotary hydraulic coupling 1435 is located intermediate the pressure reducing valve PR1 and the hydraulic cylinder 1466.

A second pilot line PL4 is connected to the line L8 intermediate the valve V6 and the needle valve NV1. The pilot line PL2 is also connected to a master valve V13′ controlling the slave valve V13. The valve V1 is in a 2-position, 3-way selector valve controlled or operated by a solenoid $S_S$. The valves V2 and V3 controlling respectively motors M1 and M2 are slave valves controlled respectively by solenoid actuated master valves V2' and V3'. The valves V2' and V3' are actuated respectively by solenoids $S_L$ and $S_D$. The grapple control valve V12 is the same type as valve V1 and is actuated by a solenoid $S_G$. The shear cylinder control valve V13 is a directional control air operated valve slave to a master valve V13 controlled by a pair of solenoids $S_C$ and $S_O$ respectively the shear close and shear opening solenoids. The feed roll motor control valve V6 is a 3-position, 4-way valve actuated by a pair of solenoids $S_R$ and $S_F$. The valves V4 and V5 are each 3-position, 4-way manually controlled valves, which for a matter of convenience of construction, are mounted together as a single unit. The valve V11 is a 3-position, 4-way directional control valve manually operated. The valves V7 and V8 are 3-position, 4-way manual control valves. The valves V9 and V10 are mounted as a single unit and are manually operated valves.

The partial block and schematic diagram in FIG. 62 of the overall hydraulic control system for the processing machine of FIGS. 4–7 inclusive is broken up into several sections relating to the various phases of operation. The hydraulic circuits for some of these phases are shown in considerable detail in FIGS. 63–68 inclusive, the reference numerals on the supply lines to the valves and returns being identified with similar references.

FIG. 63 is a detailed schematic of the hydraulic system and controls for the slewing motor M5. FIG. 64 is a detailed schematic of the hydraulic system for the boom winch motor M8 and boom lift cylinders 1475. FIG. 65 is a detailed schematic of the hydraulic system and control for the boom grapple cylinder 1466. FIG. 66 is a detail of the hydraulic system of the feed roll motor M6 and speed roll motor M7. FIG. 67 is a detail schematic of the hydraulic system for the boom shear cylinders 958 and FIG. 68 is a detailed schematic of the hydraulic system for the cradle unload cylinders 545 and the cradle lift cylinders 524.

Referring to FIG. 63 the slewing motor M5 is controlled by a 3-position, 4-way directional control valve V11 manually operated by a remote control RMC. Fluid to the valve is supplied through a flow control valve FC3 by the line L21 from the pump P1. Connected intermediate the motor M5 and valve V11 is a motor overload relief valve RV15.

Referring to FIG. 64 the boom winch motor control valve V8 and the boom lift cylinder control valve V7 are supplied with fluid pressure by the pump P1 through the line L11. The pressure relief valve RV12 is located between the valve V8 and the motor M8. Pressure relief valves RV10 and RV11 are also in respective ones of supply lines to the lift cylinders 1475. A supply line L20 from the valves V7 and V8 provides fluid for the cradle lift control valve V9 and cradle unload valve V10. The line L20 has a normally closed valve V50 for returning fluid to the sump.

Referring to FIG. 65, fluid is supplied to the grapple cylinder control valve V12 by a line L21 through the flow control valve FC2. The valve V12 controls the grapple cylinder 1466 and in series with the valve V12 is a pressure reducing valve PR1. The rotary coupling 1435 is also in series.

Referring to FIG. 66, the line L3 from the selector valve V1 returns to the tank T through a variable flow control valve FC1. The line L3 also supplies fluid to the motor M7 and motor M6 and is controlled by the solenoid actuated valve V6. This valve is operated by a pair of solenoids $S_R$ and $S_F$.

Referring to FIG. 67, fluid pressure is supplied by line L18 to the hydraulic cylinder 958 of the shear and is controlled by a valve V13. The valve V13 is hydraulically operated and is slave to a master valve V13' which in turn is actuated by a pair of solenoids $S_C$ and $S_O$. The master valve V13' is supplied by the pilot line PL2 from the feed roll and speed roll control valve V6.

Referring to FIG. 68 fluid is supplied to the valves V9 and V10 by the line L20 from the boom lift and winch motor control valves V7 and V8. The valves V9 and V10 are manually operated.

ELECTRICAL CONTROL

The hydraulic system previously described is controlled in some cases, manually and in other cases by electric solenoids FIGS. 69 to 73 inclusive illustrate the electrical wiring and circuit for the machine.

FIG. 69 diagrammatically illustrates the various positioning of the switches with respect to the processing units. Seven sensing switches are utilized, four of which are mounted upon the shear. Three of the sensing switches are mounted upon the feed rolls and preferably on the set adjacent the shear unit. In the processing operation, a tree is engaged by the grapple actuated by the control of the operator and it is fed directly to the delimber unit. The tree then passes respectively continuously through the first set of feed rolls, a debarker unit, a second set of feed rolls and a shear where the delimbed and debarked tree is severed into selected lengths.

The operator control panel includes levers for manually actuating the valves described previously with respect to the hydraulic system. At the operator's station, there is an electrical panel box P enclosing and housing electrical apparatus. A further main control junction box CB is located for convenience of wiring at another position not shown on the machine. The upper surface of the panel box P has a plurality of switches whereby the operator may selectively control through electrical circuits various processing units. On this panel are located switches PB3A and PB3B respectively the feed roll forward and feed roll reverse switches. A further pair of switches PB4 and PB5 respectively manually controlling the closing and opening of the shear. Switches PB6A and PB6B are also located on the panel box and are respectively switches for selecting manual or automatic operation.

The foregoing switches have respective ones of lights LT1 to LT7 associated therewith visually indicating the condition or electrical state of the circuit for its associated switch. The switches on this panel are connected to a terminal block T1. The terminal T1 is connected to a terminal block T2 located in the main junction control box. Terminal block T1 has pairs of contacts 1 to 16 inclusive and terminal block T2 has pairs of terminals 1 to 48 as indicated respectively on each of the blocks. Connected to terminal block T2 is the flapper switch SW4, a grapple switch PB1 on the grapple actuating lever, a foot control delimber override switch SW1, and the engine ignition switch. Also connected to the terminal block T2 are the switches SW5 and SW6 which are the shear closed sensing switches; SW8 and SW9 which are proportional opening shear sensing switches. Shear open solenoid $S_O$ and a shear close solenoid $S_C$ are also connected to the terminal block T2. Switches SW2, SW3 and SW7 which are tree trunk diameter sensing switches mounted on the second set of feed rolls are also connected to the terminal block T2 of the main control junction box. In addition, connected to the terminal block T2 is a feed roll forward repeater relay KF, a feed roll reverse solenoid KR, a debarker solenoid $S_D$, master power relay KM, selector repeater relay KS, a delimber solenoid SL and grapple relay KG.

FIG. 72 schematically illustrates the electrical circuit for the entire machine. All contacts for the relays in this schematic are illustrated in the position with the respective or associated relay in a de-energized state. Switches SW5 and SW6 are shown as two separate switches and these two may be replaced by a single switch SW5' as previously described in the specification.

FIG. 72 will now be described with reference to a plurality of parallel circuits A to T inclusive. Each of these circuits includes marks indicating a connection and identified by reference numerals, for example C/1, C/31, C/13, P/2, P/3, etc. The prefixes C and P refer respectively to the connections in the control box CB and panel box P, to terminal blocks T2 and T1, the numeral giving the terminal connection on these blocks.

The circuits A to T inclusive are electrically connected in parallel by lines LA and LB having a 24 volt battery connected thereacross as will be seen hereinafter in circuit T. The circuit A includes a switch PB1 in series with the grapple relay KG. The circuit B consists of debarker solenoid $S_D$ in series with switch PB2. A debarker white on-light LT1 is in parallel with the solenoid $S_D$. The circuit C consists of relay KF which is feed roll forward relay in series with the switch PB3A. A green light LT3 indicating the forward on for the relay is in parallel with the relay KF. Circuit D consists of feed roll reverse relay KR in series with the switch PB3B. A red light LT2 is in parallel with the relay indicating the reverse relay on. Circuit E consists of the delimber solenoid $S_L$ in series with relay contacts K1 and relay contacts K9. Paralleling the relay contacts K1 and 9 is the foot delimber override switch SW1. Circuit F consists of a relay K11, the less than 3-inch log diameter sensing relay which initiates chopping after flapper switch SW4 has been operated. The relay K11 is in series with relay contacts K8, relay contacts K2, relay contacts K4, and this series circuit is connected to the fixed contact NC of switch SW2. The circuit F further includes delimber relay K1 in series with relay contacts K3 and relay contacts K1, the circuit being connected to lines LA and LB and thereby being parallel to circuits A to T. A fixed contact NO of switch SW2 is connected in circuit intermediate relay K1 and contacts K3. The movable contact of switch SW2 is connected to line LA. Circuit G consists of a relay K2, sensing 1½ inch diameter logs which operates from the delimber sensing switch SW3 in series therewith. Circuit H consists of a delimber hold relay K3 in series with relay contacts K2 and relay contacts K1. Paralleling the contacts K1 are relay contacts K3. Circuit I consists of shear closed relay K4 in series with relay contacts K4, relay contacts K9 and relay contacts K5. In parallel with relay contacts K9 and K4 are contacts K9 and the manual shear close switch PB4. Also in parallel with the relay contacts K4 are relay contacts K10 and the flapper switch SW4. In parallel with relay K4 is the light LT4 indicating the shear closed. Circuit J consists of the shear close solenoid $S_G$ in series with relay contacts K4. Circuit K consists of the shear open solenoid $S_O$ in series with relay contacts K5. The circuit L consists of the shear open relay K5 in series with relay contacts K7, switch SW6, switch SW5, relay contacts K9 and relay contacts K8. Relay contacts K5 are in parallel with serially connected switches SW5 and SW6. Relay contacts K2 are in parallel with the serially connected switches SW5, SW6 and relay contacts K7. The switch PB5 and relay contacts K9 are in parallel with the relay contacts K9, switch SW5, SW6 and relay contacts K7. A light LT5 parallels the solenoid K5. The circuit M consists of a 6-inch tree diameter size sensing relay K6 in series with relay contacts K2 and the switch SW7. Circuit N consists of the shear open 6-inch tree diameter sensing relay K7 in series with relay contacts K8, relay contacts K6 and switch SW8. Circuit O consists of shear opening relay K8, in series with switch SW9. Circuit P consists of a blue light LT6 indicating the manual operation in series with relay contacts K9. Circuit Q consists of serially connected switches PB6A and PB6B respectively the manual and automatic operation selection switches and the relay K9. Paralleling relay K9 is the light LT7 indicating automatic operation. Circuit R consists of chopping relay K10 in series with relay contacts K7 and K11. Circuits S consists of selector relay KS in series with switch. PB3A the latter of which is parallel with switch PB3B. Circuit T consists of line T1 connecting a battery BT in series with relay contacts KM and a 20 circuit breaker CB to lines LA and LB. A selector solenoid $S_S$ and serially connected relay contacts KS; feed roll forward solenoid $S_F$ and serially connected relay contacts KF are connected in parallel with the battery BT and contacts KM through a 50 amp fuse or circuit breaker FS2. The grapple solenoid $S_G$ connected in series with relay contacts KG and feed roll reverse solenoid $S_R$ in series with relay contacts KR parallel the battery BT and relay contacts KM and are connected thereto through a 50 amp fuse or circuit breaker FS3. Motor starter solenoid SKMS is connected in series with a switch ST which parallels the ignition switch and master relay KM, and together are connected across the battery through a 20 amp circuit breaker FS4 and ammeter AM. A voltage regulator R in series with the generator G is connected across the battery through the ammeter AM. A motor starter S and relay contacts KMS are also connected across the battery.

The relay contacts in the various circuits are normally open unless otherwise indicated as in the foregoing description. All relays K1 to 9 inclusive and 11 are Clare type A700061 and relay K10 is an Agastat type DD–G–11 relay having a 0–2 second delay (adjustable). Switch PB2 is an illuminated push on-off switch for example a Honeywall 52PB67–T2 and switches PB3A, B3, 4, 5, 6A and B are illuminated solenoid interlocked switches, for example Honeywall switches 52PB8–T2. The debarker on switch P62 releases (off) on the second push. Unless the engine is on, none of the push-lights will work. The push-light switches are mounted in the panel box P.

The control box C.B. serves as a mounting place for ten Clare 24 v. DC plug-in relays, one Agastat 0–2 second timer, and one master power relay. The master power relay KM disconnects all power from the system if the Logging Combine engine ignition is off. The Agastat K10 governs the "fast chop" cycle in that a short time delay results in short lengths of log being chopped while longer time settings produce longer logs, since the rolls can move the tree trunks further between chops. Four terminal strips provide 48 connection points for wires to this chassis. Other than K10, there are *no* adjustments and a defective relay can be quickly replaced due to the plug-in feature. The relays are totally enclosed to keep out dirt.

The following components are mounted in the control box:

K1–9, 11—Clare A700061 (relay 24 v. DC coil)
K10—Agastat DD–G–11 (0–2 second delay)
KM—Potter & Brum MB3D (50 amp contacts)
Term. strips Jones 12–141 (through panel type)
Relay sockets 20 pin amphenol 77–Mit–20

Flapper switch SW4 which may be a Honeywall impulse switch 1PD*i* is remotely located on the machine.

The motor portion of the schematic in FIG. 72 represents the usual standard automotive electrical starter-battery and ignition system. Ignition relay contact KM *prevents* operation of the rest of system *unless motor ignition* is on.

The solenoid of the hydraulic system operate via repeater relays because of large momentary Solenoid currents. Example: Relay KG operates Solenoid $S_G$ etc.

OPERATION

In operation, the mobile or self-propelled processing machine is driven into an area of filled trees and preferably positioned adjacent the butt ends thereof. In the machine illustrated in FIGS. 1 to 3, the operator regulates motors M3A and M4A through control valves C10 and C11 respectively, to move the tractor into the desired position. The slewing motor M5A is then operated to rotate the frame 200 on tractor base 100 to position the grapple end of boom 400 adjacent the butt end of the felled tree selected by the operator for processing. The boom 410 is extended and pivoted on its horizontal axis about trunnion 405 so that the grapple jaws engage the tree trunk at a position spaced from the butt end of the trunk. Preferably, the tree trunk is engaged by the grapple jaws at a point between the butt end of the tree and the tree's center of gravity so that, as the butt end of the tree is elevated by the boom the top or far end of the tree remains resting on the ground.

With the grapple jaws in position around the tree trunk, valve C5 is shifted to close the grapple jaws and grasp the tree trunk between the grapple jaws 461 and 462. The butt end of the tree is then raised by positioning valve C3 to admit fluid to cylinders 433 raising the grapple end of boom 410 and motor M8A is actuated to retract the boom, pulling the butt end of the tree toward the delimber 600 of the processing machine. As the butt end of the tree is moved toward delimber 600, the operator adjusts the height of guide roll 493 by regulating cylinder 489 through valve C4 bringing guide roll 493 into contact with the tree. By controlling the height of the grapple end of boom 410 and the guide roll the tree is aligned with the central axis of the tandem aligned processing units.

As the butt end of the tree approaches the delimber 600, control valve C7 on the delimber motor M2A is positioned by the operator to rotate delimber housing 602 counterclockwise, pivoting arms 607 and to move the cutter heads 608 outwardly away from the tree. The butt end of the tree trunk is fed directly into the delimber by retracting the boom 410 and after the butt end of the tree is positioned between cutter heads 608, the operator repositions valve C7 to reverse the motor M2A and rotate the housing 602 in the other direction bringing the cutter heads 608 into contact with the advancing tree.

By setting the valve controls C9 and C8 the respective motors M1A and M6A, the debarker 700 and feed rolls 800 are placed in operation. These controls may be set and the operation of the debarker 700 and feed rolls 800, commenced by the operator at his convenience at any time before the tree is fed into the first set of feed rolls.

With the cutter heads 608 in contact with the tree, the retraction of boom 410 by the motor M8A continues feeding the tree through the cutter heads which are revolving around the tree clockwise and, as they revolve, are rotating on their own individual axis counterclockwise as viewed in FIG. 18. As the tree trunk is fed by the retracting boom 410 through delimber 600, projections such as limbs extending outwardly from the trunk into the path of the revolving and rotating cutter heads are cut off, the delimbed butt end of the tree is fed further by boom 410 so as to be brought into contact with the spiked rolls 807 of the first set of feed rolls 800.

Spiked rolls 807 are driven in an infeed direction to feed the butt end of the delimbed tree into the debarker 700 at substantially the same speed as the feed of the retracting boom 410. With feed rolls 807 in driving contact with the tree, if desired, guide roll 493 may be elevated toward the boom 410 and out of engagement with the tree by the operator by adjusting the valve control C2 to retract the hydraulic cylinder 489.

As the feed of the delimbed tree by retracting boom 410 and feed rolls 800 continues, the butt end of the tree engages revolving blades 707 of debarker 700 forcing the blades 707 outward on their spring tensioned pivotal mounting on revolving housing 706 as described in the aforecited patent to Brundell to remove the bark from the tree. As the feeding of the tree continues, the delimbed and debarked end of the tree is engaged by the second set of feed rolls 800 which are rotating at a speed commensurate with the first set. Once the tree is in contact with both sets of the feed rolls 800, continuation of further feeding of the trees through the processing unit is solely by the feed rolls. With the tree embraced by the spiked rolls 807 of feed rolls, the grapple jaws are opened by the operator, releasing the tree, and the control valve C6 for motor M8A shifted, stopping retraction of boom 410.

After grapple 460 has been disengaged, the free end of the tree rests on and is dragged along the ground by the forward feeding action of the feed rolls 800. To facilitate alignment of the tree longitudinal axis and the axis of the in line processing units, the subframe assembly is tilted downwardly. The alignment is further facilitated by the pivotal mounting of beams 301 whereby the subframe assembly having the delimber 600, debarker 700 and cut-off knife 900 pivots about a horizontal axis. Thus, the common feed axis of the delimber, debarker and cut-off knife, which may be referred to as the feed path, is free to follow and remain in alignment with the tree. The orientation of the tree with respect to the apparatus may vary somewhat as the tree is initially fed forward first by the grapple and then by the first set of feed rolls 800. The pivotal mounting of the beams 301 also tends to minimize bending moments which otherwise would result if the tree were not aligned with the feed axis of the delimber, debarker and cut-off knife.

From the last set of feed rolls, the delimbed and debarked tree passes between the pair of knives 910. After a length of tree trunk has been fed past feed rolls 800, pre-set counter switch SW15 is automatically actuated and the knife blades are moved inwardly into contact with the advancing tree trunk. When the knife blades contact the tree trunk, knife housing 901 is moved rearwardly by the advancing tree trunk, compressing springs 909. As the housing 901 moves rearwardly the knives 910 complete the cut whereupon the knife yoke closes switch SW16 resetting the valve C11 to open the knives. As soon as the knives have cleared the butt end of the tree, the springs 909 returns the housing 901 to its initial position to await subsequent operation by switch SW15 or manual operation by the operator should such manual operation be desired.

To avoid undue pivotal movement of the subframe assembly 300, it may be locked if desired with respect to the A frames 215 by the hydraulic cylinders 304. This may be desired when the knife blades 910 are in engagement with advancing delimbed and debarked tree and knife housing 901 is spaced rearwardly away from delimber 600. In such a case the locking may be accomplished automatically by a valve V50 positioned in the by-pass line of cylinder 304. A valve control C20 of valve V50 is positioned with its forward ends in contact with knife housing 901 when the latter is adjacent the debarker 600. On actuation of the knife cylinders 913 and 914, the knife housing 901 is moved away from the debarker by the advancing delimbed and debarked tree disengaging the valve actuator C20. The spring loaded actuator closes the valve V50. With valve V50 closed, the piston and piston rod are locked in position, cylinder 304 locking beam 301. When the housing 901 is returned by the compressed springs 909 to its original position valve V50 is reopened, unlocking the piston and piston rod freeing the beams 301 for pivotal movement.

A manual valve on by-pass V51, open during the normal operation of the machine, is also provided for manually locking the piston and piston rod if locking is desired, for example, during moving of the machine from one location to another.

As is apparent from the foregoing, once the felled tree is grasped by the grapple on the boom, the limbs and bark are removed from the tree and the delimbed and debarked tree is cut into predetermined lengths while the tree being processed moves continuously through the machine. The operations, i.e. the delimbing, debarking and cutting, are performed in sequence but occur simultaneously as the tree moves continuously to provide a continuous operation. The entire processing operation is completed in a simple operation. Once the butt end of the tree is aligned with the delimber and fed into the feed rolls, the machine handles the tree for delimbing, debarking and cutting, the operator merely determining that the controls for the various units are properly positioned. After the felled trees within the reach of the extended boom have been processed, the machine is readily moved by the operator to the next processing site, ready to process trees at the new site.

The processing machine illustrated in FIGS. 4–7 inclusive processes a tree substantially in the same manner as the other embodiment of the processing machine. There are, however, a few refinements and also additional pieces of equipment. Control, however, of the machine is substantially modified, the main feature being that the majority of the processing operations can be controlled either manually or automatically.

Referring to FIG. 4 generally for the operation, a tree TR having limbs and branches thereon is fed into the axially aligned processing units by the boom and grapple assembly 400. The butt end of the tree passes in sequence through the delimber 600, a first set of feed rolls 800, a debarker 700, a second set of feed rolls 800 and the delimbed and debarked tree is then severed into a selected length by the shear unit 900. The log separated from the remaining portion of the tree trunk falls by gravity into the cradle assembly 500. The trailing end of the falling log drops onto the speed roll 1100 which accelerates the processed log to assist in placing the latter in the cradle 500. Before the log is severed by the shear unit 900, the leading end strikes the flapper plate 1002 actuating the flapper switch SW4 thereby readying an electrical circuit for effecting actuation of the shears.

A plurality of trees are fed in sequence through the processing unit by the boom and grapple assembly 400. The boom is extended by winding the cable 1425 on the winch drum 1431 driven by the motor M8 having a gear or sprocket SP drivingly engaging the gear 1443. A further section of the telescopic boom is simultaneosuly extended outwardly by the cable 1426. The operator raises and lowers the boom by manipulating the control valve V7 and the machine is pivoted about the vertical axis by the operator controlling the valve V8. In this manner, the machine which has been driven by the operator into an area of felled trees, is oriented to a position for selecting trees to be engaged by the boom. The selected tree is then fed to the processing units on the machine.

The grapple which is of somewhat different construction from that in the first embodiment is controlled by the valve V12. The hydraulic cylinder 1466 is biased by a compressible fluid in the accumulator A2 such as normally to retain the grapple jaws in a closed position. Fluid may be selectively admitted to the accumulator to make up for lost fluid through the needle valve NV5. In order to grasp a tree, the valve V12 is operated so as to move the jaws open against the pressure of the compressible fluid and the tree is then engaged by the grapple jaws. The front end of the tree is lifted and fed directly into the first of the processing units by retracting the boom. Feeding of the tree by the boom continues such that the tree is engaged by the first set of feed rolls. The grapple is then released by operating the valve V12 and the selected tree is fed through the processing units by the driven feed rolls 800. While the tree is being processed, the operator controls the valves for the boom winch motor and grapple cylinders to grasp and feed a second tree to the processing units.

The operation of the grapple 1466 is made clear with reference to FIGS. 58 and 65. Opening the valve V12 permits the hydraulic pump P1 to pump hydraulic fluid to the lower chamber of the hydraulic cylinder 1466 forcing piston and rod inwardly into the cylinder portion of the hydraulic cylinder. The jaw 1462 moves upwardly (as viewed in FIG. 57) thus opening the grapple. Hydraulic fluid is forced from the upper chamber of the hydraulic cylinder 1466 through the line 1468 to one chamber of the hydraulic accumulator A2. This excess fluid forces the free-floating piston 1470 into the other chamber 1471 of the accumulator A which contains nitrogen (or some other compressible gas, e.g. air). As long as the valve V12 is open to connect pump P1 to the system, the compressed gas remains as potential energy.

When it is desired to close the grapple, the valve V12 connecting the pump P1 to the system is closed. This permits the potential energy in the accumulator to be released. This, in turn, forces the free-floating piston into the chamber 1472 which moves hydraulic fluid into the hydraulic cylinder 1466. This moves the piston and its associated rod downwardly, thereby moving the movable jaw 1462 thus closing the grapple.

An advantage of this sequence for opening and closing the grapple is that more positive gripping of trees is assured through the reserve power residual in the accumulator.

In the boom illustrated in FIGS. 4 to 7 and 48 to 50 winding cable 1425 onto wind-up drum 1430 extends the movable boom section 1403 outwardly. Winding the cable 1427 onto wind-up drum 1431 retracts boom section 1404. The cable 1426, anchored at opposed ends to boom sections 1401 and 1404, co-relates movement of the movable boom sections.

As previously mentioned the processed logs are deposited in the cradle 500 located at the rear of the machine. In order to obtain a relatively neat arrangement or pile of logs in the cradle the cradle may be raised vertically and lowered slowly by appropriate adjustment of the flow control valve FC4. The rate of lowering of the cradle may be related to the rate at which the logs are being deposited in the cradle such that each log has very little vertical drop before being deposited.

When the cradle 500 is filled with processed logs, the hydraulic cylinder 1040 on the flapper is actuated such as to pivot the flapper 1002 outwardly to a substantially horizontal position. The cradle 500 is then raised vertically by the cradle lift cylinders 524 controlled by the operation of valve V9. When the cradle is in a vertical position, a truck or the like may be backed thereunder and the cradle doors 542 and 543 opened by actuating the hydraulic cylinders 545. Actuation of the cylinders is controlled by the valve V10. Subsequent to unloading the logs, the cradle is lowered and the flapper plate pivoted to its normal vertical position and the cradle may thereafter be lifted to receive the next load of logs. In the processing machine of the modified embodiment the hydraulic system is controlled electrically so as to provide manual or semi-automatic operation of the logging machine.

The electrical control system automates the operation of the Logging Combine so that the combine operator need only attend to picking up cut trees with the grapple and feeding these trees into the intake rolls of the machine. Control can be transferred back to *manual* or be *overridden* by pushlights and buttons on the grapple control handle.

The combine removes substantially all of the limbs from all but small trees; debarks the trunks, and senses the diameter of the resulting tree trunk. The trunk/log advances forwardly through open shear blades which, by the proportional opening sensing switches, open just enough to accommodate the trunk.

When the log hits the flapper plate (1002) 8 feet beyond the shear or some other selected length depending upon the positioning of the flapper plate, the shear closes cutting an 8 foot length. The operation repeats until the trunk diameter is down to approximately *3-inch* diameter as the tree top approaches. The delimber stops and the shear fast chops the remaining length into short billets of length set by the adjustable time K10 period. When the trunk diameter is less than approximately 1.5 inches, the combine stops and re-sets itself to receive the next tree.

The electrical system controls mechanical movements by relays which activate hydraulic solenoid valves, as shown in FIGS. 62 to 68 inclusive.

The control panel C.P. to the right of the operator has seven "pushlight" switches with illuminated caps (see FIG. 69). The first push of the top white one, switch PB2, turns on the debarker and the internal lamp indicates that it is on. (A second push releases the button and turns the debarker off.) Pushing green and red pushlights 3A and 3B starts the feed rolls moving either forward or reverse. The *forward* pushlight is self-holding while *reverse* pushlight must be held down to maintain contact. The operator switches on the debarker and feed roll motors; depresses white PB2 and green PB3A causing the debarker to run and rolls to move forward; and pushes white "Auto" button PB6B.

The operator then places the boom over a tree. To open the grapple the push button switch PB1 located at the top of the grapple lever is depressed. It remains open as long as the push button is depressed. Releasing the button closes the grapple jaws.

The operator then feeds a tree, butt first, directly into the combine with the grapple where the tree is picked up by the feed rolls 800 and pulled into the machine.

The sensing switches attached to the second feed roll performs the following functions:

(a) Senses entry of all trees greater than 3 inches in diameter and activates the delimber.

(b) Determines if trunk diameter is greater than or less than 12 inches. If less than 12 inches the shear will open only to 12 inch diameter position after first cut has been made.

(c) Senses when trunk diameter is less than 3 inches and starts fast chop cycle.

(d) Senses when trunk diameter is less than 1½ inches and then opens shear to maximum 18 inch diameter position and stops delimber.

A second push button switch SW1 on the grapple lever is provided so that the operator can override (d) and actuate the delimber at will.

Thus during normal automatic operations the operator need only *continually feed trees into the combine with the grapple.*

As soon as a tree enters the rolls the delimber and debarker operate. The shorn trunk moves through wide open shears until the flapper plate is struck. Striking the flapper plate actuates the shear close solenoid S*c*. The shears operate and continue closing until the shears closed switches SW5 and SW6 contact. The 8 foot log cut falls into the cradle and shears begin to open. *If* tree is less than 12 inches in diameter, the shears stop opening at 12 inches. If tree is greater than 12 inch diameter, the shears open wide to 18 inch diameter. The shears remain open until flapper plate 1002 is again struck and the cycle repeats.

When the tree trunk is sensed as being less than 3 inches in diameter, the shear begins a fast chop cycle that cuts the remaining portion of the tree into short lengths. As the trunk diameter reduces to less than 1.5 inches, the combine stops and resets wide open for the next tree with delimber stopped.

All functions which are normally automated may be transferred to manual operations if the operator pushes blue "Manual" pushlight switch P*b*6A. In this mode one pushes the pushlights and the internal pushlight lamps will come on indicating that this function is operating. In *Auto* operation the appropriate lamps will flash without human intervention. The rolls can be reversed manually to position or remove a tree from the combine.

A chart of switch and relay function is given below, reference being made particularly to FIGS. 69 and 72.

| | |
|---|---|
| P*b***1** | Open grapple button on grapple handle. |
| SW**1** | Delimber override button on grapple handle. |
| SW**2** | Senses tree greater/less than 3" diameter. |
| SW**3** | Closes when tree greater than 1.5" diameter. |
| SW**4** | Momentary flapper plate closes when butted. |
| SW**5** | Closes when shears completely closed. |
| SW**6** | Closes when shears completely closed. |
| SW**7** | Opens when tree greater than 12" diameter. |
| SW**8** | Close when shears open more than 12" diameter. |
| SW**9** | Opens when shears open more than 12" diameter. |
| K**1** | Auto starts delimber if SW**1** is not used. |
| K**2** | Sense 1.5" or more tree diameter. |
| K**3** | Delimber hold relay. |
| K**4** | Closes shear. |
| K**5** | Open shear. |
| K**6** | 6" tree sensing. |
| K**7** | 12" diameter shear open. |
| K**8** | 18" diameter shear open. |
| K**9** | Auto/Manual transfer relay. |
| K**10** | 0–2 time delay for fast chop cycle. |
| K**11** | Fast chop cycle. |
| KM | Master power relay interlock with ignition switch/starter. |
| $K_G$, $K_S$ $K_F$, $K_R$ | Four repeater relays mounted near solenoids. |
| $K_G$ | Grapple Relay. |
| $K_S$ | Selector Relay. |
| $K_F$ | Feed roll forward Relay. |
| $K_R$ | Feed roll reverse Relay. |

MANUAL OPERATION

Operator depresses "*Manual*" PB6A, circuit Q de-energizing K9 Relay and lighting blue lamp inside the push button. K9 contacts in circuits I and L transfer control of the shear to panel pushbuttons PB4 (circuit I) and PB5 (circuit L). Control of *Debarker, Grapple* and feed rolls is always manual via switches PB1, PB2, PB3A and PB3B (circuits A–D). Selector relay $K_S$ (circuit S) is energized—whenever rolls are moving (forward or backwards) via PB3A or PB3B.

AUTOMATIC OPERATION

Operator depresses "Auto" switch PB6B (circuit Q) on Panel P energizing K9 relay which de-energizes blue "Manual" lamp LT6 (circuit P); energizes white lamp LT7 inside the "Auto" push button; and K9 contacts in circuit L and I transfer shear control to Automation circuitry. De-energized K2 contacts (circuit L) energizes solenoid K5 and opens shear knives 964 until solenoid K8 (circuit O) electrical stop halts shear at 18" diameter *max.* via K8 contact (circuit L).

The operator opens/closes grapple jaws 1461 and 1462 via switch P*b*1 (circuit A) button on grapple control lever. The *Debarker* turns on via switch PB2 (circuit B) and a white lamp LT1 indicates that it is running. The Feed Rolls 800 are manually controlled by green pushlight switch PB3A for *Forward* (circuit C) and red switch RB3B for *Reverse* (circuit D).

A tree is fed into the waiting combine by the use of the grapple 1460 where the Forward rolls 800 catch it and pull it in. Automatic operation then occurs as follows:

Sensing switches on the rolls sense the size of the tree. If greater than 3" diameter; K2 energizes and SW2 (circuit F) energizes the de-limbing device 600 by K1 contacts (circuit E) and the "de-limb" Solenoid $S_L$ operates, de-limbing the tree trunk. Should the trunk taper off to less than 3" diameter, but still greater than 1.5" diam. then K3 contact (circuit F) of self-latch relay K3 (circuit H) will hold K1 (circuit F) de-limb relay on despite switch SW2 (circuit F) release until the tree becomes *smaller than 1.5" diameter* such that switch SW3 opens dropping out K2 Relay (circuit G) and its contact (circuit H); dropping out K3 delimb "Hold" Relay (circuit H) and opening shear blades 964 via K2 contact (circuit L).

The delimbed tree trunk moves through a debarking device controlled by switch PB2 and the debarked tree trunk is propelled by speed roll 1100 endwise through a normally open shear until it rams the Flapper Plate switch SW4 (circuit I) eight feet beyond the shear. SW4 closes momentarily energizing self latching shear close Relay K4 (circuit I) and the "shear closed' 'lamp inside Manual switch PB4 (circuit I). The Shear blades 964 close, cutting off an 8 foot log which is propelled by speed-up roll 1100 to cradle 500. The act of closing the shear blades trips two shear mounted switches SW5 and SW6 which activates self latch "*shear open*" Relay K5 through closed K8, K9, K7 contacts (circuit L). K8 is a safety relay which is normally energized and which de-energizes via SW9 (circuit O) to block shear open function *if* shear attempts to open wider than a 9" radius (18" diameter tree).

Energized K5 contact disables and resets K4 shear close relay (circuit I) and causes the shear blades to open. *If* the tree trunk is less than 12" diameter the shears *do not need* to open to maximum. Current will flow through closed tree sensing switch SW7 contact; through closed (larger than 1.5") K2 contact and energize solenoid K6 (circuit M). Closed K6 and K8 contacts prepare a circuit for shear position switch SW8 which closes when the shear blades pass the 12" diameter mark on their way open. The thus energized K7 Relay (circuit N) arrests further open motion via its open contact (circuit L) in series with K5 shear open relay. The debarked tree trunk slides forward through the open shear driven by the forward rolls. A de-energized K5 contact (circuit I) has restored the K4 "close" circuit to readiness to repeat the entire shear cycle when tree trunk end rams Flapper switch SW4 (circuit I) again. Thus the tree trunk is delimbed, debarked (if desired) and cut into 8 foot lengths. The reason that size sensing SW7 on the rolls controls the shear opening is to conserve hydraulic oil pumping when it is unnecessary to open shears to widest amount (18 inches diameter).

As the tree is cut into 8 ft. logs, the trunk grows smaller as the top is approached until a new decision must be made. When the trunk diameter has become less than 3"; SW2 (circuit F) flips from K1 (12" 8 ft. log) to K11 "*Fast Chop Cycle*" (circuit F).

FAST CHOP CYCLE

A large trunk dwindles to less than 3" diameter. Tree sensing SW2 goes to N.C. K2 contact is closed due to "larger than" 1.5" diameter. K8 contact is closed because K8 is energized vi ashear sense switch SW9 (which is normally closed unless shear blades are wide open beyond 9" *Radius*. The shear should be less than 9" because of small less than 3" log).

When this last log passes, K4 relay shears close (momentary SW4 Flapper) and allow current to flow via K4, K2, K8 contacts (circuit F) to K11 which latches on after K4 releases via latch contact. K11 contact and K7 contact energized K10 timer (circuit R). During K10 time period (0–2 sec.) the tree slides forward through open shears. At end K10 period its contact closes and initiates K4 (circuit I) shears chop cutting a short log of length determined by K10 period. At completion of shear closed chop motion switches SW5 and SW6 on shear close indicating completion of chop and K5 (circuit L) is energized and latched re-opening shear again.

Fast chop cycle repeats as long as less than 3" more than 1.5" tree is sensed.

When the sensed SW3 tree trunk is non-existent or less than 1.5" diameter; K2 (circuit G) will be de-energized and its contacts (circuit F, H and L) will block off solenoid K3 (circuit H) which in turn will drop out K1 delimber relay (circuit F) stopping the delimbing blades, the fast chop cycle, opens the shear, and generally resetting all relays for the next tree. Any small sticks still in machine will be carried through the open shear by the rolls 800 and discarded. The operator can, if desired, *override* the dropout of K1 by a button switch SW1 mounted on one of the control levers and thus operate the delimbing blades at will. *All* relays are shown in the *ALL-POWER-OFF* position and that this is *not* the normal operating condition; some are being almost continually energized when the equipment is in use. The lights inside the push buttons or "push-lights" will light when that button is pushed in manual; indicating that that function is being performed. In *automatic* operation, the shear push button lights will flash without human intervention and this is normal. As an option, the 1½" sensing switch SW3 may be disconnected and K2 wired to energize along with $S_L$ delimber solenoid on any tree trunk larger than 3" and with delimber "override" SW1. In the fast chop cycle, the severed short lengths of logs are dropped onto the ground in a position intermediate the rear end of the machine and the slidably mounted cradle doors 542 and 543. These logs do not generally interfere with the machine providing the operator manoeuvres the vehicle away from the processing area by advancing the vehicle forwardly.

I claim:

1. A device for cutting a tree while the tree moves along a path generally parallel to the length of the tree and without interrupting the movement of such tree along the path, said device comprising:

(a) a support;

(b) cutting means on said support to sever a tree in said path; and (c) means to mount said support on a frame to allow said support to move along the same path as the tree during cutting thereof and thereafter return to its initial position.

2. A tree cutting device as defined in claim 1 wherein the cutting means comprises at least one knife mounted on said support and movable in a direction toward and away from an abutment.

3. A tree cutting device as defined in claim 1 wherein said cutting means comprises a pair of knives mounted on said support, at least one of said knives being movable in a direction toward and away from the other knife respectively to sever and receive a log therebetween.

4. A tree cutting device as defined in claim 3 wherein the mounting means for said support comprises at least one beam and means on said support slidably mounted on said beam.

5. A tree cutting device as defined in claim 3 wherein said support for the cutting means includes a portion telescopically mounted on at least one beam member.

6. A device for cutting trees as defined in claim 3, including spring biased means for returning the movably mounted support to a normal rest position.

7. A device for cutting trees as defined in claim 3 wherein the support is pivotally mounted on the frame and so arranged as to pivot due to the weight applied by a tree to the mechanism during movement through the cutting device.

8. A device for cutting trees as defined in claim 3 including means for actuating said cutting means in response to a condition of a tree being fed axially into said cutting means.

9. A tree cutting device as defined in claim 1 wherein said cutting means comprises a pair of knives mounted on said support and each movable in a direction toward and away from one another respectively to sever and receive a tree therebetween.

10. A tree cutting device as defined in claim 9 wherein each of said knives are slidably mounted on said support.

11. A tree cutting device as defined in claim 1 wherein the mounting means for said support comprises at least one beam and means on said support slidably mounted on said beam.

12. A device for cutting trees as defined in claim 11, including spring biased means for returning the movably mounted support to a normal rest position.

13. A device for cutting trees as defined in claim 11 wherein the support is pivotally mounted on the frame and so arranged as to pivot due to the weight applied by a tree to the mechanism during movement through the cutting device.

14. A device for cutting trees as defined in claim 11 including means for actuating said cutting means in response to a condition of a tree being fed axially into said cutting means.

15. A cutting device as defined in claim 1 wherein said support for the cutting means includes a portion telescopically mounted on at least one beam member.

16. A device for cutting trees as defined in claim 15, including spring biased means for returning the movably mounted support to a normal rest position.

17. A device for cutting trees as defined in claim 16 wherein the coil spring is disposed within the telescopic members.

18. A device for cutting trees as defined in claim 15 wherein the support is pivotally mounted on the frame and so arranged as to pivot due to the weight applied by a tree to the mechanism during movement through the cutting device.

19. A device for cutting trees as defined in claim 15 wherein the cutting means comprises a pair of knives relatively movable with respect to one another in a direction toward and away from one another, respectively, to sever and receive a tree therebetween, said mechanism further including means to control the open position of the movable cutting knives in proportion to the diameter of the tree to be severed.

20. A device for cutting trees as defined in claim 1 wherein the means mounting said support comprises a pair of spaced parallel beam members and means slidably mounting said support on said beam members for movement along a path parallel to the length of such beam members.

21. A tree cutting device as defined in claim 1 wherein the mounting means for the support comprises a pair of parallel spaced apart horizontal beams adapted to be mounted on a frame and a pair of similarly spaced horizontal beam members secured to the knife support and projecting therefrom, said first and second mentioned beam members being arranged telescopically to allow movement of the support in a path parallel to the length thereof.

22. A device for severing trees as defined in claim 21 including guide means between said telescopic beams.

23. A device for cutting trees as defined in claim 22 wherein said guide means includes at least two brackets secured to and disposed about the outer circumference of the inner beam at the aft end thereof, each bracket having rollers pivotally mounted thereon adapted to roll on the inner circumference of the outer beam and at least two brackets secured to and disposed about the inner circumference of the outer beam at the fore end thereof, each of said latter mentioned brackets having pivotally mounted rollers thereon adapted to roll on the outer circumference of the inner beam.

24. A device for cutting trees as defined in claim 1, including spring biased means for returning the movably mounted support to a normal rest position.

25. A device for cutting trees as defined in claim 24 wherein the support is pivotally mounted on the frame and so arranged as to pivot due to the weight applied by a tree to the mechanism during movement through the cutting device.

26. A device for cutting trees as defined in claim 24 including means for actuating said cutting means in response to a condition of a tree being fed axially into said cutting means.

27. A device for cutting trees as defined in claim 24 wherein the cutting means comprises a pair of knives relatively movable with respect to one another in a direction toward and away from one another, respectively, to sever and receive a tree therebetween, said mechanism further including means to control the open position of the movable cutting knives in proportion to the diameter of the tree to be severed.

28. A device for cutting trees as defined in claim 1 wherein the support is pivotally mounted on the frame and so arranged as to pivot due to the weight applied by a tree to the mechanism during movement through the cutting device.

29. A device for cutting trees as defined in claim 28 including means for actuating said cutting means in response to a condition of a tree being fed axially into said cutting means.

30. A device for cutting trees as defined in claim 28 wherein the cutting means comprises a pair of knives relatively movable with respect to one another in a direction toward and away from one another respectively, to sever and receive a tree therebetween, said mechanism further including means to control the open position of the movable cutting knives in proportion to the diameter of the tree to be severed.

31. A tree cutting device as defined in claim 1 wherein said cutting means comprises a pair of knives mounted on said support, at least one of said knives being movable in a direction toward and away from the other knife respectively to sever and receive a log therebetween, wherein said support for the cutting means includes a portion telescopically mounted on at least one beam member, and wherein the support is pivotally mounted on the frame and so arranged as to pivot due to the weight applied by a tree to the mechanism during movement through the cutting device.

32. A device for cutting trees as defined in claim 31 including means for actuating said cutting means in response to a condition of a tree being fed axially into said cutting means.

33. A device for cutting trees as defined in claim 1 including hydraulic cylinder means to actuate the cutting means for severing a tree.

34. A tree cutting device as defined in claim 1 wherein the cutting means comprises at least one movable knife and hydraulic cylinder means to effect movement of said knife on the support to sever a tree.

35. A device for cutting trees as defined in claim 1 including means for actuating said cutting means in response to a condition of a tree being fed axially into said cutting means.

36. A device for cutting trees as defined in claim 35 wherein said means is responsive to movement of the tree to be severed.

37. A device for cutting trees as defined in claim 1 wherein the cutting means comprises a pair of knives relatively movable with respect to one another in a direction toward and away from one another respectively, to sever and receive a tree therebetween, said mechanism further including means to control the open position of the movable cutting knives in proportion to the diameter of the tree to be severed.

38. A device for cutting trees as defined in claim 1 wherein said cutting means comprises a knife movable in a direction toward and away from an abutment respectively to sever and receive a tree therebetween, said mechanism further including switch means associated with the movable cutter to reverse the direction thereof subsequent to severing a tree.

39. A device for cutting trees as defined in claim 1 wherein the cutting means comprises a pair of cutting knives at least one of which is movable in a direction toward and away from the other knife, said mechanism further including switch means operative to initiate movement of such knife toward and away from the other.

40. A device for cutting trees as defined in claim 39, including log measuring means associated with the frame carrying the movable support and switch means associated with said log measuring means to initiate actuation of said cutting means.

41. A device for cutting trees as defined in claim 40 wherein said log measuring means comprises a framework, at least one leg pivotally secured to said framework and extending across said path and switch means operated by pivotal movement of said leg.

42. A device for cutting trees as defined in claim 41 wherein said framework is located downstream of said cutting means and means pivotally mounting said framework on the frame for the movable support.

43. A mechanism for cutting trees into logs, said mechanism comprising a plurality of cutting knives movable toward and away from one another, means for feeding a tree along a generally linear path substantially parallel to the length of the tree and between said cutting knives, a support for said knives, means interconnecting said support and said knives for moving said knives toward and away from one another to cut a tree disposed therebetween into logs and mounting means for said housing to allow said housing and said knives to move axially with said tree while said knives are in engagement with said tree and for returning said housing to its initial position when said knives are moved away from engagement with said tree.

44. A mechanism for cutting a tree while it moves along a path generally parallel to the length of the tree comprising in combination a support, at least one cutting knife mounted on said support and movable toward and away from an abutment on the support, means for feeding a tree along a generally linear path substantially parallel to the length of the tree and between said cutting knife and said abutment, means interconnecting said support and said knife for moving said knife toward and away from said abutment to cut a tree disposed therebetween into logs and mounting means for said support to allow said support and said knife to move axially along with the tree while said knives are in engagement with said tree and for returning said support to its initial position when said knives are moved away from engagement with said tree.

45. A mechanism as defined in claim 44 wherein said abutment comprises a knife member mounted on the frame.

46. A mechanism as defined in claim 45 wherein said further knife is movable toward and away from said first-mentioned knife.

47. A machine for processing a felled tree, said machine comprising:
(a) support means;
(b) feed means for feeding a tree bole axial along a substantially linear feed path;
(c) cutting means on said support means and located in said feed path for cutting said tree bole passing along said path into a plurality of portions; and
(d) mounting means for said cutting means to allow said cutting means to move along said path during said cutting operation and for returning said cutting means to its initial position when said cutting operation is terminated.

48. A machine as defined in claim 47 wherein said feed means is mounted directly on said machine.

49. A machine as defined in claim 48 wherein said feed means includes an extendible and retractable boom.

50. A machine as defined in claim 49 wherein said boom is rotatable about a vertical axis.

51. A machine as defined in claim 49 wherein said boom is pivotable about a horizontal axis.

52. A machine as defined in claim 51 wherein said boom is mounted on said frame to pivot about a horizontal axis located vertically above said tree cutting means.

53. A machine as defined in claim 49 wherein feed means includes said article engaging means consisting of a grapple suspended from said boom and including a pair of relatively movable jaws for engaging said tree.

54. A machine as defined in claim 53 wherein said grapple consists of a jaw suspended from and rigidly secured to said boom and a second jaw member pivotally mounted on said first jaw member and relatively movable with respective thereto.

55. A machine as defined in claim 53 wherein said grapple consists of a first tong portion rigidly secured to and projecting downwardly from said boom and having an inwardly directed hooked terminal end portion, the second jaw member pivotally mounted on said first jaw member intermediate the ends thereof and having a terminal end portion turned inwardly towards the terminal end of the fixed member and means biasing said movable member towards said fixed member whereby said jaw is normally closed and means for moving said movable jaw against the resilient bias for opening the jaw.

56. A machine as defined in claim 55 wherein the means to operate said movable jaw consists of a hydraulic cylinder resiliently urged or biased to normally retain the jaw in a closed position by a hydraulic accumulator, said hydraulic cylinder being connected to a hydraulic system, the line for connecting the cylinder to the system being mounted on the boom and movable therewith, said line being wound upon the third sheave in a sheave system.

57. A machine for processing a felled tree, said machine comprising:
(a) support means;
(b) feed means for feeding a tree bole axially along a substantially linear feed path;
(c) cutting means on said support means and located in said feed path for cutting said tree bole passing along said path into a plurality of portions; and
(d) mounting means for said cutting means to allow said cutting means to move along said path during said cutting operation due to the movement of said tree bole along said path, and for returning said cutting means to its initial position when said cutting operation is terminated.

58. A machine as defined in claim 57 wherein said feed means is mounted directly on said machine.

59. A machine as defined in claim 57 wherein said feed means comprises an extendible and retractable boom mounted directly on said machine and rotatable about a vertical axis.

60. Apparatus for subdividing a tree bole into a plurality of portions comprising:
(a) feed means to move said bole endwise along a path substantially coincident with the longitudinal axis of said bole;
(c) tree cutting means engageable with said bole to subdivide the same and mounted on said frame to reciprocate along on axis parallel to the path of said bole, said bole moving said cutting means on engagement therewith along said axis from an initial first position during said subdividing of said bole; and
(d) means returning said cutting means to said first position upon disengagement of said cutting means from said bole.

61. A machine as defined in claim 60 wherein said feed means is mounted directly on said machine.

62. A machine as defined in claim 60 wherein said feed means comprises an extendible and retractable boom mounted directly on said machine and rotatable about a vertical axis.

63. In a machine for processing a felled tree, the combination of a support means; means on said support means for feeding a tree axially along a substantially linear feed path and a shear comprising a plurality of cutting knives; a housing for said knives; means on said housing for moving said knives toward each other and away from each other and intersecting said axial path to cut a tree passing along said axial path into logs; and mounting means for said housing to allow said housing and said knives to move along said axial path while said knives are in engagement with said tree and for returning said housing to its initial position when said knives are moved out of engagement with said tree.

64. The machine of claim 63 including feed rolls mounted on said support to feed said tree to said shear, said feed rolls and said shear being in tandem alignment.

65. A cutting device according to claim 64, characterized in means for actuating said cutting means comprising a counter switch fixed to an end of one of the feed rolls and being set to act automatically after each preset number of rotations of said feed roll.

References Cited

UNITED STATES PATENTS

| | | | |
|---|---|---|---|
| 3,348,592 | 10/1967 | Winblad et al. | 144—309 |
| 3,385,333 | 5/1968 | Eynon | 144—3 |

GERALD A. DOST, Primary Examiner

U.S. Cl. X.R.

144—2, 34, 309